United States Patent
Larbig et al.

(10) Patent No.: US 11,834,598 B2
(45) Date of Patent: *Dec. 5, 2023

(54) DIELECTRIC COPOLYMER MATERIALS

(71) Applicant: Merck Patent GmbH, Darmstadt (DE)

(72) Inventors: Gregor Larbig, Gelnhausen (DE);
Pawel Miskiewicz, Neu-Isenburg (DE);
Frank Meyer, Glashuetten (DE); Joerg Pahnke, Darmstadt (DE); Karsten Koppe, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/286,274

(22) PCT Filed: Oct. 15, 2019

(86) PCT No.: PCT/EP2019/077837
§ 371 (c)(1),
(2) Date: Apr. 16, 2021

(87) PCT Pub. No.: WO2020/078939
PCT Pub. Date: Apr. 23, 2020

(65) Prior Publication Data
US 2021/0355381 A1 Nov. 18, 2021

(30) Foreign Application Priority Data

Oct. 18, 2018 (EP) .................................... 18201357
Nov. 12, 2018 (EP) .................................... 18205766

(51) Int. Cl.
*C09K 19/20* (2006.01)
*C08G 73/10* (2006.01)
(Continued)

(52) U.S. Cl.
CPC .......... *C09K 19/2028* (2013.01); *C08G 73/10* (2013.01); *C08G 77/045* (2013.01);
(Continued)

(58) Field of Classification Search
CPC ....................................................... C09K 19/20
See application file for complete search history.

(56) References Cited

U.S. PATENT DOCUMENTS 6,261,481 B1  7/2001  Akatsuka et al.
8,687,259 B2*  4/2014  Adlem ............... C09K 19/3059
                                                     252/299.63
(Continued)

FOREIGN PATENT DOCUMENTS

KR    20160052234 A    5/2016
WO       9604351 A1    2/1996
(Continued)

OTHER PUBLICATIONS

Jan P.F. Lagerwall, G. Scalia : "A new era for liquid crystal research: Applications of liquid crystals in soft matter nano-, bio- and microtechnology"; Current Applied Physics 12 (2012) 1387-1412.
(Continued)

*Primary Examiner* — Chanceity N Robinson
(74) *Attorney, Agent, or Firm* — MILLEN WHITE ZELANO AND BRANIGAN, PC; Csaba Henter

(57) ABSTRACT

The present invention relates to a polymerizable mixture which can be used to form a dielectric material for the preparation of passivation layers in electronic devices. The polymerizable mixture comprises a first monomer and a second monomer which may react to form a copolymer providing excellent film forming capability, excellent thermal properties and excellent mechanical properties. There is further provided a method for forming said copolymers and an electronic device containing said copolymers as dielectric
(Continued)

material. Beyond that, the present invention relates to a manufacturing method for preparing a packaged microelectronic structure and to a microelectronic device comprising said packaged microelectronic structure formed by said manufacturing method.

23 Claims, 2 Drawing Sheets

(51) Int. Cl.
    *C08G 77/04*     (2006.01)
    *C09K 19/02*     (2006.01)
    *C09K 19/34*     (2006.01)
    *B82Y 20/00*     (2011.01)
    *C09K 19/04*     (2006.01)

(52) U.S. Cl.
    CPC .......... *C09K 19/02* (2013.01); *C09K 19/3483* (2013.01); *B82Y 20/00* (2013.01); *C08G 2250/00* (2013.01); *C09K 2019/0448* (2013.01); *C09K 2019/2078* (2013.01); *C09K 2219/03* (2013.01)

(56) References Cited

U.S. PATENT DOCUMENTS

| | | | |
|---|---|---|---|
| 9,598,587 B2 | 3/2017 | Farrand | |
| 2004/0225059 A1* | 11/2004 | Mizori | C09J 179/085 548/455 |
| 2006/0009578 A1 | 1/2006 | Dershem | |
| 2008/0075961 A1* | 3/2008 | Mizori | C09J 179/085 524/588 |
| 2009/0224203 A1 | 9/2009 | Jung et al. | |
| 2017/0023832 A1 | 1/2017 | Kang et al. | |
| 2017/0152418 A1 | 6/2017 | Aoyama et al. | |
| 2021/0062091 A1* | 3/2021 | Meyer | C09K 19/34 |

FOREIGN PATENT DOCUMENTS

| | | | | |
|---|---|---|---|---|
| WO | 12152409 A1 | 11/2012 | | |
| WO | 19141833 A1 | 7/2019 | | |
| WO | WO-2019141833 A1 * | 7/2019 | | C09K 19/04 |

OTHER PUBLICATIONS

D. Liu, D. J. Broer :"Liquid Crystal Polymer Newtorks: Preparation, Properties, and Applications of Films with Patterned Molecular Alignment"; Langmuir (ACS Publications) 2014, 30, 13499-13509.
Chr. Ohm et al.: "Liquid Crystalline Elastomers as Actuators and Sensors"; Adv. Mater. 2010, 22, 3366-3387.
Ralf Stannarius "More than display fillings"; Nature Materials, vol. 8, No. 8, pp. 617-618, Aug. 2009, www.nature.com/naturematerials.
Ahn Y. H. et al.: „Synthesis and characterization of liquid crystals and their thermoset films, Materials Chemistry and Physics, Elsevier SA, Switzerland, vo. 123, No. 1, Sep. 17, 2010, 177-183, XP027066767.
International search report PCT/EP2019/077837 dated Dec. 10, 2019 (pp. 1-4).
Habib Hichri et al.: "Full-Field Projection scanner patterning Resolution and overlay Performance"; habib.hichri@suss.com (pp. 1-7). Conference Paper, Oct. 2016.

* cited by examiner (Structure 6)

(Structure 7)

wherein  represents an inorganic nanoparticle.

, and

DIELECTRIC COPOLYMER MATERIALS

FIELD OF THE INVENTION

The present invention relates to a novel class of copolymers which can be used as dielectric material for the preparation of passivation layers in packaged electronic devices. The copolymers are obtained from a polymerizable mixture comprising a first monomer and a second monomer, wherein the first monomer is one or more polymerizable 3-substituted or 3,4-disubstituted maleimide compound having mesogenic groups and wherein the second monomer is one or more bi- or multifunctional compound capable of reacting with the first monomer to give a copolymer. The first monomer may be also referred to as reactive mesogen (RM). The copolymers obtained therefrom are thus materials with liquid-crystalline features conserved in their structure and they provide excellent film forming capability, excellent thermal properties, excellent mechanical properties as well as easy processing from conventional solvents. In particular, the copolymers are characterized by a low dielectric constant and thermomechanical properties which reduce thermally induced stress owing to the coefficient of thermal expansion (CTE) mismatch between silicon (3 ppm/K) and copper-dominated (16.5 ppm/K) substrate and package. Furthermore, the copolymers provide a favorable and well-balanced relationship between stiffness and elasticity so that thermal stress can be easily compensated.

Beyond that, they are photostructurable and particularly suitable for various applications in electronic packaging such as e.g. the passivation of conductive or semiconducting components and die attach and as a major component in the preparation of substrates for printed circuit boards.

There is further provided a method for forming said copolymers and an electronic device containing said copolymers as dielectric material. Beyond that, the present invention relates to a manufacturing method for preparing a packaged microelectronic structure, wherein a dielectric copolymer layer is formed from said polymerizable mixture, and to a microelectronic device comprising said packaged microelectronic structure which is obtained or obtainable by said manufacturing method.

The manufacturing method according to the present invention allows a cost-effective and reliable manufacturing of microelectronic devices where the number of defective products caused by mechanical deformation (warping) due to undesirable thermal expansion is significantly reduced. Polymerization and/or curing can occur at significantly lower temperatures and thus leading to lower thermal stress during manufacturing, which reduces the waste of defective microelectronic devices, thereby allowing a resource-efficient and sustainable production.

BACKGROUND OF THE INVENTION

Reactive mesogens (RMs), when polymerized at temperatures at which they exhibit thermotropic liquid crystal (LC) phases (typically nematic, cholesteric or smectic), give anisotropic polymers which conserve the liquid crystalline state. In particular, optical anisotropy has been widely exploited in the field of optical films for compensation and brightness enhancement in flat panel displays, especially in liquid crystal displays.

In addition to their wide use in liquid crystal displays and displays, liquid crystalline materials are investigated for their advantages in other application types due to their special physical properties (R. Stannarius, Nat. Mat. 2009, 8, 617-618; and J. P. F. Lagerwall et al., Current Appl. Phys. 2012, 12, 1387-1412). In particular, highly ordered anisotropic polymer networks are an interesting material class with a diverse range of applications (D. J. Broer et al., Lagmuir 2014, 30, 13499-13509; and R. Zentel et al., Adv. Mater. 2010, 22, 3366-3387). However, in most cases the LC polymers or corresponding monomers from which the polymers are made do not have optimum properties required for the respective application.

WO 2012/152409 A1 relates to polymer particles with optical anisotropy and shape anisotropy comprising monomer units of at least one reactive mesogen, a process for their preparation, the use of these particles for the preparation of optical, electrooptical, electronic, electrochemical, electrophotographic, electrowetting and electrophoretic displays and/or devices and security, cosmetic, decorative, and diagnostic applications, and electrophoretic fluids and displays comprising said polymer particles. In particular, the polymer particles have monomer units of at least one RM with at least two polymerizable groups, at least one polymerizable dye as comonomer, optionally at least one comonomer, optionally at least one cross-linking comonomer, optionally at least one ionic comonomer, and optionally at least one polymerizable stabilizer.

Various processes for the preparation of liquid-crystalline polymers from RMs and for the preparation of the RM starting materials are known from the state of the art. For example, Siemensmeyer et al. describes a process for producing mixtures of LC compounds, wherein at least one of the starting components consists of a mixture of at least two compounds and this mixture is reacted with at least one other starting component to form a statistic mixture (WO 96/04351 A1).

In addition to efficient preparation methods for LC compounds, suitable polymerization methods for forming anisotropic polymer networks are in the focus of interest. A variety of reactive functional groups were investigated for their applicability in photoinitiated polymerization reactions. The most widespread reactive functional groups are acrylates and methacrylates, which are particularly well suited for UV-induced free-radical polymerizations due to their high polymerization rate (D. J. Broer et al., Lagmuir 2014, 30, 13499-13509). However, UV curing is not suitable for all kinds of application.

Mixtures of polymerizable liquid-crystalline monomers (reactive mesogens) can be used to prepare thin films which can be cured by thermal or photoinitiated polymerization. Films which are prepared in this way are relatively thin and contain a highly cross-linked duroplastic polymer which has a pronounced dimensional stability. However, these films are relatively brittle and exhibit very low elasticity. If, on the other hand, the crosslinking degree is reduced, no dimensionally stable polymer films can be obtained.

U.S. Pat. No. 6,261,481 B1 describes an organic insulating composition which provides a good thermal conductivity. The insulating composition contains a liquid crystal (LC) resin comprising a polymerization product of a resin composition containing a monomer which has a mesogenic group. The composition has a thermal conductivity in directions mutually orthogonal to each other of ≥0.4 W/mK. The monomer contained in the resin composition has a mesogenic group and preferably an epoxy group which can be polymerized thermally under acid catalysis. Preferably, the resin composition is heated under conditions that the monomer having the mesogenic group is partially arranged when the polymerization starts so that the anisotropic properties based on the partial arrangement are frozen in the polymer.

US 2008/0075961 A1 and US 2017/0152418 A1 relate to maleimide adhesive films which are prepared from thermosetting maleimide resins containing imide-extended mono-, bis- and polymaleimide compounds. The maleimide adhesive films are photostructurable and suitable for the production of electronic equipment, integrated circuits, semiconductor devices, passive devices, solar batteries, solar modules, and/or light emitting diodes. However, the maleimide compounds do not contain any mesogenic groups which could impart a preferential direction or partial arrangement of the compound in the film. This results in poorer properties with regard to mechanical stability and thermal conductivity. These materials typically also exhibit a relatively low glass transition point, which again impact their thermal expansion properties.

KR 20160052234 A describes a photocurable insulating resin composition and printed circuit board using the same. The photocurable insulating resin composition comprises a photocurable liquid crystal oligomer; a photocurable graphene oxide; and a photocurable metal alkoxide. However, the photocurable liquid crystal oligomers do not contain multiple mesogenic groups linked together by a spacer group. This results in an unfavorable solubility profile and energies used for photocuring are very high.

Electronic Packaging

As solid-state transistors started to replace vacuum-tube technology, it became possible for electronic components, such as resistors, capacitors, and diodes, to be mounted directly by their leads into printed circuit boards of cards, thus establishing a fundamental building block or level of packaging that is still in use. Complex electronic functions often require more individual components than can be interconnected on a single printed circuit card. Multilayer card capability was accompanied by development of three-dimensional packaging of daughter cards onto multilayer mother boards. Integrated circuitry allows many of the discrete circuit elements such as resistors and diodes to be embedded into individual, relatively small components known as integrated circuit chips or dies. In spite of incredible circuit integration, however, more than one packaging level is typically required, in part because of the technology of integrated circuits itself. Integrated circuit chips are quite fragile, with extremely small terminals. First-level packaging achieves the major functions of mechanically protecting, cooling, and providing capability for electrical connections to the delicate integrated circuit. At least one additional packaging level, such as a printed circuit card, is utilized, as some components (high-power resistors, mechanical switches, capacitors) are not readily integrated onto a chip. For very complex applications, such as mainframe computers, a hierarchy of multiple packaging levels is required.

As a consequence of Moore's law, advanced electronic packaging strategies are playing an increasingly important role in the development of more powerful electronic products. In other words, as the demand for smaller, faster, and more functional mobile and portable electronic devices increases, the demand for improved cost-effective packaging technologies is also increasing.

A wide variety of advanced packaging technologies exist to meet the requirements of today's semiconductor industry. The leading Advanced Packaging technologies—wafer-level packaging (WLP), fan-out wafer level packaging (FOWLP), 2.5D interposers, chip-on-chip stacking, package-on-package stacking, embedded IC—all require structuring of thin substrates, redistribution layers and other components like high resolution inter-connects. The end consumer market presents constant push for lower prices and higher functionality on ever smaller and thinner devices. This drives the need for the next generation packaging with finer features and improved reliability at a competitive manufacturing cost.

Wafer-level packaging (WLP) is the technology of packaging an integrated circuit while still part of the wafer, in contrast to the more conventional chip scale packaging method, where the wafer is sliced into individual circuits (dices) and then packaged. WLP offers several major advantages compared to chip scale package technologies and it is essentially a true chip-scale package (CSP) technology, since the resulting package is practically of the same size as the die. Wafer-level packaging allows integration of wafer fab, packaging, test, and burn-in at wafer level in order to streamline the manufacturing process undergone by a device from silicon start to customer shipment. Major application areas of WLP are smartphones and wearables due to their size constraints. Functions provided WLPs in smartphones or wearables include: compass, sensors, power management, wireless etc. Wafer-level chip scale packaging (WL-CSP) is one of the smallest packages currently available on the market. WLP can be categorized into fan-in and fan-out WLP (FIG. 1). Both of them use a redistribution technology to form the connections between chips and solder balls.

Fan-out wafer level packaging (FOWLP) is one of the latest packaging trends in microelectronics: FOWLP has a high miniaturization potential both in the package volume as well as in the packaging thickness. Technological basis of FOWLP is a reconfigured, painted wafer with embedded chips and a thin film rewiring layer, which together form a surface-mounted device (SMD)-compatible package. The main advantages of the FOWLP are a very thin, because substrateless package, the low thermal resistance, good high-frequency properties due to short and planar electrical connections together with a bumpless chip connection instead of e.g. wire bonds or solder contacts.

With current materials, WLP processes are limited to medium chip size applications. The reasons for this restriction are mainly due to the current material selection, which shows a thermal mismatch with the silicon die (CTE: 3 ppm/K) and therefore can reduce the performance and generate stress on the dies. New materials with better physical properties (in particular, a coefficient of thermal expansion (CTE) closer to the CTE of silicon together with high mechanical flexibility) are in high demand. Currently, redistribution layers (RDLs) are made from copper layers (CTE: 16.5 ppm/K), which are electroplated on polymer passivation layers such as polyimides (PI), butylcyclobutanes (BCB), or polybenzoxazoles (PBO). Low curing temperatures in addition to photopaternability are two further important requirements in the processing of such materials.

Polyimide became the standard passivation layer for memory chips and other devices with the need of surface protection for the handling and testing procedure. Photosensitive resins have been developed to reduce processing costs.

Polyimide-ODA was the first member of a series of new high performance polymers based on alternate aromatic homocyclic and heterocyclic rings developed by Du Pont:

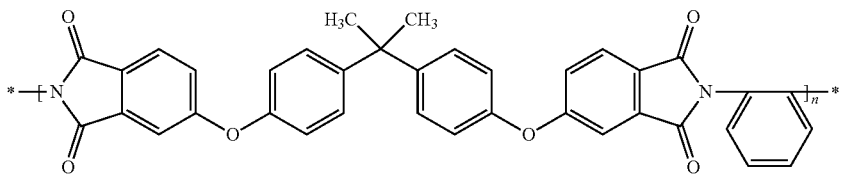

Polyimides are quite unique to their very high decomposition temperature which can go up to over 400° C. In addition, their mechanical properties guarantee a high flexibility (elongation at break up to 100%) with a very high tensile strength of over 200 MPa. PI is still the most popular polymer for IC passivation.

A modification to the negative-sensitive polymer PI was achieved by polybenzoxazole (PBO) which is sometime also called a positive-sensitive PI:

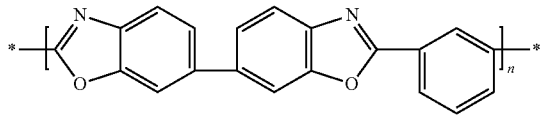

The polymer film can be developed after photo-exposure using an aqueous developer.

The so-called BCB (benzocyclobutene) is an example of a siloxane-polymer group having in addition a vinyl and a benzocyclobutene ring system:

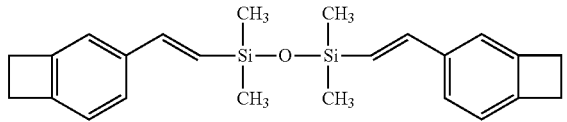 [SMILES: C[Si](C)(/C=C/c1ccc2c(c1)CC2)O[Si](C)(C)/C=C/c1ccc2c(c1)CC2]

A major advantage is the polymerization reaction (Diels-Alder reaction) which has high atomic economy, since no by-products occur. This highly-crosslinked thermoset polymer has excellent electrical performance, but is quite brittle with a low elongation to break value (8%) and low tensile strength of 87 MPa.

Another approach from the state of the art are imide-extended bismaleimide resins which were suggested in US 2008/0075961 A1 and US 2017/0152418 A1. They show promising results with regard to low-stress wafer passivation coatings. However, despite some improvement, there is still some room for improvement in order to meet the demanding requirements of industry.

In conclusion, the materials known from the state of the art show the following drawbacks:
- Polyimides and polybenzoxazoles typically require very high processing temperatures which increase the risk for warping, especially in multilayer redistribution layers (RDLs). In addition to that, polyimides show a high water uptake which is a problem for reliability of the devices.
- Benzocyclobutene derivatives as well as polynorbornenes show a very low dielectric constant, but this advantage is compromised by very poor adhesion to metals.
- Imide-extended bismaleimide resins so far do not show a favorable combination of advantageous mechanical and thermal properties. They are either flexible (low modulus), but have high CTE values, or they are brittle (high modulus) with low CTE values.

Hence, there is a continuous need to develop new dielectric materials which do not show the above-mentioned disadvantages known from the prior art.

Photolithography

Photolithography has long been the key patterning technology for structuring inorganic and organic materials used in advanced packaging applications like flip-chip wafer bumping, electroplated gold, solder bumps, copper pillar technologies and redistribution layers. Photolithography is a key manufacturing process and cost contributor; the careful selection of the right exposure solution is critical to achieve the best possible cost structure in today's industrial lithography applications.

Current drivers and trends in the semiconductor industry clearly show that performance improvements of microelectronic devices are needed to meet the future end user requirements. For example, consumer electronic devices like tablets and smartphones are getting thinner and smaller while gaining higher computing power, increased data storage, and improved communication capabilities. In addition, cost considerations become more and more important in the competitive landscape for all parties within the supply chain, from the chip manufacturers, foundries, assembly and test suppliers to the device manufacturers. Therefore, the industry strives for innovative approaches to lower manufacturing costs coupled with enabling technologies that meet the challenging technical requirements.

For decades, photolithography has been and still is the fundamental process used in the fabrication and packaging of microelectronic devices. A key component of any photolithography process is the exposure tool, which uses light in the ultraviolet wavelength range to pattern a photosensitive resist or polymer. The exposure tool must be able to precisely create the desired features and align them to the previously fabricated structures in the underlying layers. Several types of exposure technologies exist today: proximity or contact printing, laser direct imaging, and projection lithography. The corresponding equipment toolsets differ in terms of technical capability (optical resolution, overlay performance and effective throughput), and the costs related to the exposure process. (see H. Hichri et al., SOSS Micro Tec Photonic System Inc., Corona, CA, USA).

OBJECT OF THE INVENTION

It is an object of the present invention to overcome the deficiencies and drawbacks in the prior art and to provide a new class of material which can be used as versatile dielectric material in various electronic packaging applications.

Moreover, it is an object of the present invention to provide a new class of dielectric material which shows excellent film forming capabilities, excellent thermal properties, such as e.g. a low coefficient of thermal expansion (CTE), and excellent mechanical properties, such as e.g. excellent flexibility, when used for the formation of passivation layers in packaged electronic devices. It is a further object of the present invention to provide a new class of dielectric material which allows easy processing from conventional solvents.

More specifically, it is an object of the present invention to match the coefficient of thermal expansion of the dielectric with the thermal expansion coefficient of e.g. silicon (Si: 3 ppm/K) or copper (Cu: 16.5 ppm/K) without adversely affecting the mechanical properties such as e.g. elongation at break after UV or thermal curing at temperatures below 200° C.

Moreover, it is an object of the present invention to provide a novel class of material which is photostructurable and particularly suitable for various applications in electronic packaging such as e.g. the passivation of conductive or semiconducting components and die attach and as a major component in the preparation of substrates for printed circuit boards. An important field of application is the use as dielectric material for the structuring of RDLs in packaged microelectronic devices.

It is a further object of the present invention to provide a polymerizable mixture from which the novel material is made of. Beyond that, it is an object of the present invention to provide a method for forming said novel material using the polymerizable mixture. Finally, it is an object of the present invention to provide an electronic device comprising said novel material as dielectric material, a manufacturing method for preparing a packaged microelectronic structure and a microelectronic device comprising said packaged microelectronic structure which is obtainable by said manufacturing method.

SUMMARY OF THE INVENTION

The present inventors have surprisingly found that the above objects are achieved by a copolymer which is obtained from a polymerizable mixture comprising a first monomer and a second monomer, wherein the first monomer is one or more compound represented by Formula (1), and wherein the second monomer is one or more bi- or multi-functional compound capable of reacting with the first monomer to give a copolymer:

  Formula (1)

wherein:
m is an integer from 1 to 60,
$P^1$ denotes

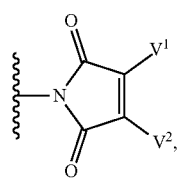

wherein $V^1$ is H, and $V^2$ is alkyl with 1 to 6 carbon atoms, F, Cl or CN; or $V^1$ and $V^2$ are independently of one another alkyl with 1 to 6 carbon atoms, F, Cl or CN;

Sp$^1$ denotes at each occurrence a spacer group (Sp) or a single bond;

MG is a rod-shaped mesogenic group, which is preferably selected from Formula (2):

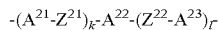  Formula (2)

wherein:

$A^{21}$ to $A^{23}$ are independently and at each occurrence independently of one another an aryl group, heteroaryl group, heterocyclic group, alicyclic group or cyclic imide group optionally being substituted by one or more identical or different groups L;

$Z^{21}$ and $Z^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond;

$R^{01}$ and $R^{02}$ each, independently of one another, denote H or alkyl having 1 to 12 C atoms;

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, wherein one or more H atoms are optionally replaced by F or Cl, —CN or straight chain or branched chain alkyl, alkoxy, alkylcarbonyl, alkoxycarbonyl, alkylcarbonyloxy or alkoxycarbonyloxy with 1 to 6 C atoms;

$R^{xx}$ and $R^{yy}$ independently of each other denote H or alkyl with 1 to 12 C-atoms;

$Y^{01}$ and $Y^{02}$ each, independently of one another, denote H, alkyl having 1 to 12 C atoms, aryl, F, Cl, or CN; and k and l are each and independently 0, 1, 2, 3 or 4.

Said polymerizable mixtures are used as starting material to form a new class of copolymers which exhibit a low thermal expansion and at the same time show high mechanical flexibility. Said copolymers are prepared by the following method which also forms part of the present invention:

Method for forming a copolymer, wherein the method comprises the following steps:

(i) providing a polymerizable mixture according to the present invention; and (ii) polymerizing said polymerizable mixture to obtain a copolymer.

Moreover, a copolymer is provided which is obtainable or obtained by the above-mentioned method for forming a copolymer.

Beyond that, an electronic device is provided comprising a copolymer according to the present invention.

Finally, a manufacturing method for preparing a packaged microelectronic structure is provided, in which a substrate is provided with a dielectric layer, wherein the method comprises the following steps:

(1) applying a polymerizable mixture according to the present invention to a surface of a substrate; and (2) polymerizing said polymerizable composition to form a dielectric layer.

There is also provided a microelectronic device comprising a packaged microelectronic structure which is obtainable or obtained by the manufacturing method according to the present invention.

Preferred embodiments of the present invention are described hereinafter and in the dependent claims.

DETAILED DESCRIPTION

Definitions

Figure 1:
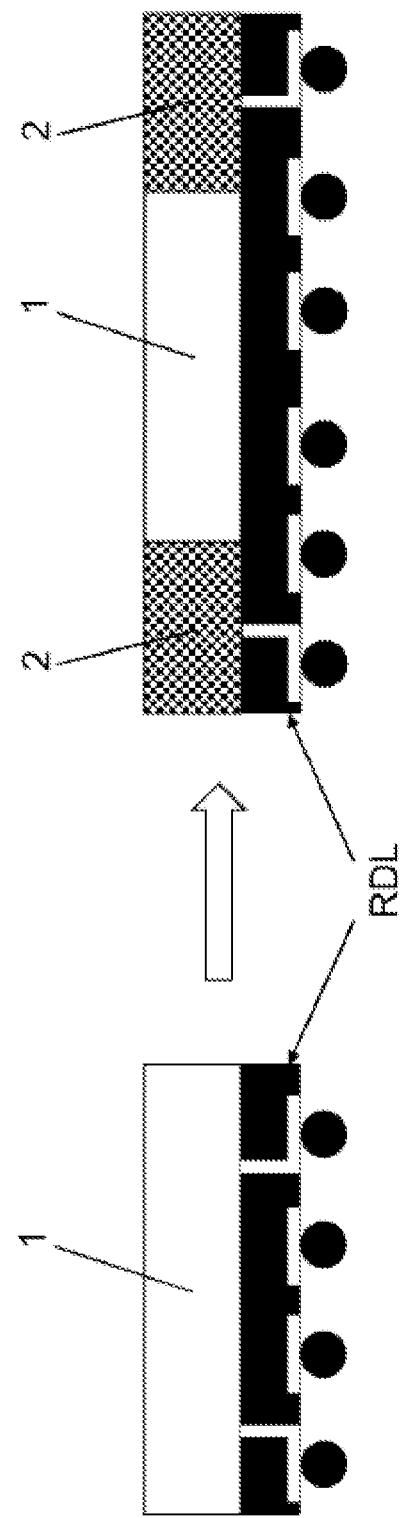
FIG. 1 illustrates the cross-sectional view of fan-in and fan-out WLP with die (1) and fan-out area (2)

The term "liquid crystal", "mesomorphic compound", or "mesogenic compound" (also shortly referred to as "mesogen") means a compound that under suitable conditions of temperature, pressure and concentration can exist as a mesophase or in particular as a LC phase. Non-amphiphilic mesogenic compounds comprise for example one or more calamitic, banana-shaped or discotic mesogenic groups.

The term "calamitic" means a rod- or board/lath-shaped compound or group. The term "banana-shaped" means a bent group in which two, usually calamitic, mesogenic groups are linked through a semi-rigid group in such a way as not to be co-linear. The term "discotic" means a disc- or sheet-shaped compound or group.

The term "mesogenic group" or its abbreviation "MG" means a group with the ability to induce liquid crystal (LC) phase behavior. Mesogenic groups, especially those of the non-amphiphilic type, are usually either calamitic or discotic. The compounds comprising mesogenic groups do not necessarily have to exhibit an LC phase themselves. It is also possible that they show LC phase behavior only in mixtures with other compounds, or when the mesogenic compounds or the mixtures thereof are polymerized. For the sake of simplicity, the term "liquid crystal" is used hereinafter for both mesogenic and LC materials.

A calamitic mesogenic compound is usually comprising a calamitic, i.e. rod- or lath-shaped, mesogenic group consisting of one or more aromatic or alicyclic groups connected to each other directly or via linkage groups, optionally comprising terminal groups attached to the short ends of the rod, and optionally comprising one or more lateral groups attached to the long sides of the rod, wherein these terminal and lateral groups are usually selected e.g. from carbyl or hydrocarbyl groups, polar groups like halogen, nitro, hydroxy, etc., or polymerizable groups.

A discotic mesogenic compound is usually comprising a discotic, i.e. relatively flat disc- or sheet-shaped mesogenic group consisting for example of one or more condensed aromatic or alicyclic groups, like for example triphenylene, and optionally comprising one or more terminal groups that are attached to the mesogenic group and are selected from the terminal and lateral groups mentioned above.

The term "reactive mesogen" or its abbreviation "RM" means a polymerizable mesogenic or liquid crystalline compound, which is preferably a monomeric or oligomeric compound.

The term "spacer" or "spacer group", also referred to as "Sp" below, is known to the person skilled in the art and is described in the literature.

Unless stated otherwise, the term "spacer" or "spacer group" above and below denotes a flexible organic group, which in a polymerizable mesogenic compound ("RM") connects the mesogenic group and the polymerizable group(s).

The term "polymer" includes, but is not limited to, homopolymers, copolymers, for example, block, random, and alternating copolymers, terpolymers, quaterpolymers, etc., and blends and modifications thereof. Furthermore, unless otherwise specifically limited, the term "polymer" shall include all possible configurational isomers of the material. These configurations include, but are not limited to isotactic, syndiotactic, and atactic symmetries. A polymer is a molecule of high relative molecular mass, the structure of which essentially comprises the multiple repetition of units (i.e. repeating units) derived, actually or conceptually, from molecules of low relative mass (i.e. monomers). In the context of the present invention polymers are composed of more than 60 monomers.

The term "oligomer" is a molecular complex that consists of a few monomer units, in contrast to a polymer, where the number of monomers is, in principle, unlimited. Dimers, trimers and tetramers are, for instance, oligomers composed of two, three and four monomers, respectively. In the context of the present invention oligomers may be composed of up to 60 monomers.

The term "monomer" as used herein refers to a polymerizable compound which can undergo polymerization thereby contributing constitutional units (repeating units) to the essential structure of a polymer or an oligomer. Polymerizable compounds are functionalized compounds having one or more polymerizable groups. Large numbers of monomers combine in polymerization reactions to form polymers. Monomers with one polymerizable group are also referred to as "monofunctional" or "monoreactive" compounds, compounds with two polymerizable groups as "bifunctional" or "direactive" compounds, and compounds with more than two polymerizable groups as "multifunctional" or "multireactive" compounds. Compounds without a polymerizable group are also referred to as "non-functional" or "non-reactive" compounds.

The term "homopolymer" as used herein stands for a polymer derived from one species of (real, implicit or hypothetical) monomer.

The term "copolymer" as used herein generally means any polymer derived from more than one species of monomer, wherein the polymer contains more than one species of corresponding repeating unit. In one embodiment the copolymer is the reaction product of two or more species of monomer and thus comprises two or more species of corresponding repeating unit. It is preferred that the copolymer comprises two, three, four, five or six species of repeating unit. Copolymers that are obtained by copolymerization of three monomer species can also be referred to as terpolymers. Copolymers that are obtained by copolymerization of four monomer species can also be referred to as quaterpolymers. Copolymers may be present as block, random, and/or alternating copolymers.

The term "block copolymer" as used herein stands for a copolymer, wherein adjacent blocks are constitutionally different, i.e. adjacent blocks comprise repeating units derived from different species of monomer or from the same species of monomer but with a different composition or sequence distribution of repeating units.

Further, the term "random copolymer" as used herein refers to a polymer formed of macromolecules in which the probability of finding a given repeating unit at any given site in the chain is independent of the nature of the adjacent repeating units. Usually, in a random copolymer, the sequence distribution of repeating units follows Bernoullian statistics.

The term "alternating copolymer" as used herein stands for a copolymer consisting of macromolecules comprising two species of repeating units in alternating sequence.

"Electronic packaging" is a major discipline within the field of electronic engineering, and includes a wide variety of technologies. It refers to inserting discrete components, integrated circuits, and MSI (medium-scale integration) and LSI (large-scale integration) chips (usually attached to a lead frame by beam leads) into plates through hole on multilayer circuit boards (also called cards), where they are soldered in place. Packaging of an electronic system must consider protection from mechanical damage, cooling, radio frequency noise emission, protection from electrostatic discharge maintenance, operator convenience, and cost.

The term "microelectronic device" as used herein refers to electronic devices of very small electronic designs and components. Usually, but not always, this means micrometer-scale or smaller. These devices typically contain one or more microelectronic components which are made from semiconductor materials and interconnected in a packaged structure to form the microelectronic device. Many electronic components of normal electronic design are available in a microelectronic equivalent. These include transistors, capacitors, inductors, resistors, diodes and naturally insulators and conductors can all be found in microelectronic devices. Unique wiring techniques such as wire bonding are also often used in microelectronics because of the unusually small size of the components, leads and pads.

"Nanoparticles" as used herein are particles with a mean diameter in the range from 1 to 100 nm. More preferably, nanoparticles have a mean diameter in the range from 20 to 80 nm, more preferably from 40 to 60 nm.

Preferred Embodiments

Polymerizable Compound

The present invention relates to a polymerizable mixture comprising a first monomer and a second monomer, wherein the first monomer is one or more compound represented by Formula (1), and wherein the second monomer is one or more bi- or multifunctional compound capable of reacting with the first monomer to give a copolymer:

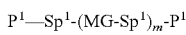   Formula (1)

wherein:
m is an integer from 1 to 60;
$P^1$ denotes

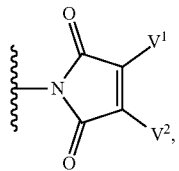

wherein $V^1$ is H, and $V^2$ is alkyl with 1 to 6 carbon atoms, F, Cl or CN; or $V^1$ and $V^2$ are independently of one another alkyl with 1 to 6 carbon atoms, F, Cl or CN;

$Sp^1$ denotes at each occurrence a spacer group (Sp) or a single bond;

MG is a rod-shaped mesogenic group, which is preferably selected from Formula (2):

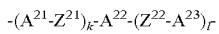   Formula (2)

wherein:
$A^{21}$ to $A^{23}$ are independently and at each occurrence independently of one another an aryl group, heteroaryl group, heterocyclic group, alicyclic group or cyclic imide group optionally being substituted by one or more identical or different groups L;

$Z^{21}$ and $Z^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond;

$R^{01}$ and $R^{02}$ each, independently of one another, denote H or alkyl having 1 to 12 C atoms;

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, wherein one or more H atoms are optionally replaced by F or Cl, —CN or straight chain or branched chain alkyl, alkoxy, alkylcarbonyl, alkoxycarbonyl, alkylcarbonyloxy or alkoxycarbonyloxy with 1 to 6 C atoms;

$R^{xx}$ and $R^{yy}$ independently of each other denote H or alkyl with 1 to 12 C-atoms;

$Y^{01}$ and $Y^{02}$ each, independently of one another, denote H, alkyl having 1 to 12 C atoms, aryl, F, Cl, or CN; and k and l are each and independently 0, 1, 2, 3 or 4.

Points of attachment (binding sites) of structural elements presented in this patent application may be indicated by

wherein * represents the structural element and

a binding site.

The polymerizable group $P^1$ is a 3-substituted or 3,4-disubstituted maleimide group which is capable to undergo a polymerization reaction such as, for example, a radical or ionic chain polymerization reaction, or a polyaddition reaction (e.g. cycloadditions, such as 2+2 cycloadditions, 4+2 cycloadditions (Diels-Alder reactions) or 1,3-dipolar cycloadditions, or nucleophilic additions, such as Michael reactions), or which is capable to undergo a polymerization analogous reaction such as, for example, an addition to a polymer backbone by one of the aforementioned reaction types.

It is preferred that the index m is an integer from 1 to 50, more preferably from 2 to 30, and most preferably from 3 to 20.

It is preferred that $V^1$ and $V^2$ are independently from each other selected from alkyl with 1 to 6 carbon atoms, F, Cl or CN. It is more preferred that $V^1$ and $V^2$ are independently from each other selected from alkyl with 1 to 3 carbon atoms, F, Cl or CN. Preferred alkyl with 1 to 3 carbon atoms is methyl, ethyl and propyl. $V^1$ and $V^2$ may be identical or different from each other. It is particularly preferred that $V^1$ and $V^2$ are identical.

Alternatively, it is preferred that $V^1$ is H, and $V^2$ is selected from alkyl with 1 to 6 carbon atoms, F, Cl or CN, more preferably from alkyl with 1 to 3 carbon atoms, F, Cl or CN. Preferred alkyl with 1 to 3 carbon atoms is methyl, ethyl and propyl.

It is preferred that $Z^{21}$ and $Z^{22}$ are independently and at each occurrence independently from each other —COO—, —OCO—, —CO—O—, —O—CO—, —OCH$_2$—, —CH$_2$O—, —CH$_2$CH$_2$—, —(CH$_2$)$_4$—, —CF$_2$CH$_2$—, —CH$_2$CF$_2$—, —CF$_2$CF$_2$—, —C≡C—, —CH═CH—COO—, —OCO—CH═CH—, or a single bond.

Preferably, k and l are each and independently 0, 1 or 2, more preferably k and l are 1.

Preferred spacer groups Sp are selected from the formula Sp'-X', so that the radical "P$^1$-Sp$^1$-" corresponds to the formula "P$^1$-Sp'-X'—", wherein:

Sp' denotes
(a) straight chain or branched chain alkylene having 1 to 40, preferably 1 to 30, C atoms, which is optionally mono- or polysubstituted by F, Cl, Br, I or CN and in which, in addition, one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, —CH═CH— or —C≡C— in such a way that O and/or S atoms are not linked directly to one another, or
(b) -Sp$^x$-G-Sp$^y$-, wherein Sp$^x$ and Sp$^y$ denote independently of each other alkylene having 1 to 20 C atoms, preferably 1 to 12 C atoms, or a single bond; G denotes cycloalkylene having 3 to 20 C atoms, preferably 5 to 12 C atoms, which is optionally mono- or polysubstituted by alkyl having 1 to 20 C atoms, preferably 1 to 12 C atoms;

X' denotes —O—, —S—, —CO—, —COO—, —OCO—, —O—COO—, —CO—NR$^{01}$, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═C—, —N═N—, —CH═CR$^{01}$—, —CY$^{01}$═CY$^{02}$—, —C≡C—, —CH═CH—COO—, —OCO—CH═CH— or a single bond, preferably —O—, —S—, —CO—, —COO—, —OCO—, —O—COO—, —CO—NR$^0$—, —NR$^{01}$—CO—, —NR$^{01}$—CO—NR$^{01}$— or a single bond;

R$^{01}$ and R$^{02}$ each, independently of one another, denote H or alkyl having 1 to 12 C atoms; and Y$^{01}$ and Y$^{02}$ each, independently of one another, denote H, F, Cl or CN.

Preferred groups Sp' are in each case selected from straight chain methylene, ethylene, propylene, butylene, pentylene, hexylene, heptylene, octylene, nonylene, decylene, undecylene, dodecylene, and octadecylene, cyclohexylene, ethyleneoxyethylene, methyleneoxybutylene, ethylenethioethylene, ethylene-N-methyliminoethylene, 1-methylalkylene, ethenylene, propenylene and butenylene.

More preferred spacer groups Sp are selected from the list consisting of —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$—, —(SiR$^{01}$R$^{02}$—O)$_{p1}$—, —(CH$_2$)$_{p1}$-(cyclo-C$_6$H$_8$R$^{01}$R$^{02}$)—(CH$_2$)$_{p1}$—, and

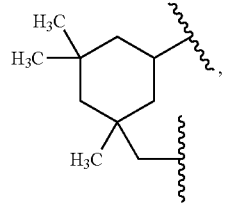

wherein:

p1 is an integer from 1 to 60, preferably from 1 to 36, more preferably from 1 to 12;

q1 is an integer from 1 to 12, preferably from 1 to 3; and

R$^{01}$ and R$^{02}$ each, independently of one another, denote H or alkyl having 1 to 12 C atoms.

Most preferred groups Sp are —(CH$_2$)$_{p1}$—, —O—(CH$_2$)$_{p1}$—, —O—(CH$_2$)$_{p1}$—O—, —OCO—(CH$_2$)$_{p1}$—, and —OCOO—(CH$_2$)$_{p1}$—, in which p1 is an integer from 1 to 36, preferably from 1 to 12.

In a preferred embodiment of the present invention, the groups A$^{21}$ to A$^{23}$ denote independently and, in case of multiple occurrence, independently of one another, a moiety selected from the following groups a) to e):

a) trans-14-cyclohexylene, 1,4-cyclohexenylene and 4,4'-bicyclohexylene, in which one or more non-adjacent CH$_2$ groups may be replaced by —O— and/or —S— and wherein one or more H atoms may be replaced by a group L;

b) 1,4-phenylene, 1,3-phenylene, 4,4'-biphenylene, 2,5-thiphene and 2,6-dithieno[3,2-b:2',3'-d]thiophene in which one or two CH groups may be replaced by N and where one or more H atoms may be replaced by a group L;

c) tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophen-2,5-diyl, which may be substituted one or more groups L;

d) saturated, partially unsaturated or completely unsaturated, and optionally substituted, polycyclic radicals having 5 to 20 cyclic C atoms, of which one or more can also be replaced by heteroatoms, preferably selected from the group consisting of bicyclo [1.1.1] pentane-1,3-diyl, bicyclo [2.2.2] octane-1,4-diyl, spiro [3.3] heptane-2,6-diyl,

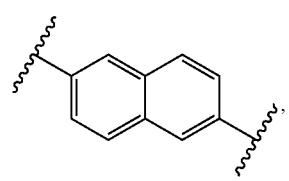

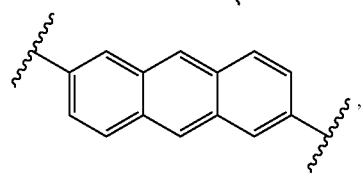

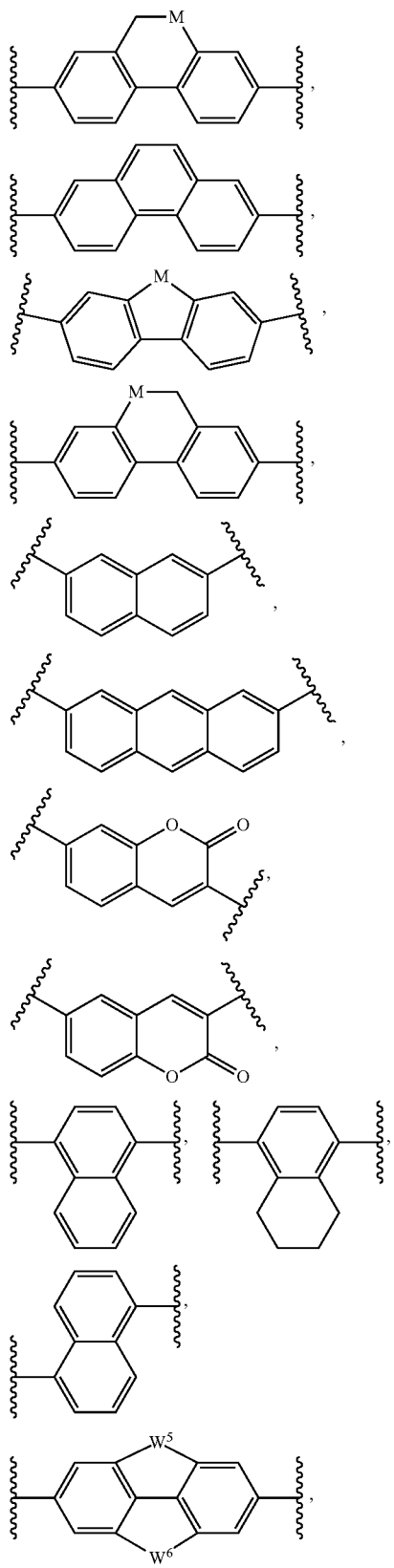

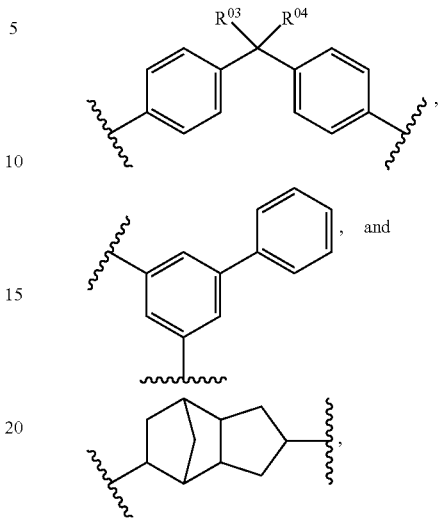

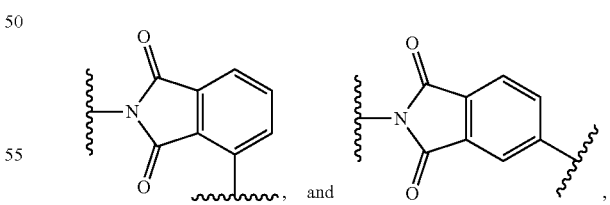

where one or more H atoms may be replaced by a group L, and/or one or more double bonds may be replaced by single bonds, and/or one or more CH groups may be replaced by N, and where M denotes —O—, —S—, —CH$_2$—, —CHY$^{03}$— or —CY$^{03}$Y$^{04}$—;

Y$^{03}$, Y$^{04}$ denote independently of each other one of the meanings given above for R$^{01}$, F, Cl, CN, OCF$_3$ or CF$_3$, and preferably H, F, Cl, CN, OCF$_3$ or CF$_3$;

W$^5$, W$^6$ denote independently of each other —CH$_2$CH$_2$—, —CH═CH—, —CH$_2$—O—, —O—CH$_2$—, —C(R$^c$R$^d$)— or —O—;

R$^c$, R$^d$ denote independently of each other H or alkyl having 1 to 6 C atoms, preferably H, methyl or ethyl; and R$^{03}$, R$^{04}$ denote independently of each other H, F, straight chain or branched chain alkyl having 1 to 12 C atoms where one or more H atoms may be replaced by F;

e) cyclic imides selected from the group consisting of:

where one or more H atoms may be replaced by a group L, and/or one or more double bonds may be replaced by single bonds, and/or one or more CH groups may be replaced by N.

It is preferred that the first monomer comprised in the polymerizable mixture according to the present invention is one, two, three or four compound(s) represented by Formula (1).

Preferred compounds according to Formula (1) are:
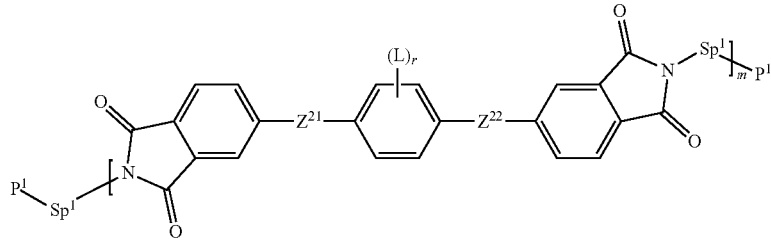
M1
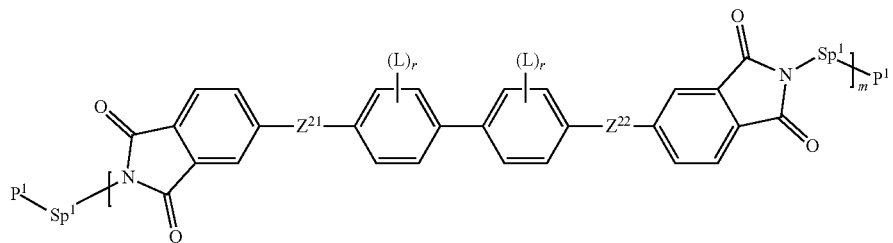
M2
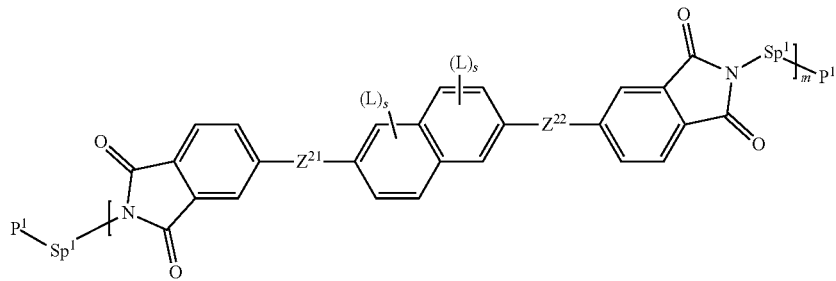
M3
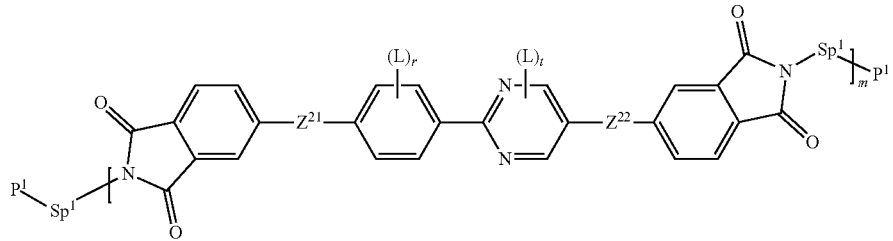
M4
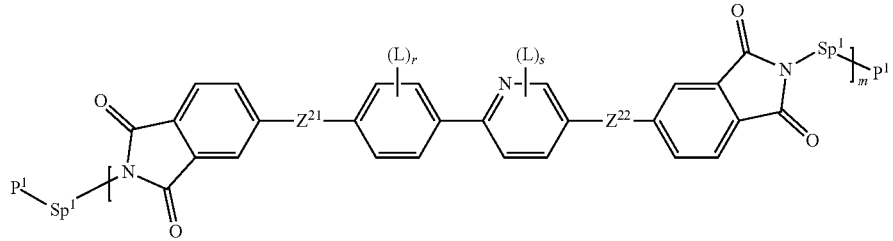
M5
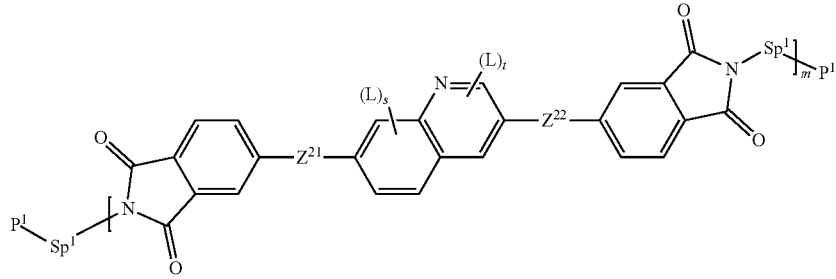
M6

M7
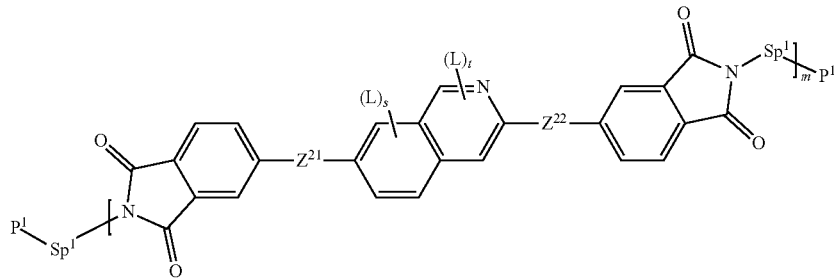
M8
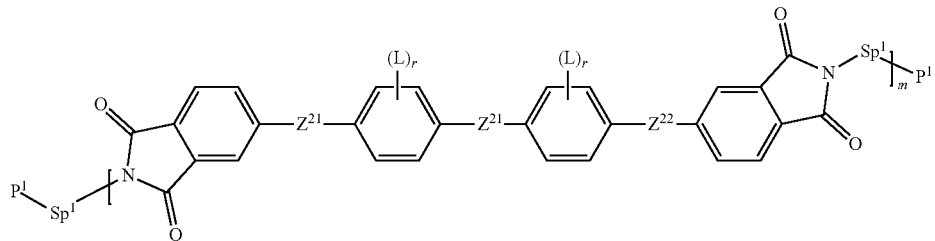
M9
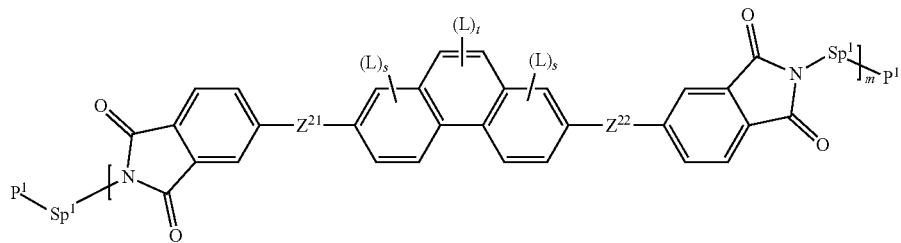
M10
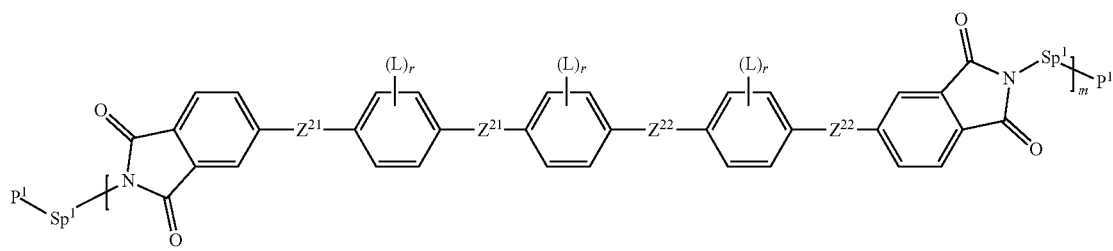
M11
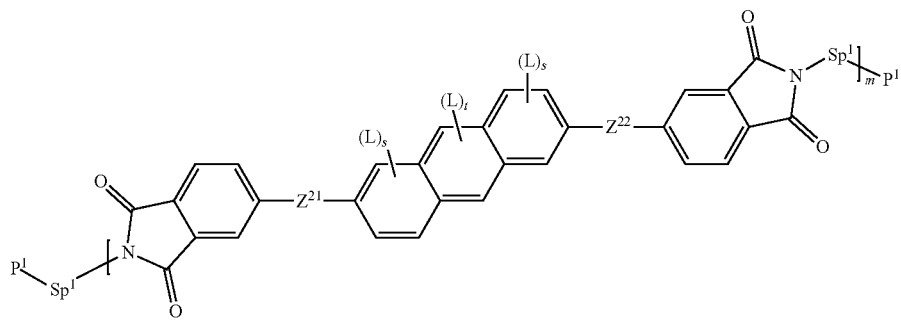
M12
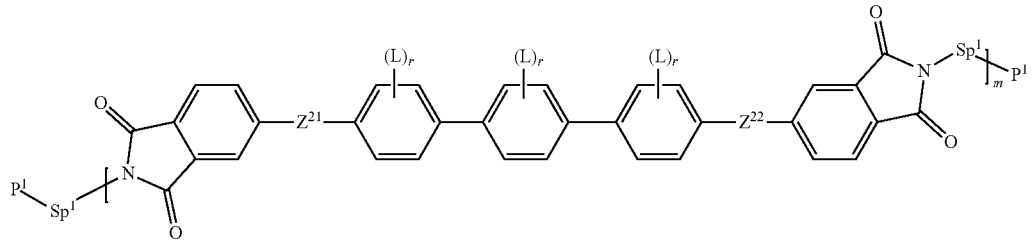

-continued
M13
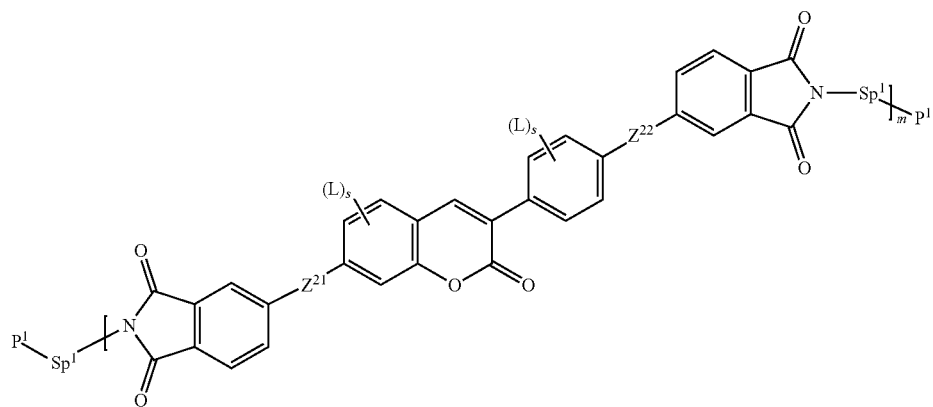
M14
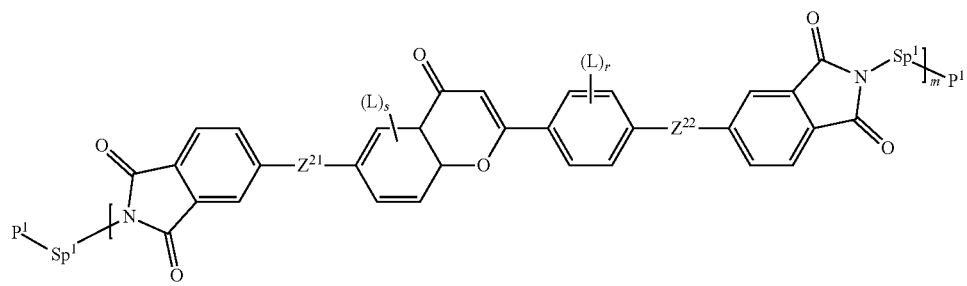
M15
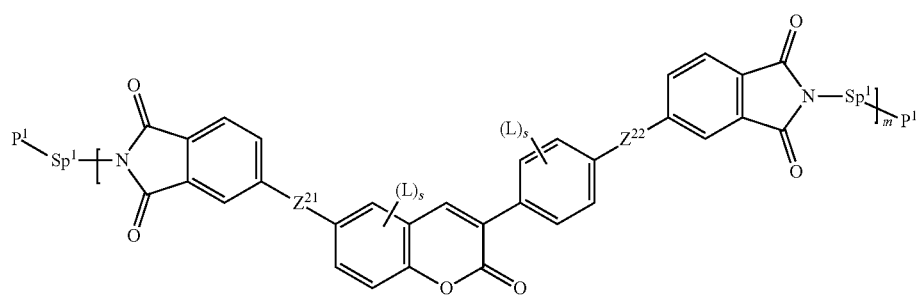
M16
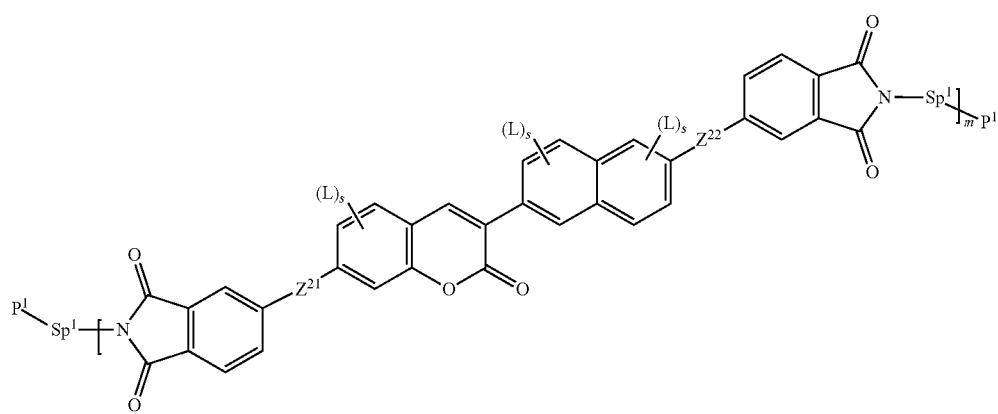

-continued
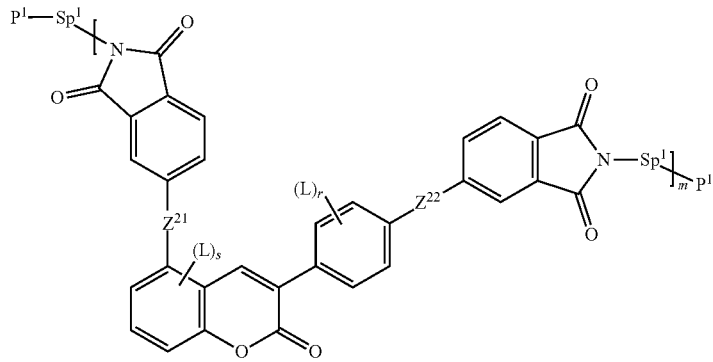
M17
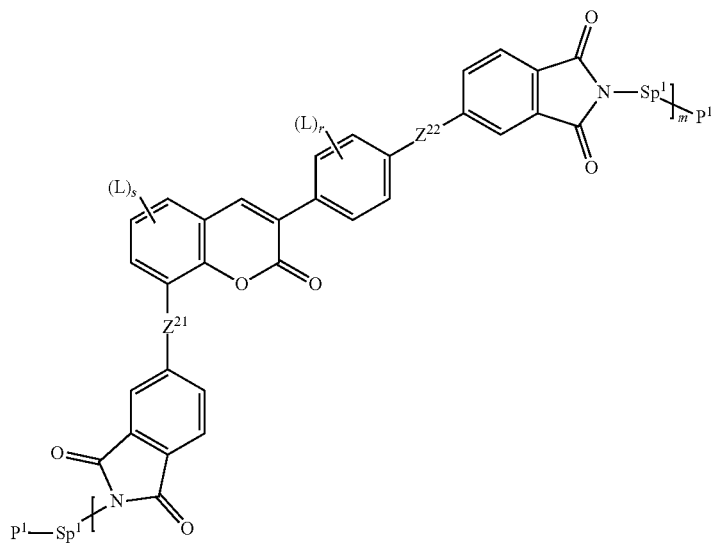
M18
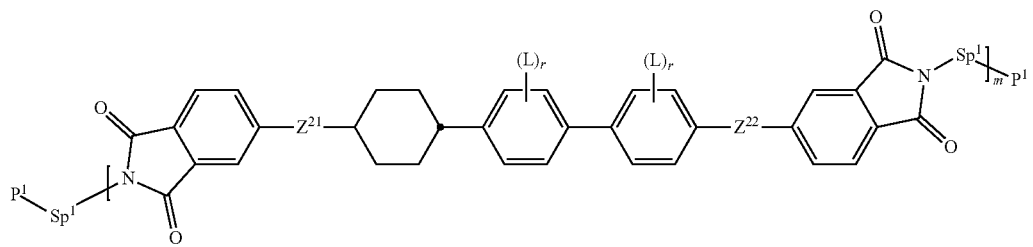
M19
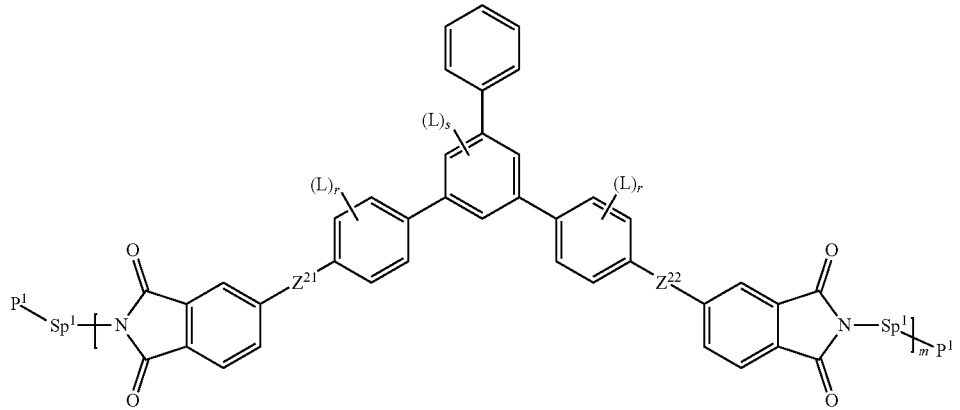
M20

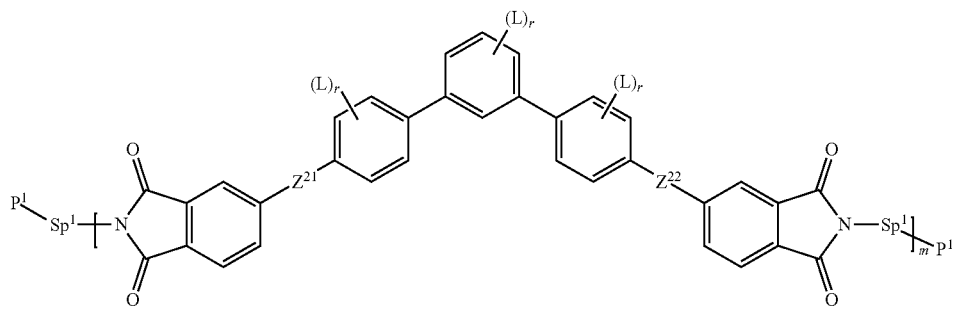
M21
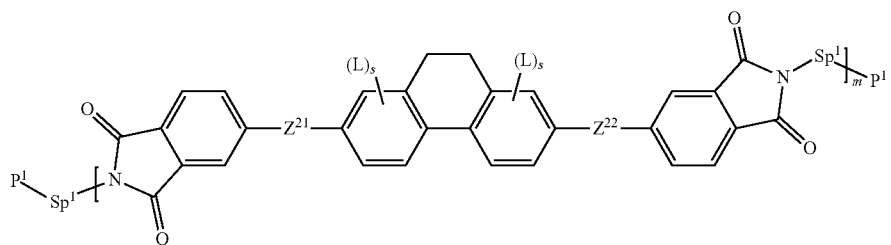
M22
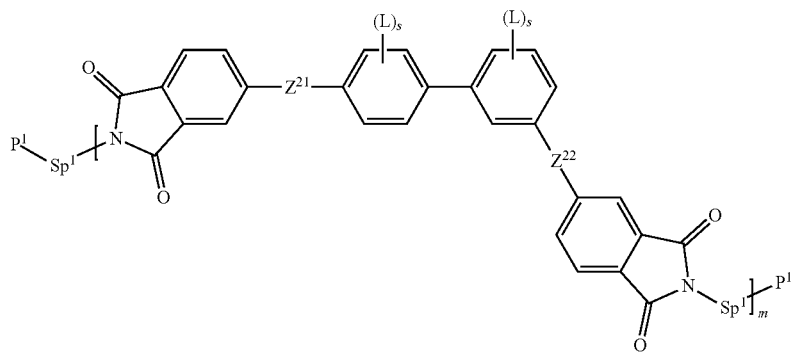
M23
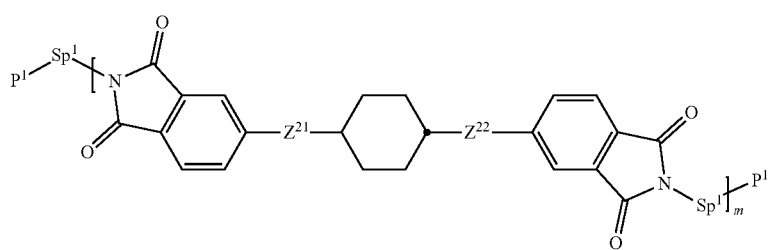
M24
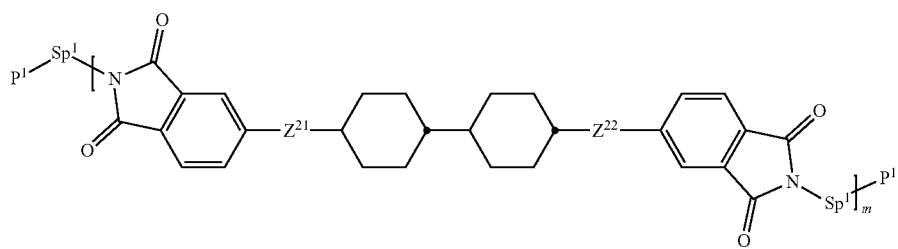
M25

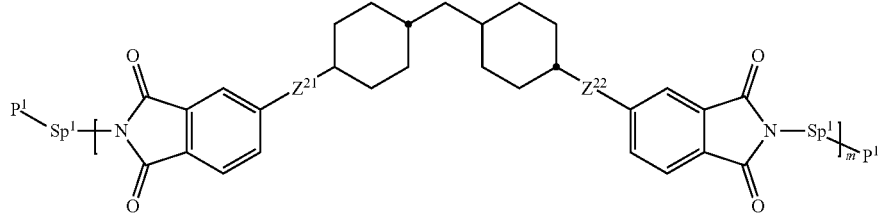
M26
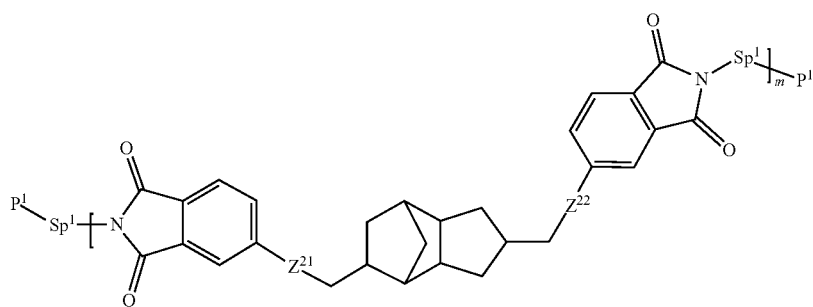
M27
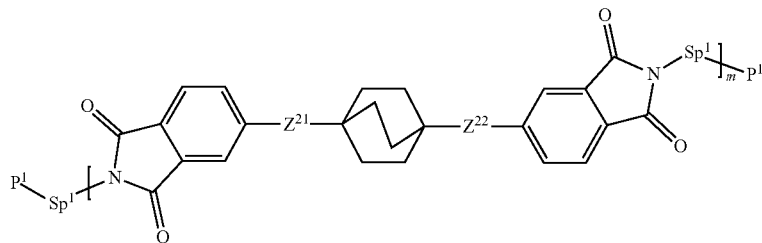
M28
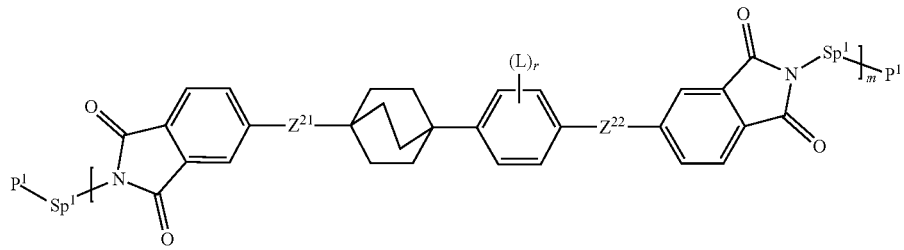
M29
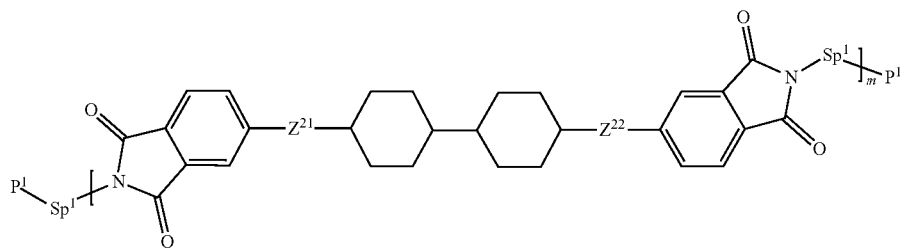
M30
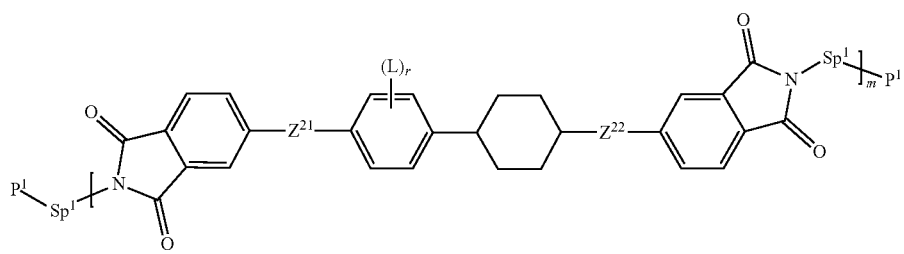
M31

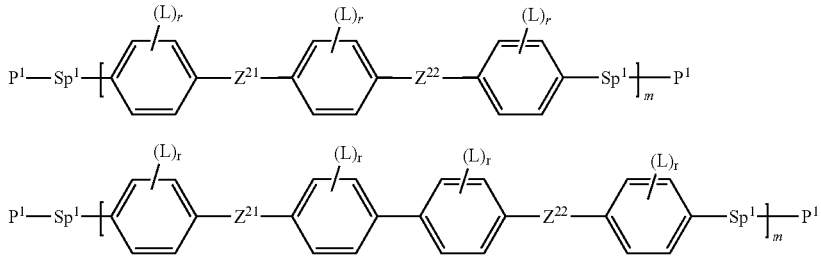

M32

M33 where the radicals and indices have the following meanings:

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)Rx, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, preferably 1 to 12 C atoms, wherein one or more H atoms are optionally replaced by F or Cl, preferably F, —CN or straight chain or branched chain alkyl, alkoxy, alkylcarbonyl, alkoxycarbonyl, alkylcarbonyloxy or alkoxycarbonyloxy with 1 to 6 C atoms;

R$^{xx}$ and R$^{yy}$ independently of each other denote H or alkyl with 1 to 12 C atoms;

r is 0, 1, 2, 3 or 4;
s is 0, 1, 2 or 3;
t is 0, 1 or 2;

Z$^{21}$ and Z$^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —C≡C—, —CH=CH—COO—, —OCO—CH=CH—, or a single bond, preferably —COO—, —OCO—, —CO—O—, —O—CO—, —OCH$_2$—, —CH$_2$O—, —CH$_2$CH$_2$—, —(CH$_2$)$_4$—, —CF$_2$CH$_2$—, —CH$_2$CF$_2$—, —CF$_2$CF$_2$—, —C≡C—, —CH=CH—COO—, —OCO—CH=CH—, or a single bond;

R$^{01}$ and R$^{02}$ each, independently of one another, denote H or alkyl having 1 to 12 C atoms;

Sp$^1$ denotes at each occurrence a space group (Sp) as defined above or a single bond;

P$^1$ denotes

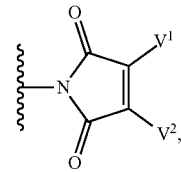

where V$^1$ is H, and V$^2$ is alkyl with 1 to 6 carbon atoms, F, Cl or CN; or V$^1$ and V$^2$ are independently of one another alkyl with 1 to 6 carbon atoms, F, Cl or CN; and m is an integer from 1 to 60, preferably from 1 to 50, more preferably from 2 to 30, and most preferably from 3 to 20.

More preferred compounds according to Formula (1) are:

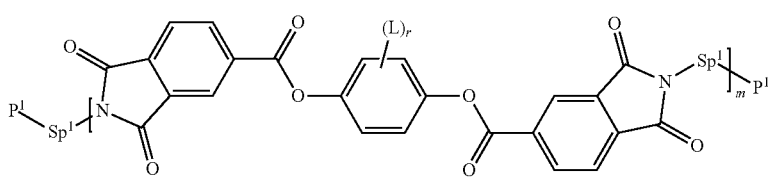

M1a

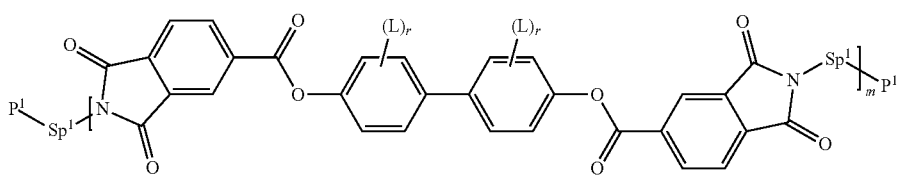

M2a

-continued
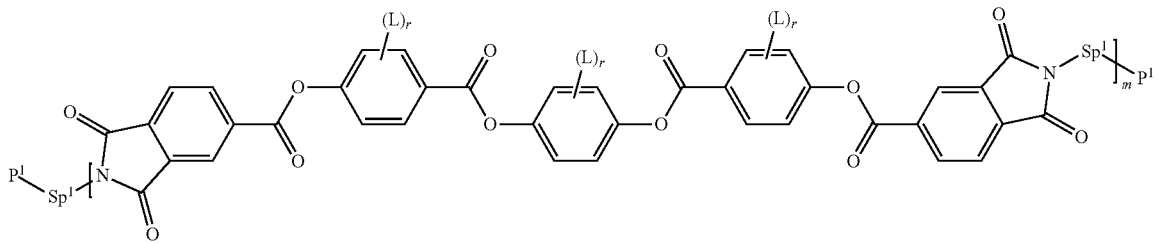
M8a
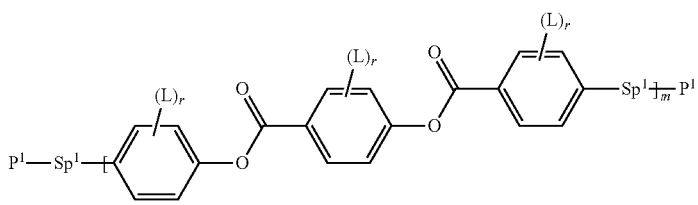
M32a
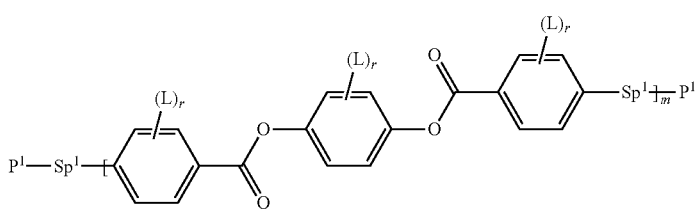
M32b
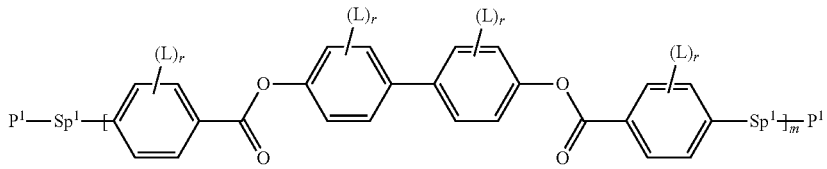
M33a
where the radicals and indices have one of the meanings as defined above.
Particularly preferred compounds according to Formula (1) are:
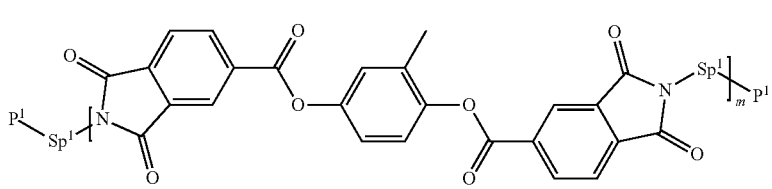
M1b
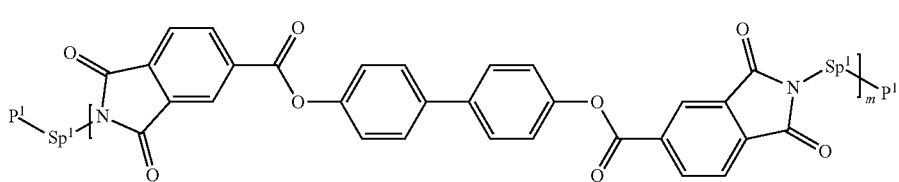
M2b
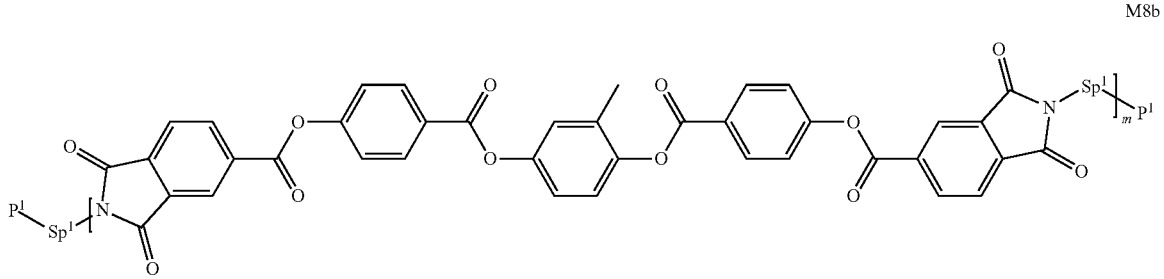
M8b

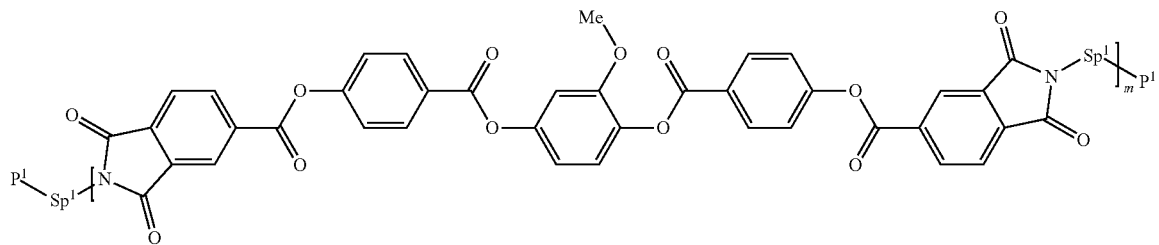
M8c
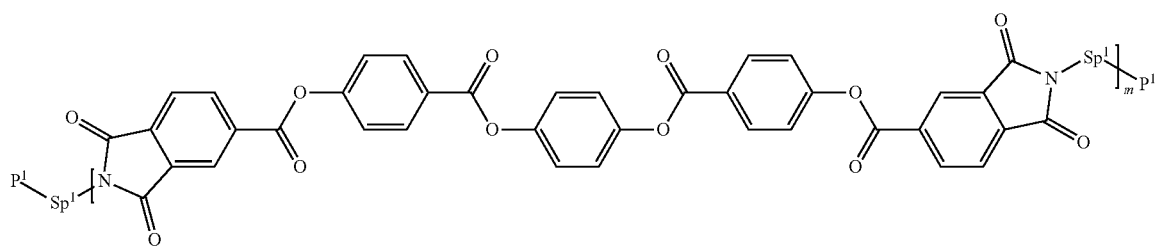
M8d
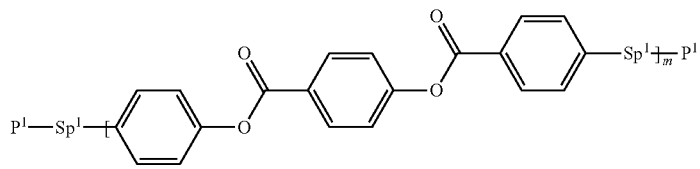
M32c
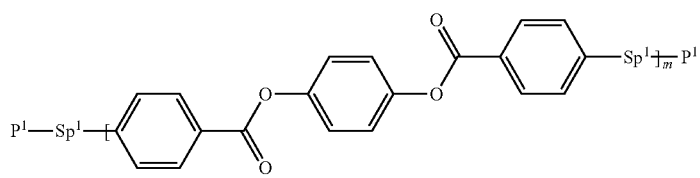
M32d
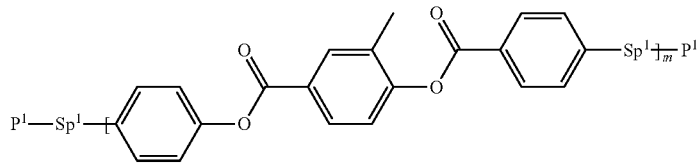
M32e
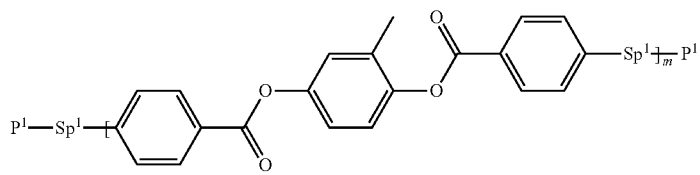
M32f
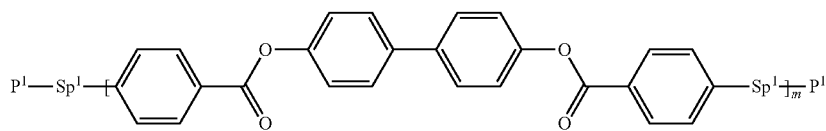
M33b
where the radicals and indices have one of the meanings as defined above.

Most preferred compounds according to Formula (1) are:
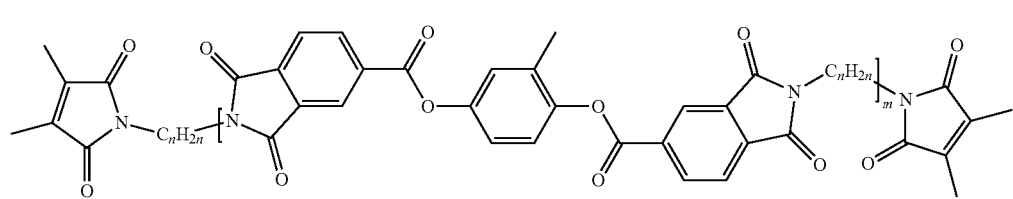
M1c
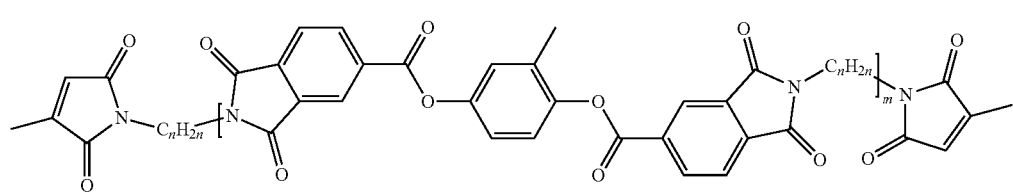
M1c'
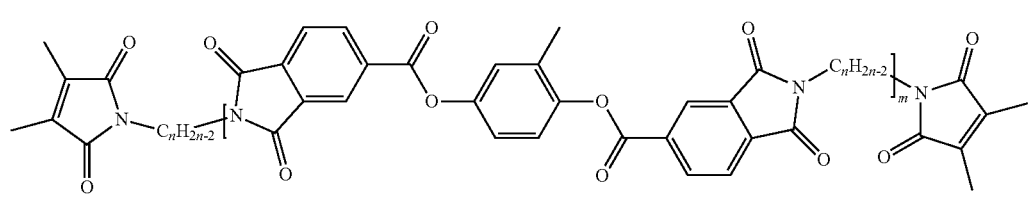
M1d
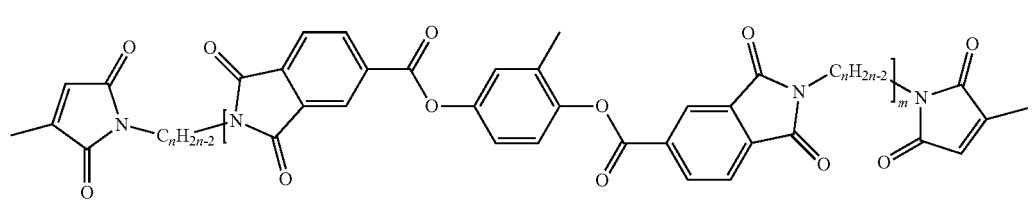
M1d'
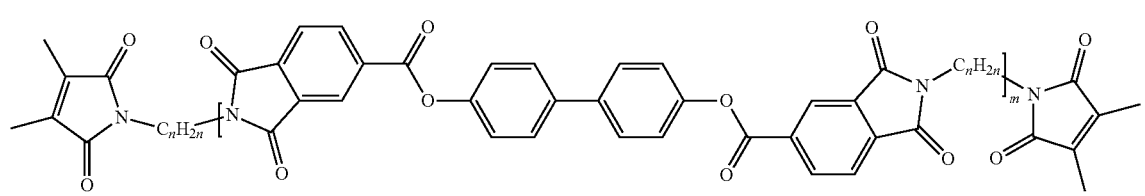
M2c
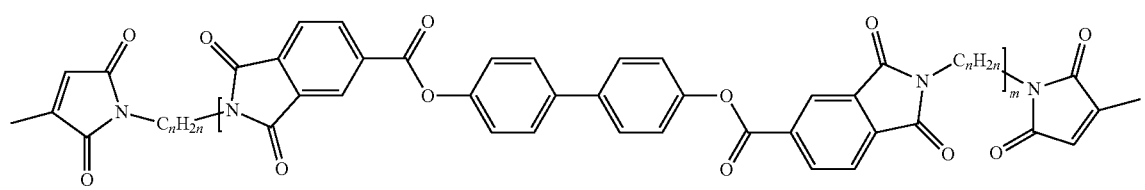
M2c'
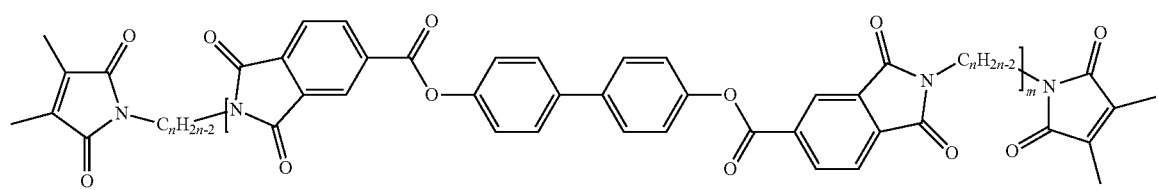
M2d

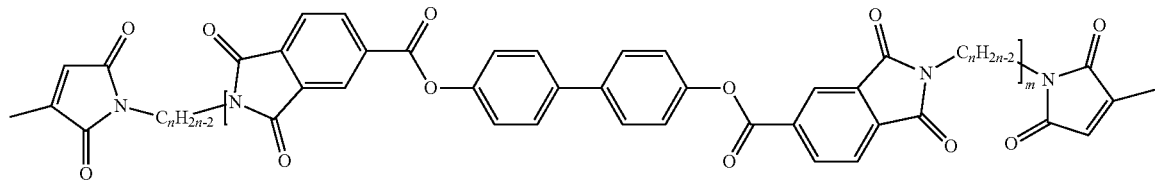
M2d′
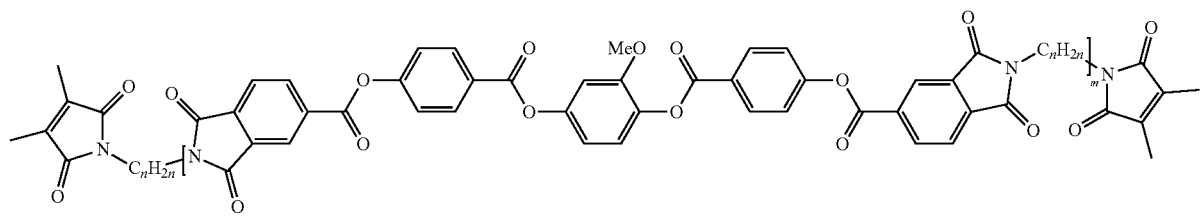
M8d
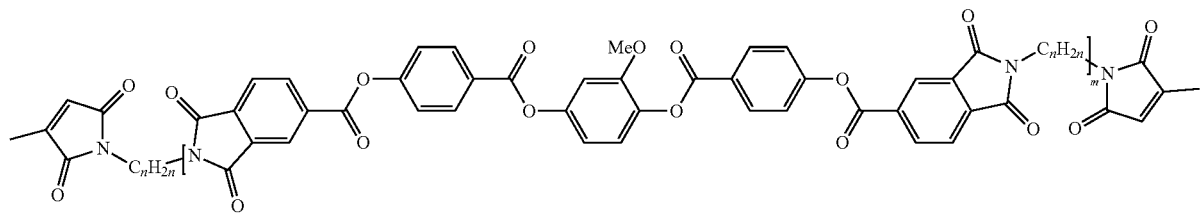
M8d′
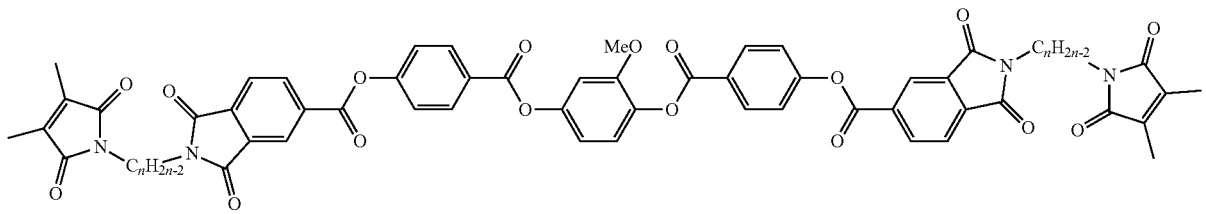
M8e
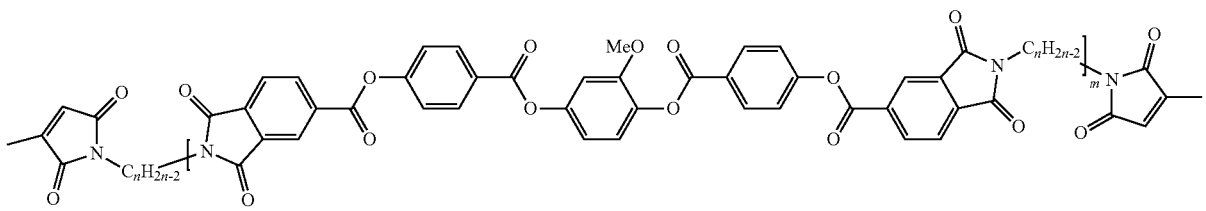
M8e′
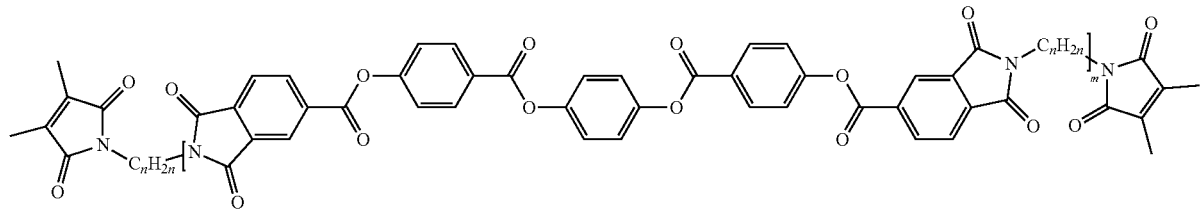
M8f -continued
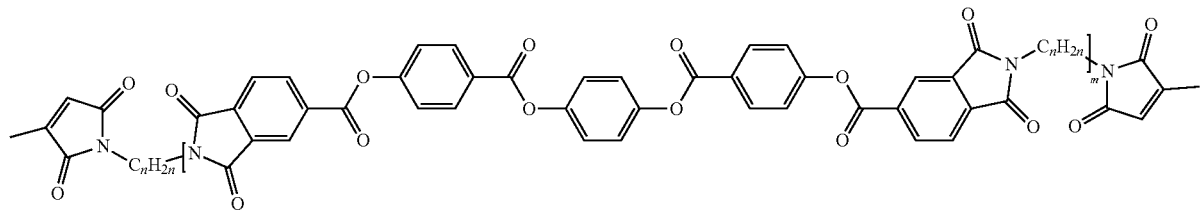
M8f′
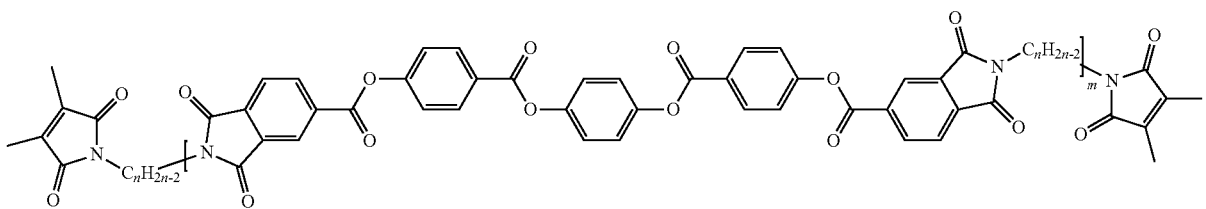
M8g
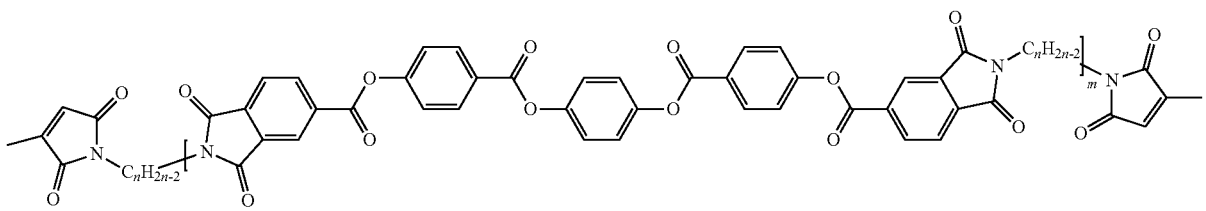
M8g′
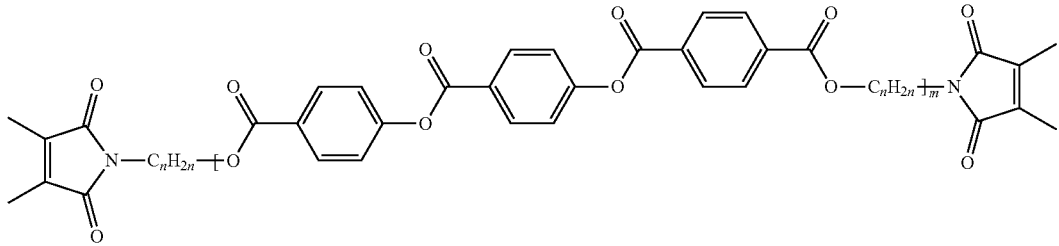
M32g
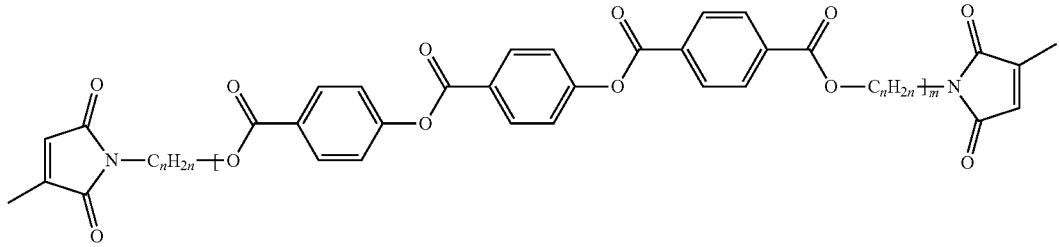
M32g′
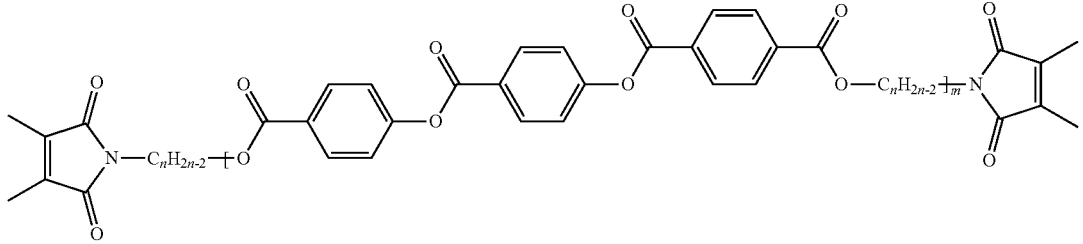
M32h

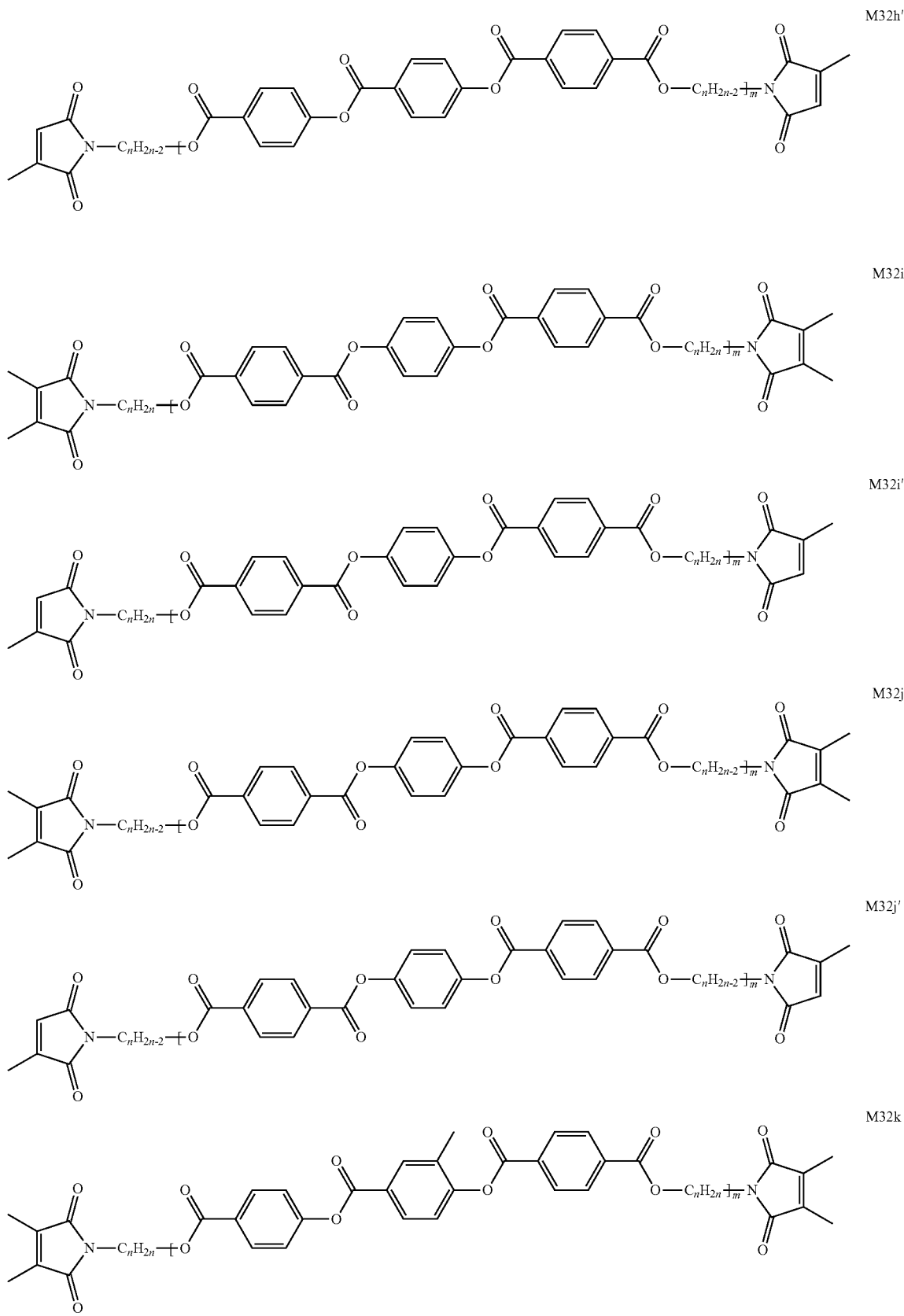

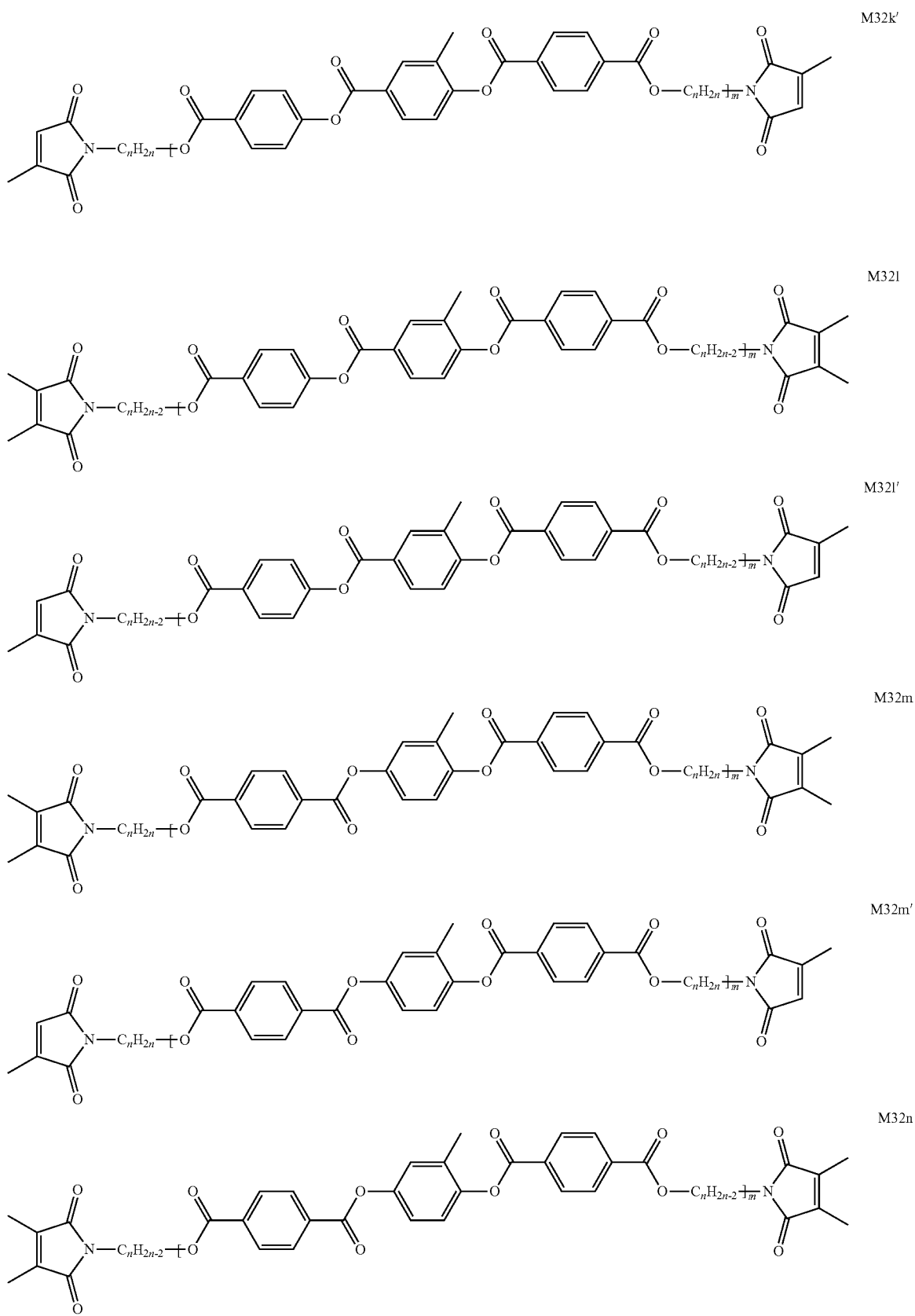

-continued
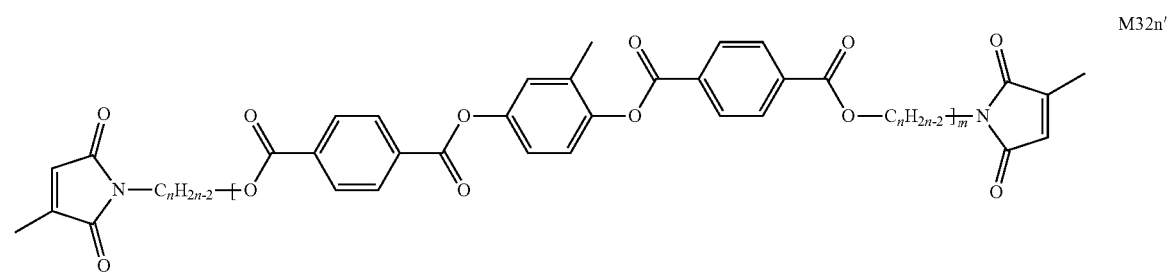
M32n'
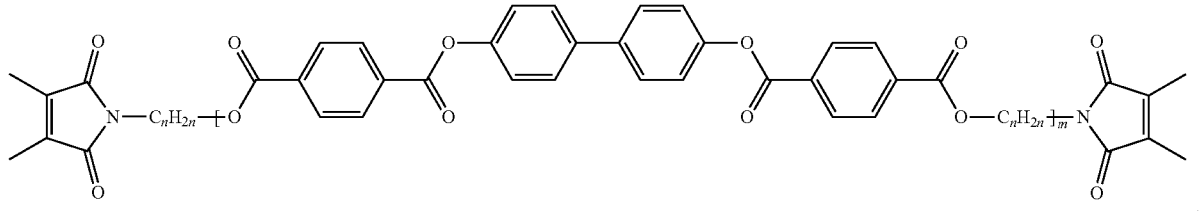
M33c
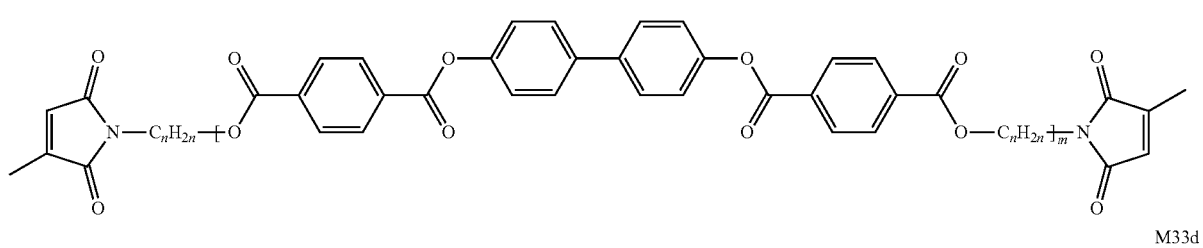
M33c'
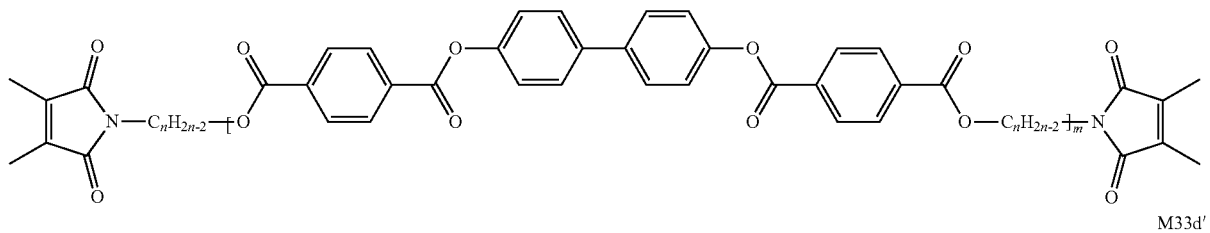
M33d
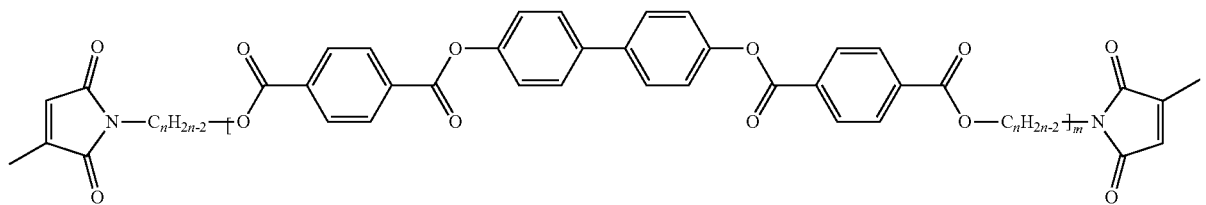
M33d'
wherein
n is an integer from 1 to 60, preferably from 1 to 36, and more preferably from 6 to 12; and
m is an integer from 1 to 60, preferably from 1 to 50, more preferably from 2 to 30, and most preferably from 3 to 20.
In the compounds of formulae M1 to M33 and the corresponding sub-formulae, the ring group
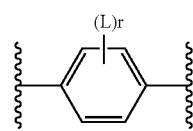
is preferably
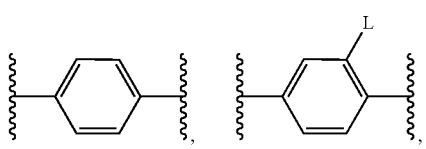
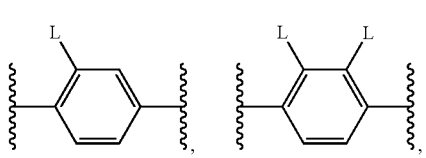

-continued

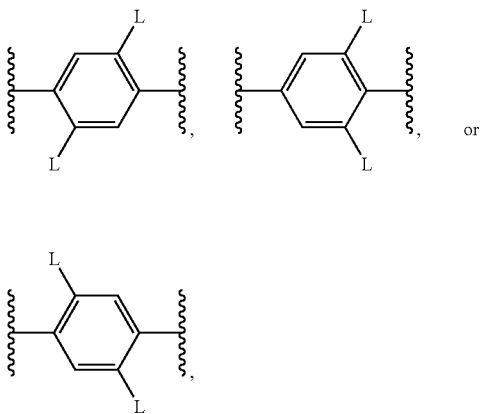

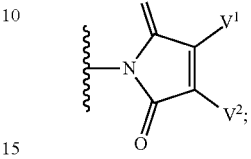

wherein

L is at each occurrence independently from each other F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain or branched chain alkyl, alkoxy, alkylcarbonyl, alkoxycarbonyl, alkylcarbonyloxy or alkoxycarbonyloxy with 1 to 20 C atoms, preferably 1 to 12 C atoms, wherein one or more H atoms are optionally replaced by F or Cl, preferably F, —CN or straight chain or branched chain alkyl, alkoxy, alkylcarbonyl, alkoxycarbonyl, alkylcarbonyloxy or alkoxycarbonyloxy with 1 to 6 C atoms; and R$^{xx}$ and R$^{yy}$ are defined according to the definitions given above.

The compounds represented by Formula (1) can be prepared by any standard synthesis. Usually, the compound is retrosynthetically cut into smaller units and formed stepwise from suitable precursor compounds. For this purpose, known standard reactions can be used. It has proven to be particularly advantageous to attach the 3-substituted or 3,4-disubstituted maleimide groups P$^1$ at a late stage of the synthesis, typically at the very last step of the synthesis. By doing so, undesirable side-reactions or premature polymerization of the compound can be avoided.

Preferably, a precursor represented by Formula (3):

X-Sp$^1$-(MG-Sp$^1$)$_m$-X      Formula (3)

is reacted with

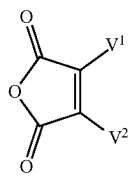

to form a polymerizable compound represented by Formula (1):

P$^1$—Sp$^1$-(MG-Sp$^1$)$_m$-P$^1$      Formula (1)

wherein X is NH$_2$;
P$^1$ is

and
V$^1$, V$^2$, Sp$^1$, MG, and m have one of the definitions as given above.

The second monomer comprised in the polymerizable mixture according to the present invention is one or more, preferably one, two, three or four, bi- or multifunctional compound(s) capable of reacting with the first monomer to give a copolymer.

It is preferred that the second monomer is one or more, preferably one, two, three or four, bi- or multifunctional compound(s) selected from organic compounds, polyhedral-silsesquioxane compounds and functionalized inorganic nanoparticles.

It is further preferred that the second monomer is one or more, preferably one, two, three or four, bi- or multifunctional compound(s) comprising two or more polymerizable groups (P) (reactive groups) which are selected from groups containing a C=C double bond, which preferably react with P$^1$ in a radical or ionic chain polymerization or in a 2+2 cycloaddition, groups containing two conjugated C=C double bonds, which preferably react with P$^1$ in a 4+2 cycloaddition (Diels-Alder reaction), nucleophilic groups, which preferably react with P$^1$ in a nucleophilic addition (Michael reaction), and 1,3-dipolar groups, which preferably react with P$^1$ in a 1,3-dipolar cycloaddition.

Preferred groups containing a C=C double bond are selected from:
CH$_2$=CW$^1$—COO—, CH$_2$=CW$^1$—CO—,

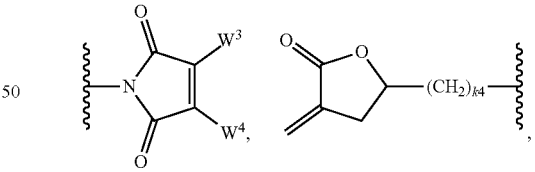

CH$_2$=CW$^2$—(O)$_{k3}$—,    CW$^1$$_2$=CH—CO—(O)$_{k3}$—,
CW$^1$$_2$=CH—CO—NH—,    CH$_2$=CW$^1$—CO—NH—,
CH$_3$—CH=CH—O—,    CH$_2$=CH—CH$_2$—O—,
(CH$_2$=CH)$_2$CH—O—CO—,    (CH$_2$=CH—CH$_2$)$_2$CH—O—CO—,    (CH$_2$=CH)$_2$CH—O—,    (CH$_2$=CH—CH$_2$)$_2$N—,    (CH$_2$=CH—CH$_2$)$_2$N—CO—,
CH$_2$=CW$^1$—CO—NH—,    CH$_2$=CH—(CO—O)$_{k1}$-Phe-(O)$_{k2}$—,    CH$_2$=CH—(CO)$_{k1}$-Phe-(O)$_{k2}$—, or Phe-CH=CH—; wherein W$^1$ denotes H, F, Cl, CN, CF$_3$, phenyl or alkyl having 1 to 5 C atoms, preferably H or CH$_3$;
W$^2$ denotes H or alkyl having 1 to 5 C atoms, preferably H or CH$_3$;

$W^3$ and $W^4$ each, independently of one another, denote H, Cl or alkyl having 1 to 5 C atoms, preferably H or $CH_3$;

Phe denotes 1,4-phenylene, which is optionally substituted by one or more radicals L as being defined above; and $k_1$, $k_2$ and $k_3$ each, independently of one another, denote 0 or 1; and $k_4$ is an integer from 1 to 10.

Preferred groups containing two conjugated C=C double bonds are selected from: $CW^1{}_2$=$CW^1$—$CW^1$=$CW^1$—; wherein $W^1$ denotes H, F, Cl, CN, $CF_3$, phenyl or alkyl having 1 to 5 C atoms, preferably H or $CH_3$.

Preferred nucleophilic groups are selected from: HS—$(CH_2)_{k5}$—CO—$(O)_{k3}$—, HS—$(CH_2)_{k5}$—CO—, HS—$(CH_2)_{k5}$—$(O)_{k3}$—, HS—$(CH_2)_{k5}$—O—CO—, HS—$(CH_2)_{k5}$—CO—NH—, HS—$(CH_2)_{k5}$—NH—CO—, HS-Phe-$(O)_{k2}$—, $H_2N$—$(CH_2)_{k5}$—CO—$(O)_{k3}$—, $H_2N$—$(CH_2)_{k5}$—CO—, $H_2N$—$(CH_2)_{k5}$—$(O)_{k3}$—, $H_2N$—$(CH_2)_{k5}$—O—CO—, $H_2N$—$(CH_2)_{k5}$—CO—NH—, $H_2N$—$(CH_2)_{k5}$—NH—CO—, or $H_2N$-Phe-$(O)_{k2}$—; wherein $k_2$ and $k_3$ each, independently of one another, denote 0 or 1; and $k_5$ is an integer from 0 to 10, preferably from 0 to 5, more preferably 0, 1 or 2.

Preferred 1,3-dipolar groups are selected from:

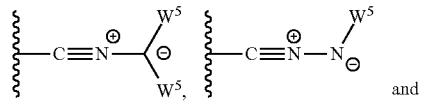
(nitrile ylide)

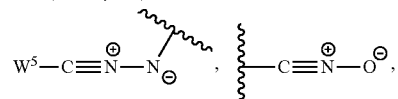 and
(nitrile imide)          (nitrile oxide)

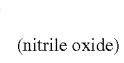
(diazo compound)          (azide)

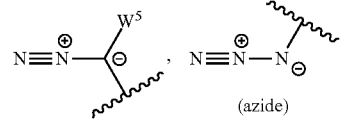 and
(azomethine ylides)

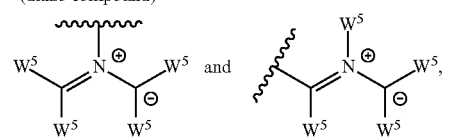 and
(azomethine imides)

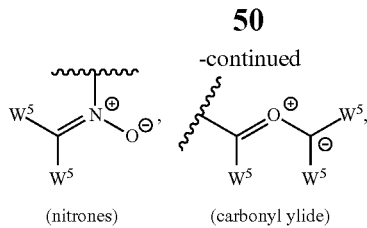
(nitrones)          (carbonyl ylide)

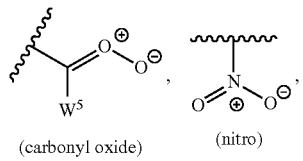
(carbonyl oxide)          (nitro)

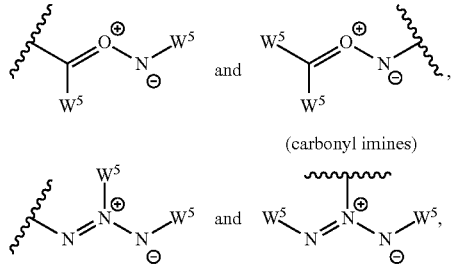 and
(carbonyl imines)

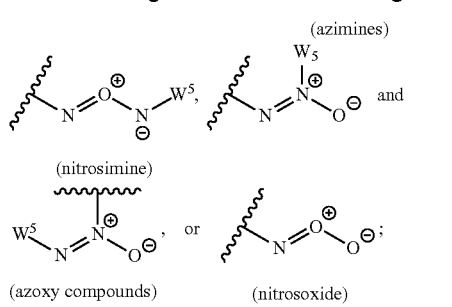
(azimines)

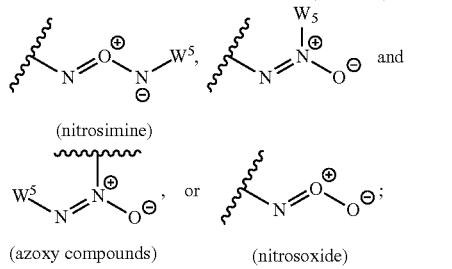 and
(nitrosimine)

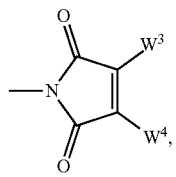 or
(azoxy compounds)          (nitrosoxide)

wherein:

$W^5$ denotes at each occurrence independently from each other H, phenyl or alkyl having 1 to 5 C atoms, preferably phenyl or $CH_3$.

Particularly preferred polymerizable groups (P) are selected from:

$CH_2$=$CW^1$—COO—, $CH_2$=$CW^1$—CO—,

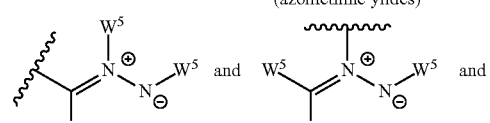

$CH_2$=$CW^2$—$(O)_{k3}$—, $CW^1{}_2$=CH—CO—$(O)_{k3}$—, $CH_3$—CH=CH—O—, $CH_2$=CH—$CH_2$—O—, HS—$(CH_2)_{k5}$—CO—$(O)_{k3}$—, HS—$(CH_2)_{k5}$—CO—, HS—$(CH_2)_{k5}$—$(O)_{k3}$—, HS—$(CH_2)_{k5}$—O—CO—, $H_2N$—$(CH_2)_{k5}$—CO—$(O)_{k3}$—, $H_2N$—$(CH_2)_{k5}$—CO—, $H_2N$—$(CH_2)_{k5}$—$(O)_{k3}$—, or $H_2N$—$(CH_2)_{k5}$—O—CO—; wherein $W^1$ denotes H, F, Cl, CN, $CF_3$, phenyl or alkyl having 1 to 5 C atoms, preferably H or $CH_3$;

$W^2$ denotes H or alkyl having 1 to 5 C atoms, preferably H or $CH_3$;

$W^3$ and $W^4$ each, independently of one another, denote H, Cl or alkyl having 1 to 5 C atoms, preferably H or $CH_3$;

$k_3$ denotes 0 or 1; and $k_5$ is an integer from 0 to 10, preferably from 0 to 5, more preferably 0, 1 or 2.

Preferred organic compounds to be used as second monomer are represented by Formula (4):

Formula (4)

wherein:

Q denotes a hydrocarbon group having 1 to 50 carbon atoms, preferably 1 to 30 carbon atoms, which may be optionally substituted with one or more substituents L, wherein L is as defined above, and which may optionally contain one or more hetero atoms selected from N, O and S;

$P^2$ denotes a polymerizable group (P) as defined above; and x is an integer from 2 to 10, preferably from 2 to 4, more preferably x=2.

As it is apparent from Formula (4), the group 0 has x binding sites, each of which binds one of the x polymerizable groups $P^2$.

In a preferred embodiment Q is represented by $O(Sp^2)_2$, $N(Sp^2)$ $NH(Sp^2)_2$, $C(Sp^2)_4$, $CH(Sp^2)_3$, or $CH_2(Sp^2)_2$, wherein is $Sp^2$ is a linear alkylene chain having 1 to 20 carbon atoms, preferably 1 to 10 carbon atoms, a branched alkylene chain having 3 to 20 carbon atoms, preferably 3 to 10 carbon atoms, or an aromatic or heteroaromatic moiety having 3 to 14 carbon atoms, preferably an aromatic moiety having 6 to 14 carbon atoms, wherein each $Sp^2$ is bound to a polymerizable group $P^2$.

In a further preferred embodiment Q is represented by "Ar-$Sp^3$-Ar", wherein Ar is an aromatic or heteroaromatic moiety having 3 to 14 carbon atoms, preferably an aromatic moiety having 6 to 14 carbon atoms, and $Sp^3$ is a linear alkylene chain having 1 to 20 carbon atoms, preferably 1 to 10 carbon atoms, a branched alkylene chain having 3 to 20 carbon atoms, preferably 3 to 10 carbon atoms, or an aromatic or heteroaromatic moiety having 3 to 14 carbon atoms, preferably an aromatic moiety having 6 to 14 carbon atoms, wherein each Ar is bound to a polymerizable group $P^2$.

In a further preferred embodiment Q is represented by "$Sp^4$-Y-$Sp^4$", wherein Y is a mono- or polycyclic alkane moiety having 3 to 20 carbon atoms, preferably 3 to 10 carbon atoms, and $Sp^4$ is absent or a linear alkylene chain having 1 to 20 carbon atoms, preferably 1 to 10 carbon atoms, a branched alkylene chain having 3 to 20 carbon atoms, preferably 3 to 10 carbon atoms, or an aromatic or heteroaromatic moiety having 3 to 14 carbon atoms, preferably an aromatic moiety having 6 to 14 carbon atoms, wherein each $Sp^4$ is bound to a polymerizable group $P^2$.

In a particularly preferred embodiment Q is selected from

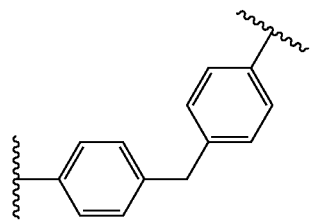

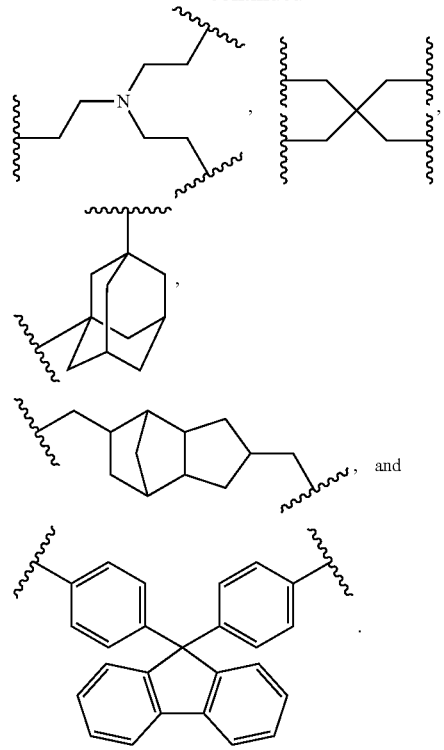

Particularly preferred organic compounds are selected from the group consisting of:

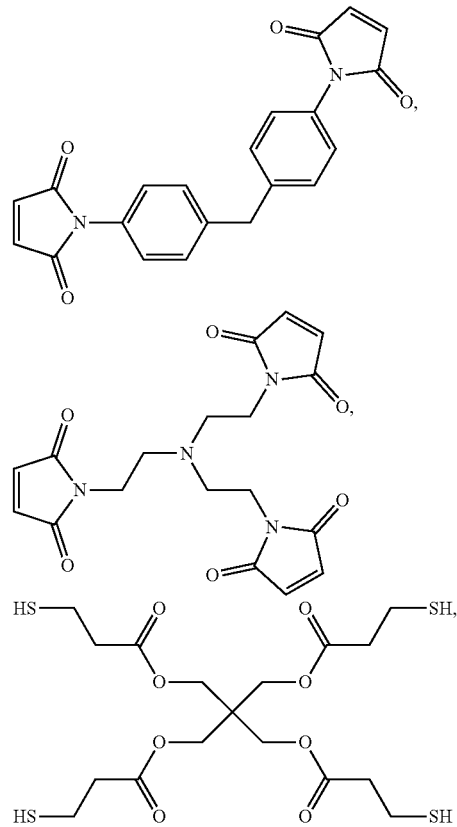

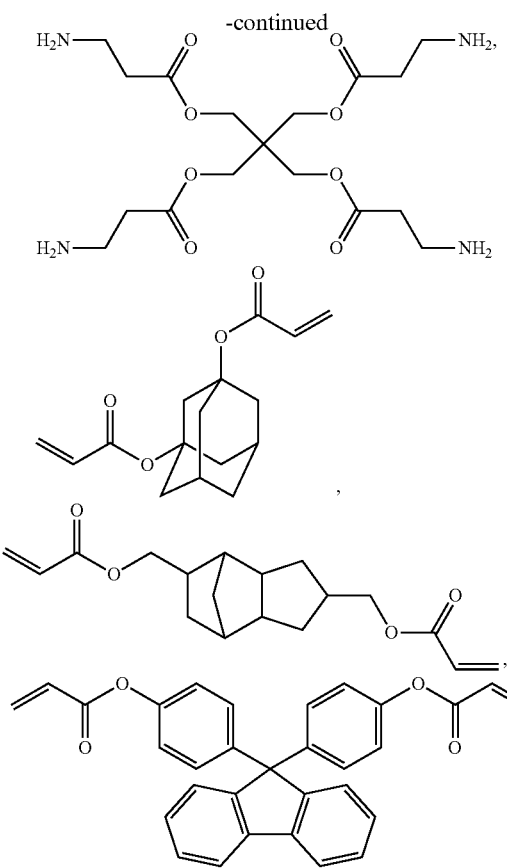

Preferred polyhedralsilsesquioxane compounds to be used as second monomer are represented by the following structure:

(Structure 1)

wherein:
R is H, $C_1$-$C_6$-alkyl, $C_2$-$C_6$-alkenyl, $C_6$-$C_{10}$-aryl, or $C_1$-$C_6$-alkoxy;
L is $C_1$-$C_{12}$-alkylene or $C_1$-$C_{12}$-oxyalkylene, more preferably $C_1$-$C_6$-alkylene or $C_1$-$C_6$-oxyalkylene, wherein one or more non-adjacent C atoms may be replaced, independently of one another, by —$SiR^{05}R^{06}$—, wherein $R^{05}$ and $R^{06}$ each, independently of one another, denote H or alkyl having 1 to 6 C atoms, more preferably H, $CH_3$ or $CH_2CH_3$;
$P^2$ denotes a polymerizable group (P) as defined above;
y is an integer from 6 to 12; and x is an integer from 2 to 12, wherein y–x≥0.

Preferred $C_1$-$C_6$-alkyl substituents are: methyl, ethyl, propyl, butyl, pentyl and hexyl.
Preferred $C_2$-$C_6$-alkenyl substituents are: ethenyl, propenyl, butenyl, pentenyl and hexenyl.
Preferred $C_6$-$C_{10}$-aryl substituents are: phenyl, tolyl, xylyl and naphthyl.
Preferred $C_1$-$C_6$-alkoxy substituents are: methoxy, ethoxy, propoxy, butoxy, pentoxy and hexoxy.
Preferred $C_1$-$C_{12}$-alkylene substituents are: methylene, ethylene, propylene, butylene, pentylene and hexylene.

Preferred $C_1$-$C_{12}$-oxyalkylene substituents are: methyleneoxy, ethyleneoxy, propyleneoxy, butyleneoxy, pentyleneoxy and hexyleneoxy.
Preferred $C_1$-$C_4$-alkyl substituents are: methyl, ethyl, propyl and butyl.

In a particularly preferred embodiment, the group L in Structure (1) is selected from the group consisting of —$(CH_2)_n$—, —O—$(CH_2)_n$—, —$SiH_2$—$(CH_2)_n$—, —$OSiH_2$—$(CH_2)_n$—, —$Si(CH_3)_2$—$(CH_2)_n$—, —$OSi(CH_3)_2$—$(CH_2)_n$—, —$Si(CH_2CH_3)_2$—$(CH_2)_n$—, and —$OSi(CH_2CH_3)_2$—$(CH_2)_n$—, wherein n is an integer from 1 to 6, preferably from 2 to 4, more preferably 3.

Particularly preferred polyhedralsilsesquioxane compounds are based on the following Structures 2 to 5, wherein x R substituents are replaced by x (-L-$P^2$):

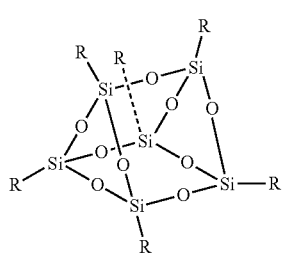
(Structure 2)

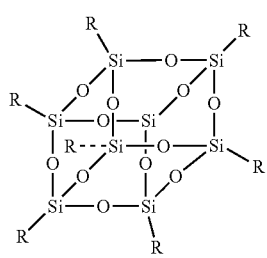
(Structure 3)

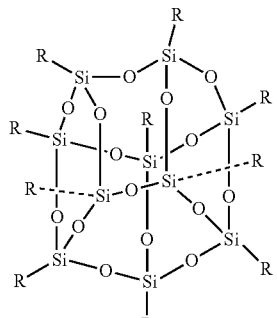
(Structure 4)

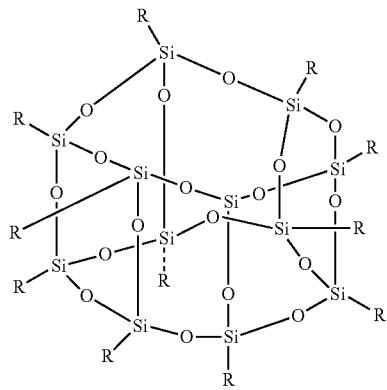
(Structure 5)

wherein R, L and P² have the same meanings as defined above; and wherein x is an integer from 2 to 6 in Structure 2; x is an integer from 2 to 8 in Structure 3; x is an integer from 2 to 10 in Structure 4; and x is an integer from 2 to 12 in Structure 5.

The polyhedralsilsesquioxane compounds shown above can be readily prepared from available precursors, and are easily incorporated into the polymerizable mixture by appropriate mixing conditions. For example, maleimide substituted polyhedralsilsesquioxanes and their preparation are described in US 2006/0009578 A1 the disclosure of which is herewith incorporated by reference.

Preferred functionalized inorganic nanoparticles to be used as second monomer are inorganic nanoparticles which comprise polymerizable groups P² on their surface, wherein P² denotes a polymerizable group (P) as defined above. Preferred polymerizable groups (P) for the functionalized inorganic nanoparticles are selected from maleimide, dimethylmaleimide, acrylate, methacrylate, allyl ether and vinyl ether groups, which are either bound directly or via a group L to the surface of the inorganic nanoparticle.

Preferred functionalized inorganic nanoparticles are represented by Structures 6 and 7 depicted in FIG. 1,
wherein
P² denotes a polymerizable group (P);
L is $C_1$-$C_{12}$-alkylene or $C_1$-$C_{12}$-oxyalkylene, more preferably $C_1$-$C_6$-alkylene or $C_1$-$C_6$-oxyalkylene; and
x is an integer ≥2.

Figure 2:
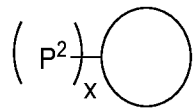
FIG. 2 illustrates preferred functionalized inorganic nanoparticles of Structures 6 and 7.
Figure 2:
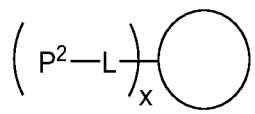
Figure 2:
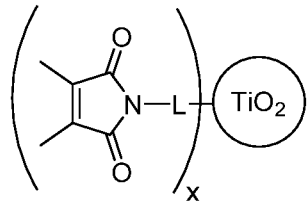
Figure 3:
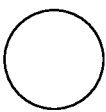
FIG. 3 illustrates preferred functionalized inorganic nanoparticles to be used as second monomer.
Figure 3:
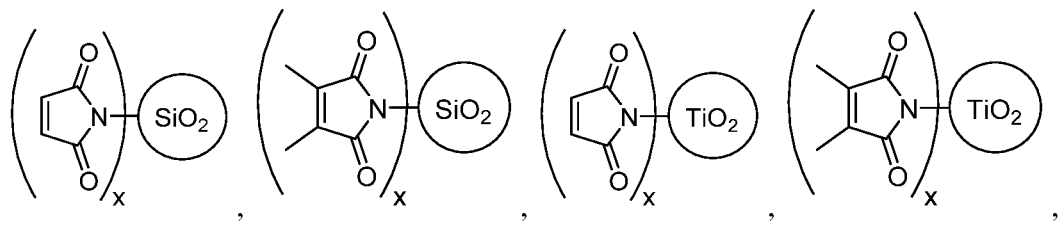
Figure 3:
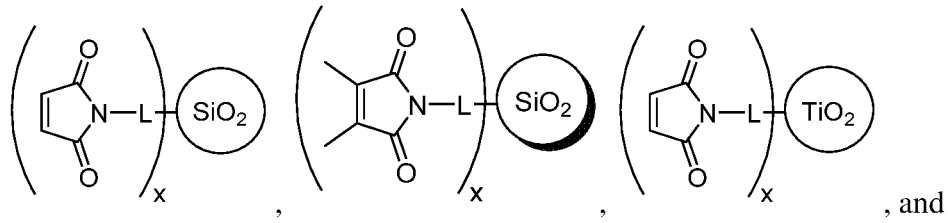

Preferred materials for the inorganic nanoparticles are selected from $SiO_2$, $TiO_2$, $ZrO_2$, $Fe_2O_3$, $MgTiO_3$, $CaTiO_3$, $SrTiO_3$ and $BaTiO_3$. The inorganic nanoparticles may be solid or hollow. Particularly preferred functionalized inorganic nanoparticles to be used as second monomer in the present invention are depicted in FIG. 2,
wherein L and x are defined as above.

The above representations of the functionalized inorganic nanoparticles serve for illustrative purposes only and should not be construed as limiting.

It is preferred that the functionalized inorganic nanoparticles to be used as second monomer in the present invention have a degree of functionalization of 0.001 to 5 mmol/g, more preferably 0.01 to 1 mmol/g and most preferably 0.05 to 0.5 mmol/g. The degree of functionalization indicates the molar amount of polymerizable groups P² per unit mass of the functionalized inorganic nanoparticles.

The degree of functionalization may vary, depending on the conditions for functionalizing the inorganic nanoparticles. The person skilled in the art is able to select suitable conditions for the functionalization of inorganic nanoparticles from literature known procedures, so that individually adapted functionalized nanoparticles with different polymerizable groups and different degrees of functionalization can be prepared. Suitable functionalized inorganic nanoparticles and precursors thereof are also available from commercial sources, such as, for example, from Sigma Aldrich (e.g. 3-aminopropyl functionalized silica, 660442 Aldrich) or nanoComposix, Inc., San Diego, USA.

The present invention further provides a method for forming a copolymer comprising repeating units which are derived from the first monomer and repeating units which are derived from the second monomer. The copolymer is a dielectric copolymer which may be linear or crosslinked.

The method for forming a copolymer comprises the following steps:
(i) providing a polymerizable mixture according to the present invention; and
(ii) polymerizing said polymerizable mixture to obtain a copolymer.

The polymerizable mixture comprises a first monomer and a second monomer as defined above. It is preferred that the total content of the first monomer in the polymerizable mixture is from 50 to 99.9 wt.-%, more preferably from 80 to 99 wt.-% and most preferably from 90 to 95 wt.-%, based on the total weight of polymerizable monomers. It is preferred that the total content of the second monomer in the polymerizable mixture is from 0.1 to 50 wt.-%, more preferably from 1 to 20 wt.-% and most preferably from 5 to 10 wt.-%, based on the total weight of polymerizable monomers.

It is preferred that the polymerizable mixture provided in step (i) is substantially free of solvent. Substantially free of solvent means that the content of total residual solvent in the polymerizable starting material is not more than 10 wt.-%, preferably not more than 5 wt.-%, and more preferably not more than 1 wt.-%, based on the total weight of polymerizable monomers. Alternatively, it is preferred that the polymerizable mixture provided in step (i) comprises one or more solvents, preferably in an amount of more than 10 wt.-%, more preferably in an amount of more than 25 wt.-%, and most preferably in an amount of more than 50 wt.-%, based on the total weight of polymerizable monomers.

It is preferred that the polymerizable mixture is polymerized in step (ii) by a radical or ionic chain polymerization reaction or a polyaddition reaction. Preferred polyaddition reactions are cycloadditions, such as 2+2 cycloadditions, 4+2 cycloadditions (Diels-Alder reactions) or 1,3-dipolar cycloadditions, or nucleophilic additions, such as Michael reactions.

The above-mentioned reaction types and associated reaction conditions (such as e.g. catalysts, solvents, temperature, time, concentration, etc.) are known to the person skilled in the art.

For example, radical or ionic polymerizations may be carried out in the presence of radical or ionic polymerization initiators, which can be activated thermally and/or photochemically. The skilled person is familiar with suitable radical and ionic polymerization initiators. For example, cycloadditions may occur photochemically or in the presence of Lewis acids. The skilled person is familiar with suitable photochemical conditions and suitable Lewis acids.

It is preferred that the polymerizable mixture provided in step (i) further comprises one or more radical initiators. Preferred radical initiators are thermally activated radical initiators and/or photochemically activated radical initiators.

Preferred thermally activated radical initiators are: tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide (CHP), cyclohexanone peroxide, dicumyl peroxide (DCP), lauroyl peroxide, 2,4-pentanedione peroxide, peracetic acid, and potassium persulfate.

Preferred photochemically activated radical initiators are: acetophenone, p-anisil, benzil, benzoin, benzophenone, 2-benzoylbenzoic acid, 4,4'-bis(diethylamino)benzophenone, 4,4'-bis(dimethylamino)benzophenone, benzoin methyl ether, benzoin isopropyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyrophenone, (±)-camphorquinone, 2-chlorothioxanthone, 4,4'-dichlorobenzophenone, 2,2-diethoxyacetophenone, 2,2-Dimethoxy-2-phenylacetophenone, 2,4-diethylthioxanthen-9-one, diphenyl(2,4,6-trimethylbenzoyl)phosphine oxide, 1,4-dibenzoylbenzene, 2-ethylanthraquinone, 1-hydroxycyclohexyl phenyl ketone, 2-hydroxy-2-methylpropiophenone, 2-hydroxy-4'-(2-hydroxyethoxy)-2-methylpropiophenone, 2-isopropylthioxanthone, lithium phenyl(2,4,6-trimethylbenzoyl)phosphinate, 2-methyl-4'-(methylthio)-2-morpholino-propiophenone, 2-isonitrosopropiophenone, 2-phenyl-2-(p-toluenesulfonyloxy)acetophenone, and phenylbis(2,4,6-trimethylbenzoyl) phosphine oxide. Typically, such initiators are radical polymerization initiators which may be photochemically activated.

Further preferred photochemically activated radical initiators are:

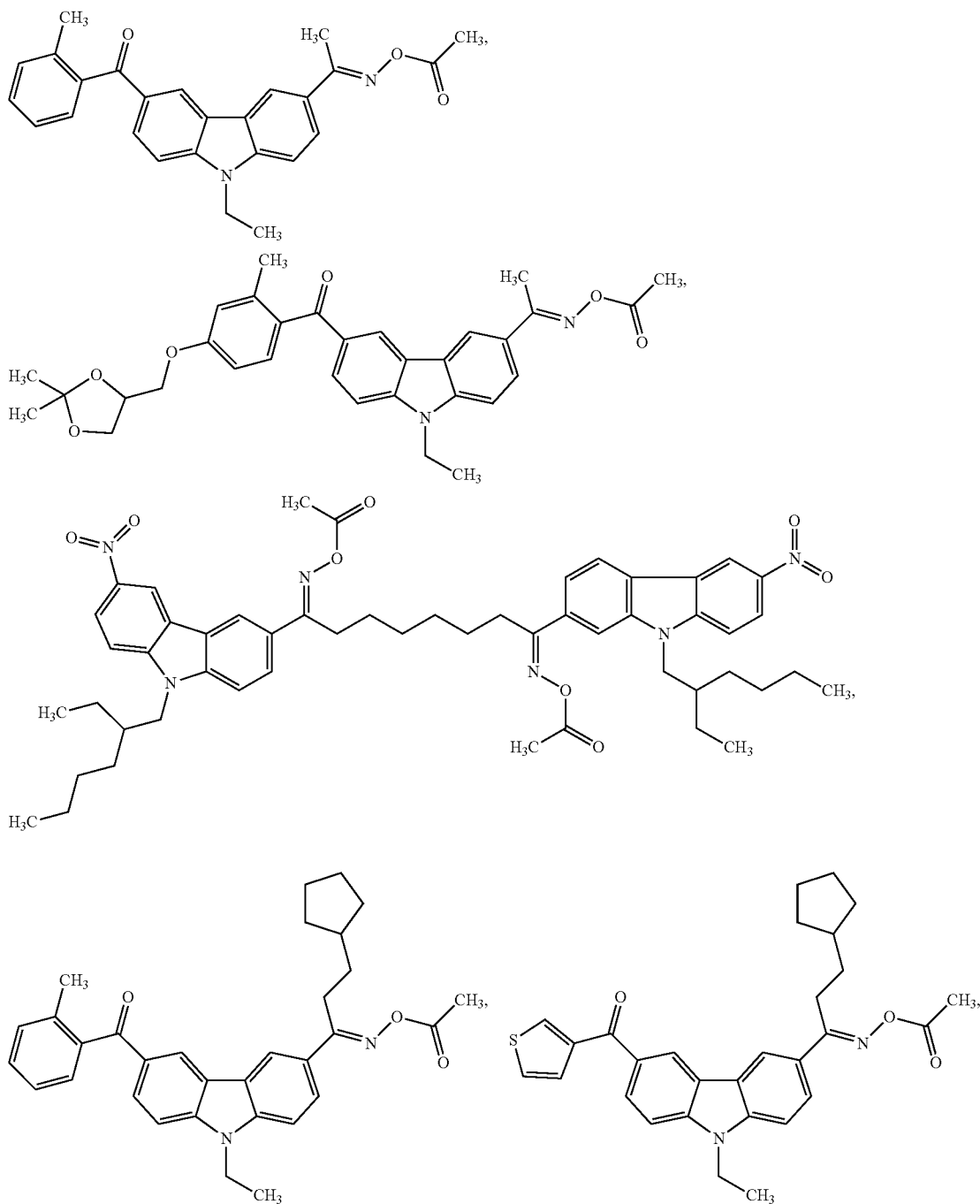

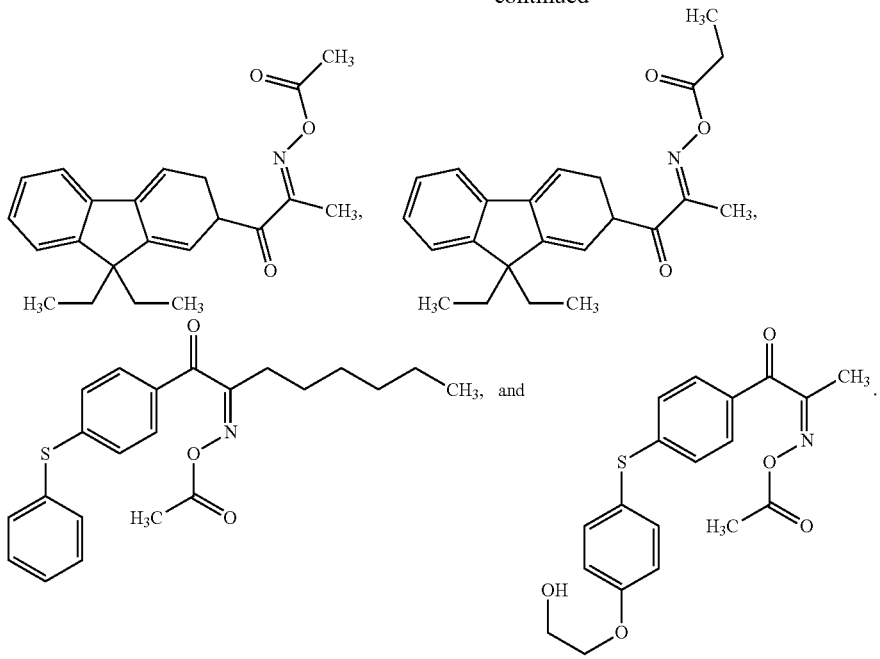

-continued

Preferably, the initiators for radical polymerization are activated thermally by exposure to heat or photochemically by exposure to radiation such as UV and/or visible light.

Exposure to heat involves exposure to an elevated temperature, preferably in the range from 40 to 200° C., more preferably 50 to 180° C.

Exposure to radiation involves exposure to visible light and/or UV light. It is preferred that the visible light is electromagnetic radiation with a wavelength from >380 to 780 nm, more preferably from >380 to 500 nm. It is preferred that the UV light is electromagnetic radiation with a wavelength of s 380 nm, more preferably a wavelength from 100 to 380 nm. More preferably, the UV light is selected from UV-A light having a wavelength from 315 to 380 nm, UV-B light having a wavelength from 280 to 315 nm, and UV-C light having a wavelength from 100 to 280 nm.

As UV light sources Hg-vapor lamps or UV-lasers are possible, as IR light sources ceramic-emitters or IR-laser diodes are possible and for light in the visible area laser diodes are possible.

Preferred UV light sources are light sources having a) a single wavelength radiation with a maximum of <255 nm such as e.g. 254 nm and 185 nm Hg low-pressure discharge lamps, 193 nm ArF excimer laser and 172 nm Xe2 layer, or b) broad wavelength distribution radiation with a wavelength component of <255 m such as e.g. non-doped Hg low-pressure discharge lamps.

In a preferred embodiment of the present invention the light source is a xenon flash light. Preferably, the xenon flash light has a broad emission spectrum with a short wavelength component going down to about 200 nm.

It is preferred that the polymerization in step (ii) takes place in a time range of up to 5 h, more preferably up to 1 h, most preferably up to 0.5 h.

It is further preferred that the polymerization of the polymerizable mixture in step (ii) takes place at elevated temperature, preferably at a temperature in the range from 25 to 200° C., more preferably at a temperature in the range from 25 to 150° C.

There is further provided a copolymer which is obtainable or obtained by the above-mentioned method for forming a copolymer according to the present invention. The copolymer is preferably a linear or crosslinked copolymer, more preferably a linear copolymer.

There is also provided a copolymer which comprises at least one repeating unit derived from the first monomer and at least one repeating unit derived from the second monomer as defined above.

More preferably, the repeating unit derived from the first monomer in said copolymer comprises a structural unit represented by the following Formula (5):

   Formula (5)

wherein Sp, MG and m have one of the above-mentioned definitions.

Preferably, the copolymers according to the present invention have a molecular weight $M_w$, as determined by GPC, of at least 2,000 g/mol, more preferably of at least 4,000 g/mol, even more preferably of at least 5,000 g/mol. Preferably, the molecular weight M, of the copolymers is less than 50,000 g/mol. More preferably, the molecular weight M, of the copolymers is in the range from 5,000 to 20,000 g/mol.

Moreover, there is provided an electronic device comprising a copolymer according to the present invention. For the electronic device it is preferred that the copolymer forms a dielectric layer, more preferably a dielectric layer forming part of a redistribution layer. The dielectric layer serves to electrically separate one or more electronic components being part of the electronic device from each other.

Finally, there is provided a manufacturing method for preparing a packaged microelectronic structure, in which a substrate is provided with a dielectric layer, wherein the method comprises the following steps:
(1) applying a polymerizable mixture according to the present invention to a surface of a substrate; and
(2) curing said polymerizable mixture to form a dielectric layer.

It is preferred that the polymerizable mixture further comprises one or more inorganic filler materials. Preferred inorganic filler materials are selected from nitrides, titanates, diamond, oxides, sulfides, sulfites, sulfates, silicates and carbides which may be optionally surface-modified with a capping agent. More preferably, the filler material is selected from the list consisting of AlN, $Al_2O_3$, BN, $BaTiO_3$, $B_2O_3$, $Fe_2O_3$, $SiO_2$, $TiO_2$, $ZrO_2$, PbS, SiC, diamond and glass particles.

Preferably, the total content of the inorganic filler material in the polymerizable mixture is in the range from 0.001 to 90 wt.-%, more preferably 0.01 to 70 wt.-% and most preferably 0.01 to 50 wt.-%, based on the total weight of the polymerizable mixture.

It is preferred that the polymerizable mixture applied in step (1) is substantially free of solvent. Substantially free of solvent means that the content of total residual solvent in the polymerizable mixture is not more than 10 wt.-%, preferably not more than 5 wt.-%, and more preferably not more than 1 wt.-%, based on the total weight of polymerizable monomers.

However, depending on which kind of application method is used for applying the polymerizable mixture in step (1), it is preferred that the polymerizable mixture comprises one or more solvents, preferably in an amount of more than 10 wt.-%, more preferably in an amount of more than 25 wt.-%, and most preferably in an amount of more than 50 wt.-%, based on the total weight of polymerizable monomers.

The method by which the polymerizable mixture is applied in step (1) is not particularly limited. Preferred application methods for step (1) are dispensing, dipping, screen printing, stencil printing, roller coating, spray coating, slot coating, spin coating, stereolithography, gravure printing, flexo printing or inkjet printing.

The polymerizable mixtures of the present invention may be provided in the form of a formulation suitable for gravure printing, flexo printing and/or inkjet printing. For the preparation of such formulations, ink base formulations as known from the state of the art can be used.

Alternatively, the polymerizable mixture of the present invention may be provided in the form of a formulation suitable for photolithography. The photolithography process allows the creation of a photopattern by using light to transfer a geometric pattern from a photomask to a light-curable composition. Typically, such light-curable composition contains a photochemically activatable radical polymerization initiator. For the preparation of such formulations, photoresist base formulations as known from the state of the art can be used.

The layer of the polymerizable mixture, which is applied in step (1), has preferably an average thickness of 1 to 50 μm, more preferably 2 to 30 μm, and most preferably 3 to 15 μm.

It is preferred that the curing in step (2) is carried out by a radical or ionic chain polymerization reaction or a polyaddition reaction. Preferred polyaddition reactions are cycloadditions, such as 2+2 cycloadditions, 4+2 cycloadditions (Diels-Alder reactions) or 1,3-dipolar cycloadditions, or nucleophilic additions, such as Michael reactions. Preferred curing conditions correspond to the preferred polymerization conditions as given above for the method for forming a copolymer.

It is preferred that the polymerizable mixture applied in step (1) further comprises one or more radical initiators. Preferred radical initiators are described above.

There is also provided a microelectronic device which comprises the packaged microelectronic structure prepared according to the above-mentioned manufacturing method.

The present invention is further illustrated by the examples following hereinafter which shall in no way be construed as limiting. The skilled person will acknowledge that various modifications, additions and alternations may be made to the invention without departing from the spirit and scope of the invention as defined in the appended claims.

EXAMPLES

A) Synthesis of Host Material Oligomers

Synthesis of Oligomer 4

Step 1:

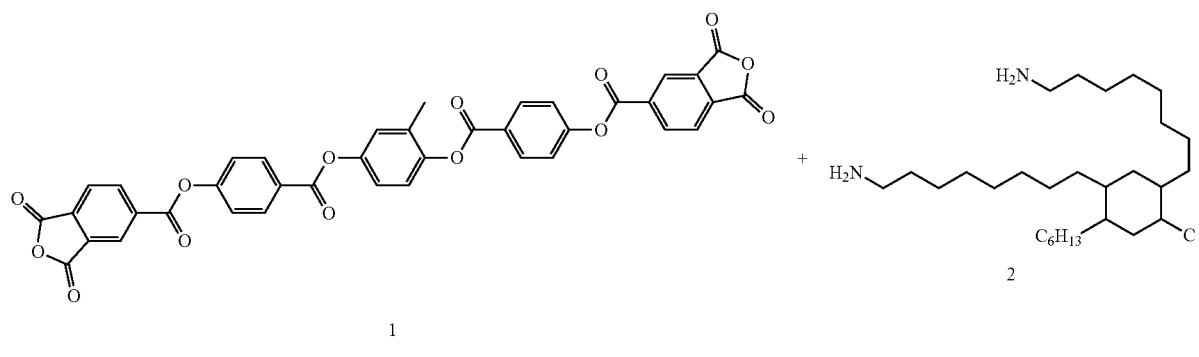

-continued

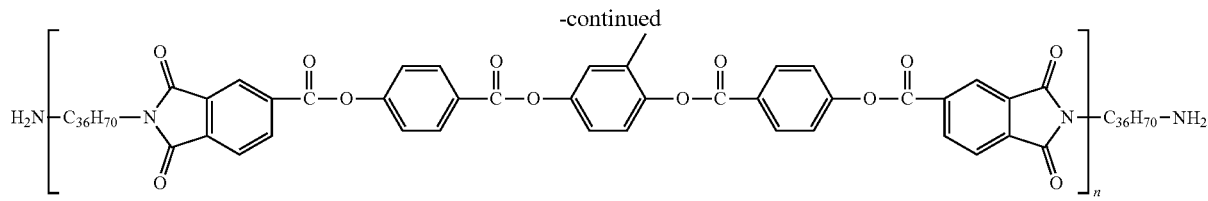

3

Step 2:

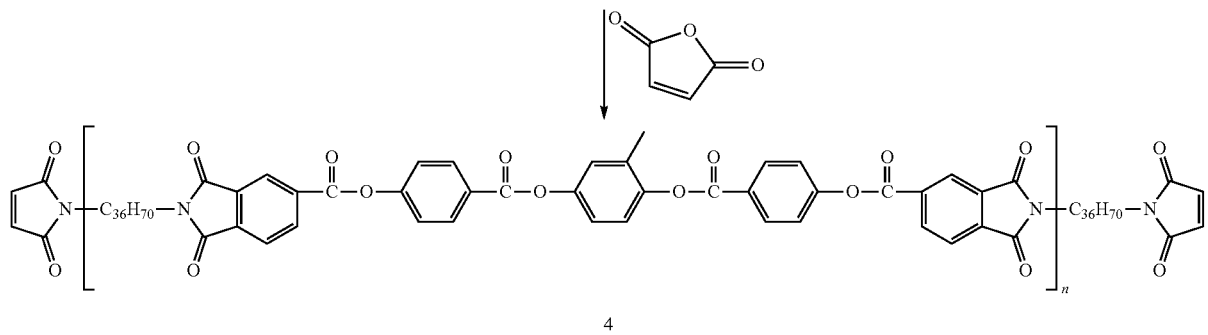

4

Step 1:
Triethylamine (49.7 g, 0.49 mol) was dissolved in 0.7 l of anhydrous toluene, followed by the addition of anhydrous methane-sulphonic acid (48.6 g, 0.5 mol). The mixture was stirred at room temperature for 10 minutes before carefully adding diamine 2 (Priamine™, Croda, 77.4 g, 0.14 mol) and dianhydride 1 (50 g, 0.07 mol). Next, the reaction mixture was heated to reflux using a Dean-Stark apparatus for 12 h.

Step 2:
The reaction mixture was cooled to room temperature and maleic anhydride (8.7 g, 0.09 mol) was added slowly, followed by the addition of an additional 10 g of anhydrous methanesulphonic acid. The mixture was reheated to reflux for about 12 h using a Dean-Stark trap. After cooling to room temperature, an additional 200 ml of toluene were added and stirring was stopped. The upper (toluene solution) fraction was carefully separated and the salt fraction was washed twice with toluene (2×500 ml). The toluene solutions were combined and filtered through a glass funnel which was tightly packed with silica gel. The silica gel was washed with an additional 100 ml of toluene and the toluene was removed under reduced pressure to produce 70 g (85%) of a yellow waxy resin.

Synthesis of Oligomer 5

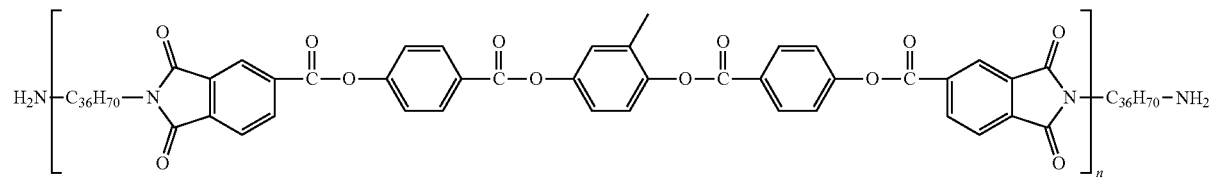

3

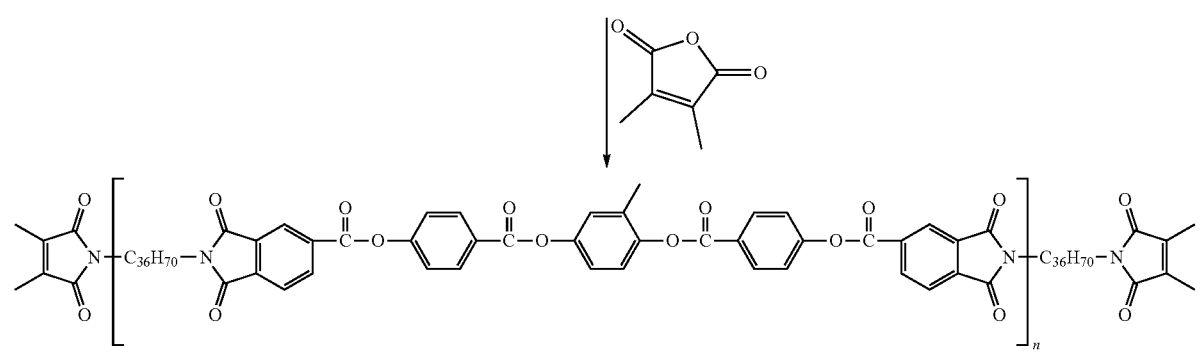

4

Dimethylmaleic anhydride (ABCR, 20 g, 0.16 mol) was added slowly to the reaction mixture of compound 3 (synthesis described in step 1), followed by the addition of an additional 10 g of anhydrous methanesulphonic acid. The mixture was reheated to reflux for about 12 h using a Dean-Stark trap. After cooling to room temperature, an additional 200 ml of toluene were added and stirring was stopped. The upper (toluene solution) fraction was carefully separated and the salt fraction was washed twice with toluene (2×500 ml). The toluene solutions were combined and filtered through a glass funnel which was tightly packed with silica gel. The silica gel was washed with an additional 100 ml of toluene and the toluene was removed under reduced pressure to produce 87 g of a yellow waxy resin.

B) Synthesis of Additives

Synthesis of Tris-(2-maleimidoethyl)-amine (6)

1. step

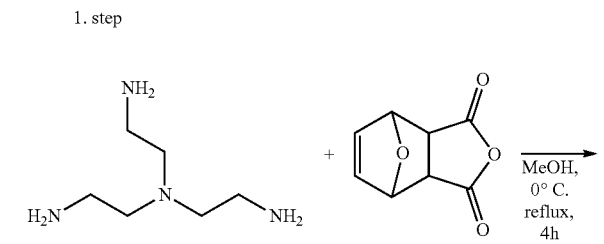

2. step

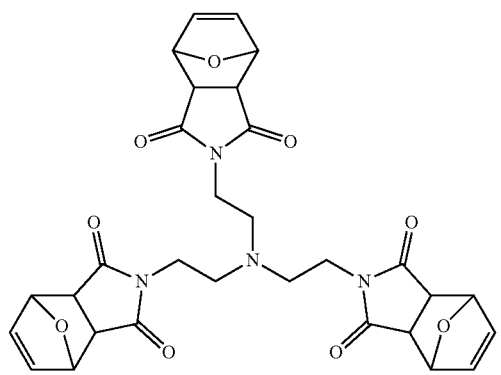

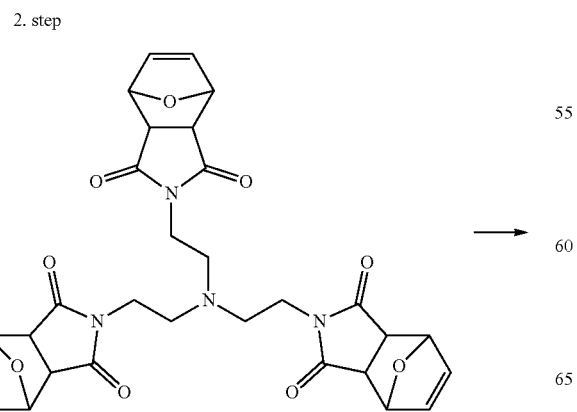

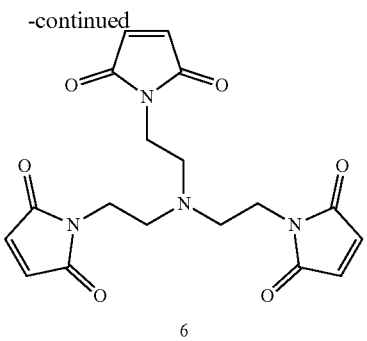

6

Step 1:

Furan-maleic anhydride adduct (Alfa Aesar, 28.5 g, 0.17 mol) was dissolved in 750 ml methanol. Tris (2-aminoethyl) amine (Alfa Aesar, 5 g, 0.03 mol) dissolved in 250 ml methanol was added dropwise at 0° C. Next, the reaction mixture was heated at reflux for 4 h. Methanol was removed and the concentrated solution (approx. 350 ml) was left to crystallize at 4° C. overnight. The obtained yellow crystals were filtered and washed with ethyl acetate (19.6 g, 38%).

Step 2:

7.4 g (0.013 mol) of the product obtained in step 1 was dissolved in 300 ml toluene. The solution was heated to reflux. After 20 h the solvent was removed under reduced pressure and the residual solid was dissolved in ethyl acetate and purified by flash chromatography (DCM/ethyl acetate 60/40). Yield: 4 g (84%).

$^1$H-NMR (500 MHz, CDCl$_3$): δ=6.68 (s, 6H), 3.52 (t, J=6.6 Hz, 6H), 2.71 (t, J=6.6 Hz, 6H) ppm.

Synthesis of 1,1′,1″-(nitrilotris(ethane-2,1-diyl))tris (3,4-dimethyl-1H-pyrrole-2,5-dione) (7)

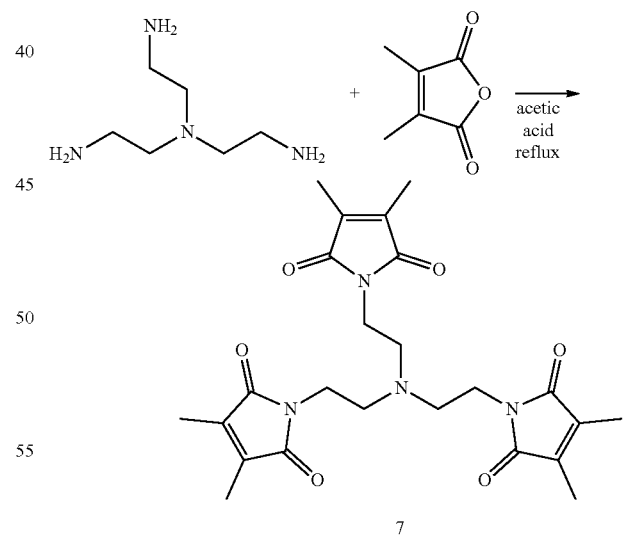

7

Tris (2-aminoethyl) amine (Alfa Aesar, 10 g, 0.066 mol) was slowly added dropwise at 0° C. to glacial acetic acid (75 ml). 2,3-Dimethylmaleic anhydride (Merck, 25.9 g, 0.199 mol) was added and the reaction mixture was heated at reflux. After 20 h, ethyl acetate (750 ml) and water (375 ml) were added, the phases were separated and the water solution was washed twice with ethyl acetate. The combined organic phase was washed with NaOH (1N, 2×250 ml) and brine (250 ml) and dried over Na$_2$SO$_4$. After filtration, the solvent was removed under reduced pressure and the residual solid was purified by chromatography (SiO$_2$, toluene/ethyl acetate (2:1, v/v). Yield: 26 g (83%) as white solid.

$^1$H-NMR (500 MHz, CDCl$_3$): δ=3.49 (t, J=6.7 Hz, 6H), 2.70 (t, J=6.7 Hz, 6H), 1.94 (s, 18H) ppm.

C) Preparation of Blends & Freestanding Films

General Procedure for Blend Preparation:

A solution of oligomer 4 or 5 in toluene (25 wt.-%) was mixed with different amounts of additive (if necessary, dissolved in DMAc or cyclopentanone) and appropriate amounts of a radical starter.

Preparation of Freestanding Films:

Freestanding polymer films were prepared by doctor blading onto glass substrate either cured thermally or photo-induced (more specified conditions see different examples). The films could be removed from the glass substrate by rinsing the polymer with water.

Mechanical & Thermal Properties:

Tensile strength and elongation at break (E2B) were measured on a mechanical testing machine (500 N Zwicki). Young's modulus (modulus) was calculated by dividing the tensile stress by the extensional strain in the elastic (initial, linear) portion of the physical stress-strain curve. Film dimension were typically 25 mm long, 15 mm wide and thicknesses between 25-100 μm). The measurements were performed according to the following parameter set: pre-measurement: 0.1 N at an extension rate of 10 mm/min; main extension rate of 50 mm/min. All experiments were conducted at room temperature (23±2° C.).

Thermomechanical analysis (TMA) was performed on 402F3 TMA (Netzsch) in tension mode. The coefficient of thermal expansion (CTE) was measured in the range from 20-300° C. under N$_2$ atmosphere.

Example 1: Oligomer 4 or 5 with 1,1'-(Methylenedi-4,1-phenylene)-bismaleimide (Aldrich, BMI1)

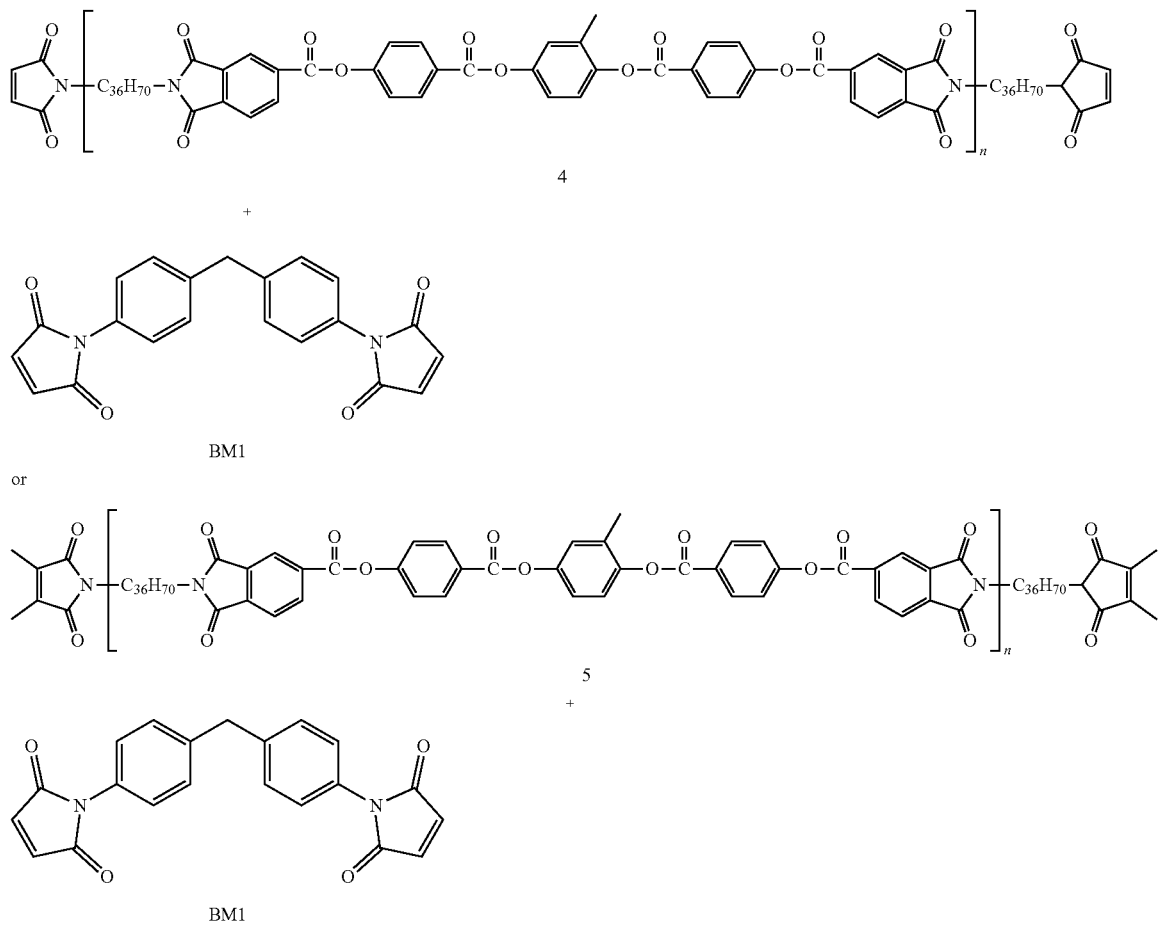

(a) Curing conditions: Oligomer 4 or 5+10 wt.-% BMI1; 10 min at room temperature+10 min at 100° C. (hotplate), 10 J/cm$^2$ (broadband), 30 min at 175° C. (hotplate).

|  | Oligomer 4 + 10 wt.-% BMI1 | Oligomer 5 + 10 wt.-% BMI1 |
| --- | --- | --- |
| Modulus [GPa] | 0.065 ± 0.009 | 0.177 ± 0.008 |
| E2B [%] | 118 ± 10 | 148 ± 12 |
| CTE [ppm/K] | >6000[#] | 34 ± 21[#] |

[#]CTE between 140-170° C.

Cured films of oligomer 5 with 10 wt.-% of BM11 exhibited a nearly 3-fold higher Young's modulus, while having higher elasticity (E2B) compared to blends with oligomer 4. In addition, the CTE is drastically reduced to a favorable region.

(b) Curing conditions: Oligomer 4 or 5+10 wt.-% BMI1+5 wt.-% Irgacure OXE-02 (BASF), 10 min at room temperature+10 min at 100° C. (hotplate), 10 J/cm$^2$ (broadband), 30 min at 175° C. (hotplate).

|  | Oligomer 4 + 10 wt.-% BMI1 | Oligomer 5 + 10 wt.-% BMI1 |
| --- | --- | --- |
| Modulus [GPa] | 0.578 ± 0.024 | 0.411 ± 0.012 |
| E2B [%] | 91 ± 9 | 167 ± 14 |
| CTE [ppm/K] | 531 ± 459[#] | −35 ± 60[#] |

[#]CTE between 140-170° C.

Cured films of oligomer 5 with 10 wt.-% BMI1 using OXE-02 showed higher elasticity in addition to low CTE values.

(c) Curing conditions: Oligomer 4 or 5+10 wt.-% BMI1+5 wt.-% Irgacure OXE-02 (BASF)+5 wt.-% Dicumyl peroxide (Aldrich), 10 min at room temperature+10 min at 100° C. (hotplate), 10 J/cm$^2$ (broadband), 30 min at 175° C. (hotplate).

|  | Oligomer 4 + 10 wt.-% BMI1 | Oligomer 5 + 10 wt.-% BMI1 |
| --- | --- | --- |
| Modulus [GPa] | 0.788 ± 0.032 | 0.854 ± 0.026 |
| E2B [%] | 20 ± 6 | 45 ± 10 |
| CTE [ppm/K] | 78 ± 5[#] | 6 ± 31[#] |

[#]CTE between 140-170° C.

Cured films of oligomer 5 with 10 wt.-% BMI1 using radical thermal initiator in combination with photoinitiator (OXE-02) showed more favorable values in terms of modulus, E2B and CTE.

(d) Curing conditions: Oligomer 5+10 wt.-% BMI1+5 wt.-% N1919T (Adeka), 10 min at room temperature+10 min at 100° C. (hotplate), 10 J/cm$^2$ (broadband), 30 min at 175° C. (hotplate).

|  | Oligomer 5 + 10 wt.-% BMI1 |
| --- | --- |
| Modulus [GPa] | 0.362 ± 0.045 |
| E2B [%] | 166 ± 18 |
| CTE [ppm/K] | 115 ± 55[#] |

[#]CTE between 140-170° C.

(e) Curing conditions: Oligomer 5+10 wt.-% BMI1+5 wt.-% N1919T (Adeka)+5 wt.-% Dicumyl peroxide (Aldrich), 10 min at room temperature+10 min at 100° C. (hotplate), 10 J/cm$^2$ (broadband), 30 min at 175° C. (hotplate).

|  | Oligomer 5 + 10 wt.-% BMI1 |
| --- | --- |
| Modulus [GPa] | 0.429 ± 0.038 |
| E2B [%] | 140 ± 35 |
| CTE [ppm/K] | 61 ± 48[#] |

[#]CTE between 140-170° C.

Example 2: Oligomer 4 or 5 with Maleimide 6

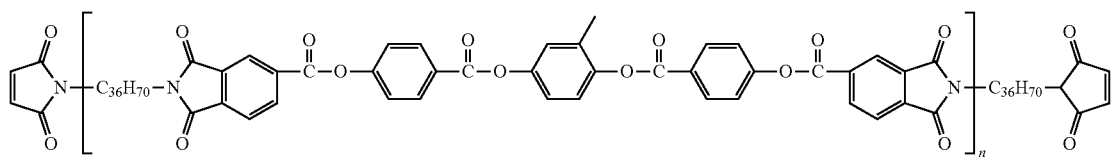

4

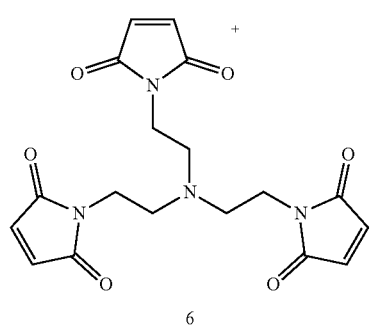

6 or

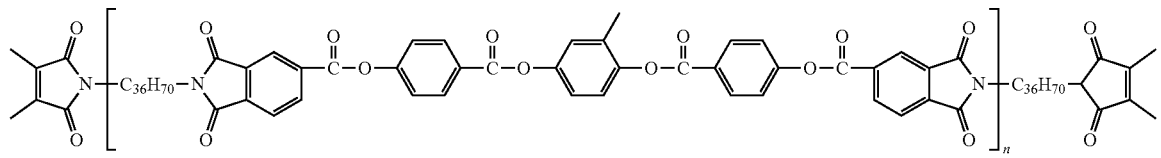

5

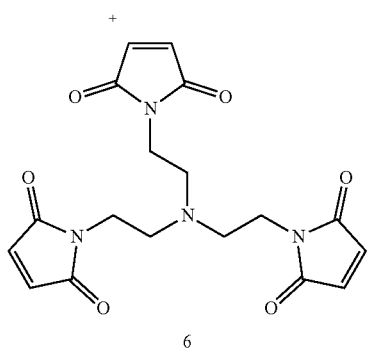

6

Curing Conditions:

Oligomer 4 or 5+5 wt.-% Maleimide 6, 10 min room temperature, 10 min 100° C. (hotplate), 10 J/cm² (broadband), 30 min 175° C. (hotplate).

|  | Oligomer 4 + 5 wt.-% Maleimide 6 | Oligomer 5 + 5 wt.-% Maleimide 6 |
|---|---|---|
| Modulus [GPa] | 0.030 ± 0.004 | 0.241 ± 0.014 |
| E2B [%] | 150 ± 1 | 71 ± 11 |
| CTE [ppm/K] | >2500* | 305 ± 55* |

*CTE between 25-35° C.

Cured films of oligomer 5 with 5 wt.-% maleimide 6 exhibited more favorable values with respect to modulus, E2B and CTE compared to oligomer 4.

Example 3: Oligomer 4 or 5 with Dimethyl Maleimide 7

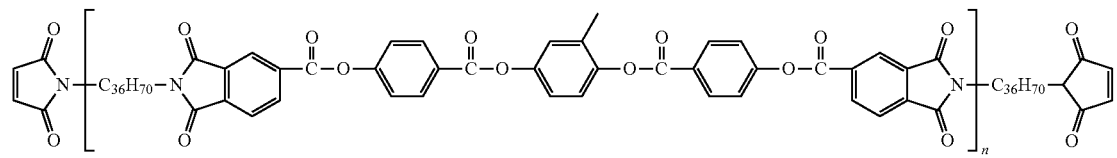

4

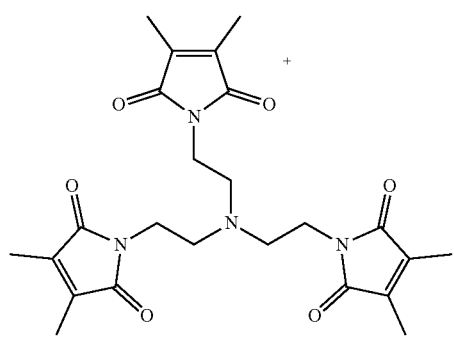

7 or

-continued

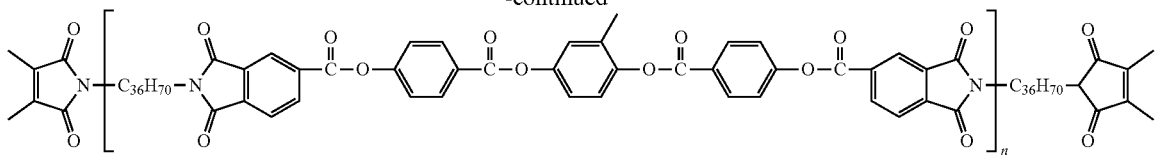

5

+

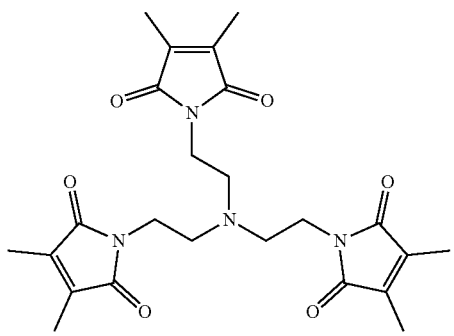

7

Curing Conditions:
Oligomer 4 or 5+5 wt.-% Dimethyl maleimide 7, 10 min room temperature, 10 min 100° G (hotplate), 10 J/cm² (broadband), 30 min 175 OC (hotplate).

|  | Oligomer 4 + 5 wt.-% Dimethyl maleimide 7 | Oligomer 5 + 5 wt.-% Dimethyl maleimide 7 |
|---|---|---|
| Modulus [GPa] | 0.080 ± 0.002 | 0.048 ± 0.002 |
| E2B [%] | 215 ± 5 | 268 ± 4 |
| CTE [ppm/K] | >2000 | 409 ± 149* |

*CTE between 25-35° C.

Example 4: Oligomer 4 or 5 with 1,1'-(Methylenedi-4,1-phenylene)-bismaleimide (Aldrich, BMI1) and Dimethyl maleimide-SiO₂ (50 nm, nanoComposix)

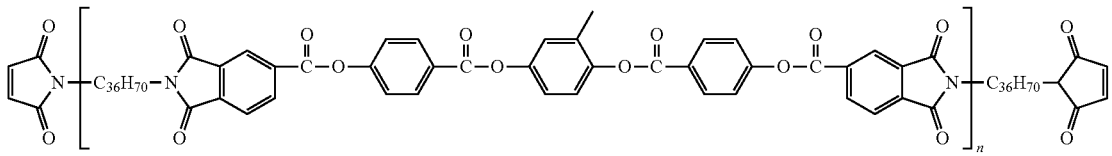

4

+

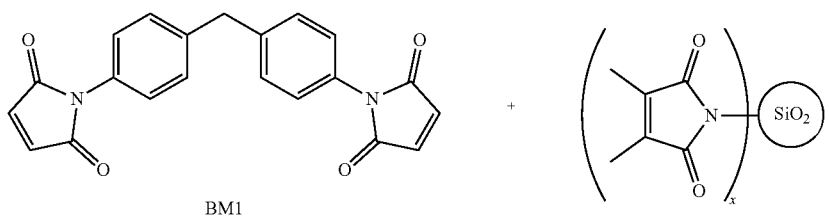

BMI1 or

-continued

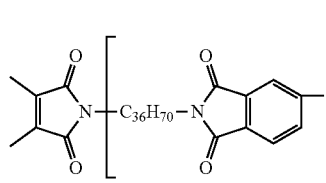

5

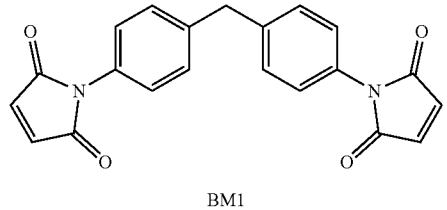

BM1

+

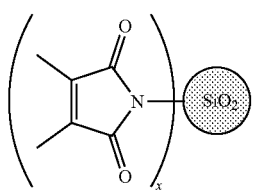

Curing Conditions:
Oligomer 4 or 5+10 wt.-% BMI1+5 wt.-% DMMI-SiO$_2$ (nanoComposix, Inc., 50 nm), 10 min room temperature, 10 min 100° C. (hotplate), 10 J/cm$^2$ (broadband), 30 min 175° C. (hotplate).

|  | Oligomer 4 + 10 wt.-% BMI1 + 5 wt.-% DMMI-SiO$_2$ | Oligomer 5 + 10 wt.-% BMI1 + 5 wt.-% DMMI-SiO$_2$ |
|---|---|---|
| Modulus [GPa] | 0.079 ± 8 | 0.310 ± 25 |
| E2B [%] | 219 ± 15 | 132 ± 12 |
| CTE [ppm/K] | >6000 | 72 ± 24[#] |

[#]CTE between 140-170° C.

Cured films of oligomer 5 having the above-described constitution showed much higher modulus values in addition to favorable CTE values.

Example 5: Oligomer 4 or 5 with 1,1'-(Methyl-enedi-4,1-phenylene)-bismaleimide (Aldrich, BMI1) and Dimethyl maleimide-POSS (DMMI-POSS)

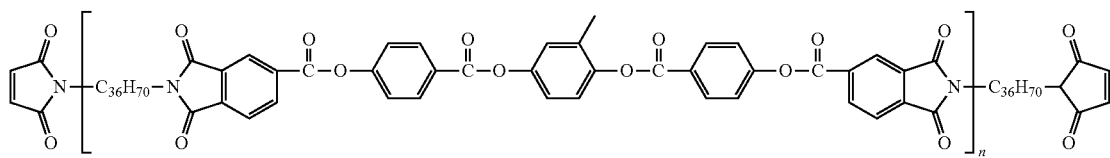

4

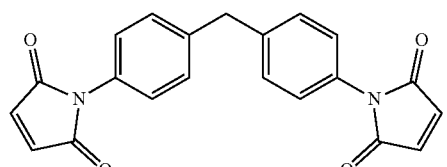

BM1

+

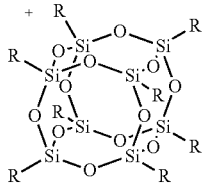

R = 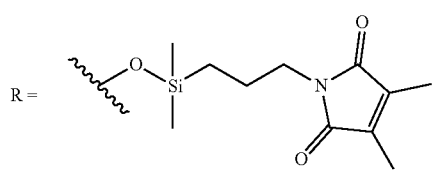

or

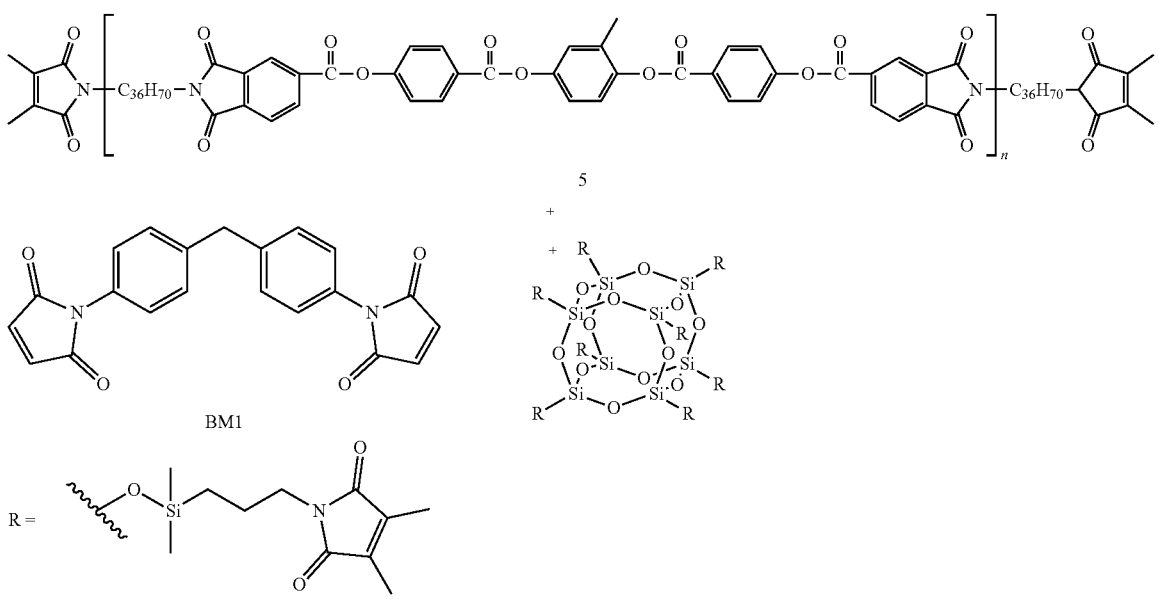

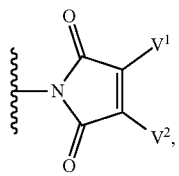

Curing Conditions:

Oligomer 4 or 5+10 wt.-% BM11+5 wt.-% DMMI-POSS, 10 min room temperature, 10 min 100° C. (hotplate), 10 J/cm² (broadband), 30 min 175° C. (hotplate).

|  | Oligomer 4 + 10 wt.-% BMI1 + 5 wt.-% DMMI-SiO$_2$ | Oligomer 5 + 10 wt.-% BMI1 + 5 wt.-% DMMI-POSS |
|---|---|---|
| Modulus [GPa] | 0.019 ± 7 | 0.178 ± 8 |
| E2B [%] | 274 ± 28 | 103 ± 15 |
| CTE [ppm/K] | >6000 | 99 ± 10[#] |

[#]CTE between 140-170° C.

The invention claimed is:

1. A polymerizable mixture comprising a first monomer and a second monomer, wherein the first monomer is one or more compounds of Formula (1):

P$^1$-Sp$^1$-(MG-Sp$^1$)m-P$^1$     Formula (1)

wherein:

m is an integer of 2 to 60;

P$^1$ denotes

V$^1$ is H;

V$^2$ is alkyl with 1 to 6 carbon atoms, F, Cl or CN;

or

V$^1$ and V$^2$ are independently of one another alkyl with 1 to 6 carbon atoms, F, Cl or CN;

Sp$^1$ denotes at each occurrence Sp'-X';

Sp' denotes (a) a straight chain alkylene having 1 to 40 C atoms or branched chain alkylene having 3 to 40 C atoms, which is optionally mono- or polysubstituted by F, Cl, Br, I or CN and in which one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, or —CH═CH— in such a way that O and/or S atoms are not linked directly to one another, or (b) -Sp$^x$-G-Sp$^y$-, wherein Sp$^x$ and Sp$^y$ denote independently of each other alkylene having 1 to 20 C atoms or a single bond; G denotes cycloalkylene having 3 to 20 C atoms which is optionally mono- or polysubstituted by alkyl having 1 to 20 C atoms;

X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═C—, —N═N—, —CH═CR$^{01}$-, —CY$^{11}$═CY$^{12}$-, —C═C—, —CH═CH—COO—, —OCO—CH═CH— or a single bond;

Y$^{11}$ and Y$^{12}$ each, independently of one another, denote H, F, C or CN;

MG is a rod-shaped mesogenic group of Formula (2):

-(A$^{21}$-Z$^{21}$)$_k$-A$^{22}$-(Z$^{22}$-A$^{23}$)$_r$     Formula (2)

A$^{21}$ to A$^{23}$ are independently and at each occurrence independently of one another an aryl group, heteroaryl group, heterocyclic group, alicyclic group or cyclic imide group optionally substituted by one or more identical or different groups L;

Z$^{21}$ and Z$^{22}$ are independently and at each occurrence independently from each other, —O—, —S—, —CO—, —COO—, —OCO—, —S—CO—, —CO—S—, —O—COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —CH=CH—COO—, —OCO—CH=CH—, or a single bond;

R$^{01}$ and R$^{02}$ each, independently of one another, denote H or alkyl having 1 to 12 C atoms;

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or straight chain alkyl, alkoxy, alkylcarbonyl, alkoxycarbonyl, alkylcarbonyloxy or alkoxycarbonyloxy with 1 to 20 C atoms, or branched chain alkyl, alkoxy, alkylcarbonyl, alkoxycarbonyl, alkylcarbonyloxy or alkoxycarbonyloxy with 3 to 20 C atoms, wherein one or more H atoms are optionally replaced by F or C, —CN or straight chain alkyl, alkoxy, alkylcarbonyl, alkoxycarbonyl, alkylcarbonyloxy or alkoxycarbonyloxy with 1 to 6 C atoms, or branched chain alkoxy, alkylcarbonyl, alkoxy-carbonyl, alkylcarbonyloxy or alkoxycarbonyloxy with 3 to 6 C atoms;

R$^{xx}$ and R$^{yy}$ independently of each other denote H or alkyl with 1 to 12 C-atoms;

Y$^{01}$ and Y$^{02}$ each, independently of one another, denote H, alkyl having 1 to 12 C atoms, aryl, F, Cl, or CN; and k and l are each and independently 0, 1, 2, 3 or 4; and wherein the second monomer is one or more bi- or multifunctional compounds capable of reacting with the first monomer to give a copolymer, wherein the one or more bi- or multifunctional compounds comprise two or more polymerizable groups (P) which are selected from groups containing a C=C double bond, groups containing two conjugated C=C double bonds, nucleophilic groups, and 1,3-dipolar groups.

2. A polymerizable mixture according to claim 1, wherein at least one Sp$^1$ is of formula Sp'-X', so that P$^1$-Sp$^1$- is of formula P$^1$—Sp'-X'—, wherein:

Sp' denotes (a) a straight chain alkylene having 1 to 40 C atoms or branched chain alkylene having 3 to 40 C atoms, which is optionally mono- or polysubstituted by F, Cl, Br, I or CN and in which one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$— or —CH=CH— in such a way that O and/or S atoms are not linked directly to one another.

3. A polymerizable mixture according to claim 1, wherein at least one Sp$^1$ is selected from the group consisting of —(CH$_2$)$_{p1}$-, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$—, —(SiR$^{01}$R$^{02}$—O)$_{p1}$—, —(CH$_2$)$_{p1}$-(cyclo-C$_6$H$_8$R$^{01}$R$^{02}$)—(CH$_2$)$_{p1}$—, and

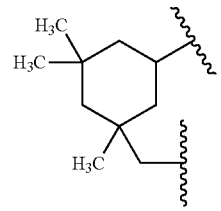

wherein:

p1 is an integer from 1 to 60;

q1 is an integer from 1 to 12; and

R$^{01}$ and R$^{02}$ each, independently of one another, denote H or alkyl having 1 to 12 C atoms.

4. A polymerizable mixture according to claim 1, wherein A$^{21}$ to A$^{23}$ denote independently and, in case of multiple occurrence, independently of one another, a moiety selected from the following groups a) to e):

a) trans-1,4-cyclohexylene, 1,4-cyclohexenylene and 4,4'-bicyclohexylene, in which one or more non-adjacent CH$_2$ groups may be replaced by —O— and/or —S— and wherein one or more H atoms may be replaced by a group L;

b) 1,4-phenylene, 1,3-phenylene, 4,4'-biphenylene, 2,5-thiophene and 2,6-dithieno[3,2-b:2',3'-d]thiophene in which one or two CH groups may be replaced by N and where one or more H atoms may be replaced by a group L;

c) tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophen-2,5-diyl, which may be substituted one or more groups L;

d) saturated, partially unsaturated or completely unsaturated, and optionally substituted, polycyclic radicals having 5 to 20 cyclic C atoms, of which one or more can each be replaced by a heteroatom e) cyclic imides selected from the group consisting of:

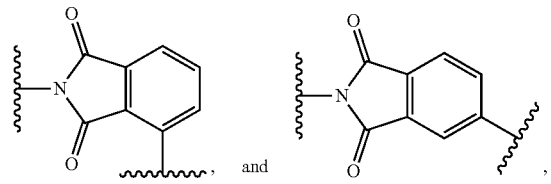 [SMILES: *c1cccc2c1C(=O)N(*)C2=O ; *c1ccc2c(c1)C(=O)N(*)C2=O]

where one or more atoms may be replaced by a group, and/or one or more double bonds may be replaced by single bonds, and/or one or more CH groups may be replaced by N.

5. A polymerizable mixture according to claim 1, wherein the second monomer is one or more bi- or multifunctional compounds selected from organic compounds, polyhedral-silsesquioxane compounds and functionalized inorganic nanoparticles.

6. A polymerizable mixture according to claim 1, wherein the second monomer is one or more of:

(a) an organic compound represented by Formula (4):

Formula (4)

wherein:

Q denotes a hydrocarbon group having 1 to 50 carbon atoms which may be optionally substituted with one or more substituents L, wherein L is defined as for Formula (2), and which may optionally contain one or more hetero atom groups selected from N, O and S;

$P^2$ denotes a polymerizable group (P); and x is an integer from 2 to 10;

(b) a polyhedralsilsesquioxane compound represented by the following structure:

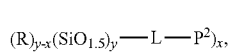  (Structure 1)

wherein:

R is H, $C_1$-$C_6$-alkyl, $C_2$-$C_6$-alkenyl, $C_6$-$C_{10}$-aryl, or $C_1$-$C_6$-alkoxy;

L is $C_1$-$C_{12}$-alkylene or $C_1$-$C_{12}$-oxyalkylene, wherein one or more non-adjacent C atoms may be replaced, independently of one another, by —$SiR^{05}R^{05}$—, wherein $R^{05}$ and $R^{06}$ each, independently of one another, denote H or alkyl having 1 to 6 C atoms;

$P^2$ denotes a polymerizable group (P);

y is an integer from 6 to 12; and x is an integer from 2 to 12, wherein y-x≥0; and/or (c) a functionalized inorganic nanoparticle which comprises polymerizable groups $P^2$ on its surface, wherein:

$P^2$ denotes a polymerizable group (P).

7. A method for forming a copolymer comprising the following steps:

(i) providing a polymerizable mixture according to claim 1; and (ii) polymerizing said polymerizable mixture to obtain a copolymer.

8. A method for forming a copolymer according to claim 7, wherein the polymerizable mixture further comprises one or more radical initiators.

9. A copolymer, which is obtained by the method for forming a copolymer according to claim 7.

10. A copolymer comprising at least one repeating unit which is derived from the first monomer and at least one repeating unit which is derived from the second monomer as defined in claim 1.

11. A copolymer comprising at least one repeating unit which is derived from the first monomer and at least one repeating unit which is derived from the second monomer as defined in claim 1, and wherein the repeating unit derived from the first monomer comprises a structural unit represented by Formula (5):

  Formula (5)

wherein $Sp^1$, MG and m are defined as for Formula (1).

12. An electronic device comprising a copolymer according to claim 9.

13. An electronic device according to claim 12, wherein the copolymer forms a dielectric layer.

14. A method for preparing a packaged microelectronic structure, in which a substrate is provided with a dielectric layer, wherein the method comprises the following steps:

(1) applying a polymerizable mixture according to claim 1 to a surface of a substrate; and (2) curing said polymerizable mixture to form a dielectric layer.

15. A method for preparing a packaged microelectronic structure according to claim 14, wherein the polymerizable mixture further comprises one or more radical initiators.

16. A microelectronic device comprising a packaged microelectronic structure obtained by the manufacturing method according to claim 14.

17. A polymerizable mixture according to claim 1, wherein $A^{21}$ to $A^{23}$ denote independently and, in case of multiple occurrence, independently of one another, a moiety selected from the following groups a) to e):

a) trans-1,4-cyclohexylene, 1,4-cyclohexenylene and 4,4'-bicyclohexylene, in which one or more non-adjacent $CH_2$ groups may be replaced by —O— and/or —S— and wherein one or more H atoms may be replaced by a group L;

b) 1,4-phenylene, 1,3-phenylene, 4,4'-biphenylene, 2,5-thiophene and 2,6-dithieno[3,2-b:2',3'-d]thiophene in which one or two CH groups may be replaced by N and where one or more H atoms may be replaced by a group L;

c) tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophen-2,5-diyl, which may be substituted one or more groups L;

d) saturated, partially unsaturated or completely unsaturated, and optionally substituted, polycyclic radicals having 5 to 20 cyclic C atoms, of which one or more can also be replaced by heteroatoms, selected from the group consisting of bicyclo [1.1.1] pentane-1,3-diyl, bicyclo [2.2.2] octane-1,4-diyl, spiro [3.3] heptane-2,6-diyl,

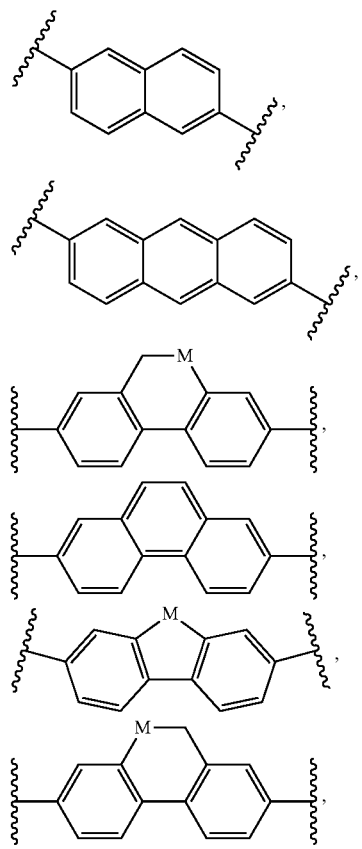

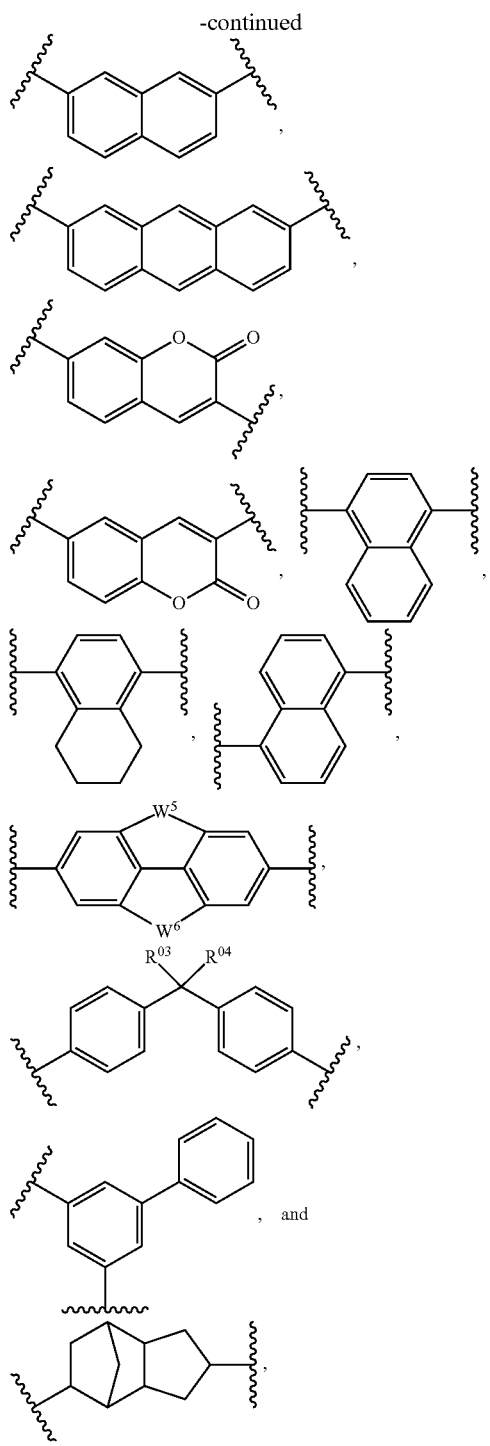

where one or more H atoms may be replaced by a group L, and/or one or more double bonds may be replaced by single bonds, and/or one or more CH groups may be replaced by N, and where M denotes —O—, —S—, —CH$_2$—, —CHY$^{03}$— or —CY$^{03}$Y$^{04}$—;

Y$^{03}$, Y$^{04}$ denote independently of each other one of the meanings given above for R$^{01}$, F, Cl, CN, OCF$_3$ or CF$_3$;

W$^5$, W$^6$ denote independently of each other —CH$_2$CH$_2$—, —CH=CH—, —CH$_2$—O—, —O—CH$_2$—, —C(R$^c$R$^d$)— or —O—;

R$^c$, R$^d$ denote independently of each other H or alkyl having 1 to 6 C atoms; and R$^{03}$, R$^{04}$ denote independently of each other H, F, straight chain alkyl having 1 to 12 C atoms, or branched chain alkyl having 3 to 12 C atoms, where one or more H atoms may be replaced by F;

e) cyclic imides selected from the group consisting of:

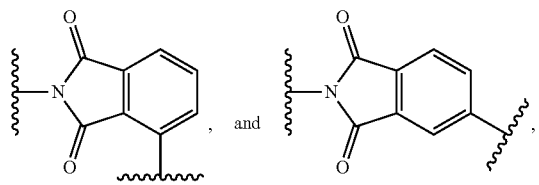 [SMILES: *c1cccc2c1C(=O)N(*)C2=O ; *c1ccc2c(c1)C(=O)N(*)C2=O]

where one or more H atoms may be replaced by a group L, and/or one or more double bonds may be replaced by single bonds, and/or one or more CH groups may be replaced by N.

18. A polymerizable mixture according to claim 17, wherein A$^{21}$ to A$^{23}$ denote independently and, in case of multiple occurrence, independently of one another, a moiety selected from the following groups a), b), c) and d):

a) trans-1,4-cyclohexylene, 1,4-cyclohexenylene and 4,4'-bicyclohexylene, in which one or more non-adjacent CH$_2$ groups may be replaced by —O— and/or —S— and wherein one or more H atoms may be replaced by a group L;

b) 1,4-phenylene, 1,3-phenylene, 4,4'-biphenylene, 2,5-thiophene and 2,6-dithieno[3,2-b:2',3'-d]thiophene in which one or two CH groups may be replaced by N and where one or more H atoms may be replaced by a group L;

c) tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophen-2,5-diyl, which may be substituted one or more groups L;

d) saturated, partially unsaturated or completely unsaturated, and optionally substituted, polycyclic radicals having 5 to 20 cyclic C atoms, of which one or more can also be replaced by heteroatoms, selected from the group consisting of bicyclo [1.1.1] pentane-1,3-diyl bicyclo [2.2.2] octane-1,4-diyl spiro [3.3] heptane-2,6-diyl,

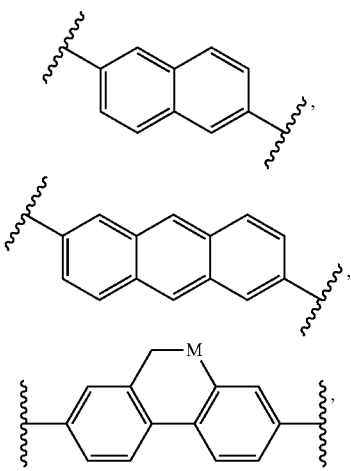

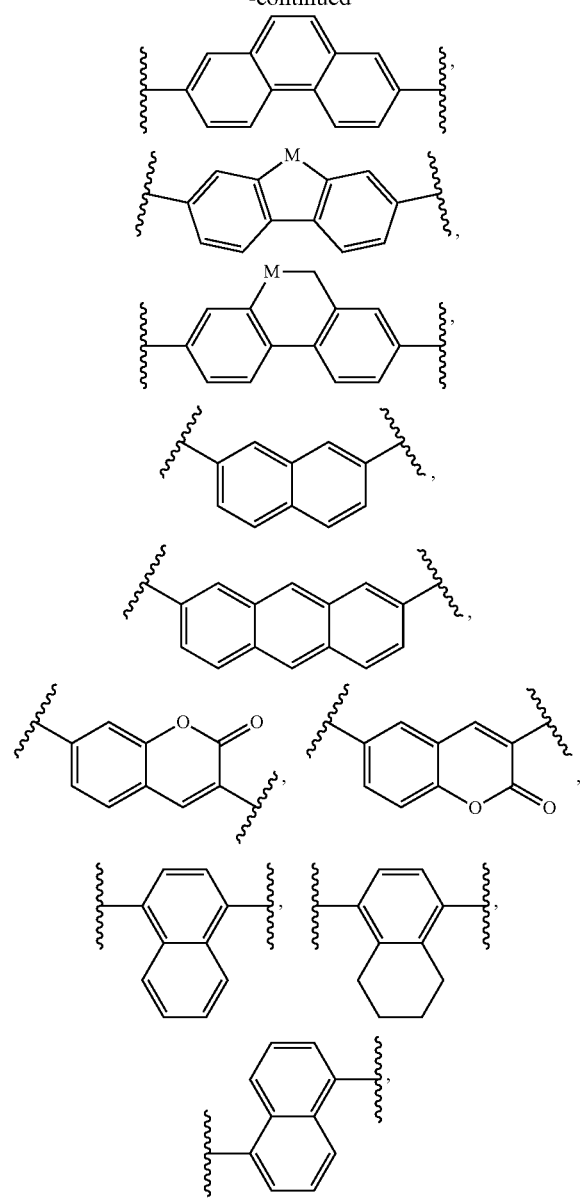

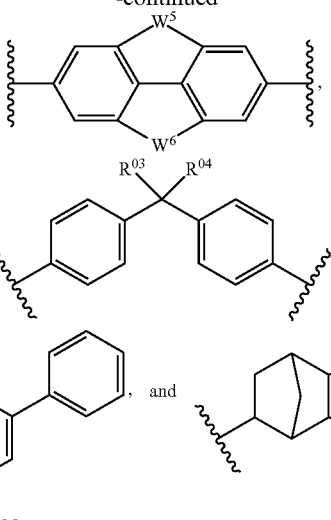

where one or more H atoms may be replaced by a group L, and/or one or more double bonds may be replaced by single bonds, and/or one or more CH groups may be replaced by N, and where M denotes —O—, —S—, —CH$_2$—, —CHY$^{03}$— or —CY$^{03}$Y$^{04}$—;

Y$^{03}$, Y$^{04}$ denote independently of each other one of the meanings given above for R$^{01}$, F, Cl, CN, OCF$_3$ or CF$_3$;

W$^5$, W$^6$ denote independently of each other —CH$_2$CH$_2$—, —CH=CH—, —CH$_2$—O—, —O—CH$_2$—, —C(R$^c$R$^d$)— or —O—;

R$^c$, R$^d$ denote independently of each other H or alkyl having 1 to 6 C atoms; and R$^{03}$, R$^{04}$ denote independently of each other H, F, straight chain alkyl having 1 to 12 C atoms, or branched chain alkyl having 3 to 12 C atoms, where one or more H atoms may be replaced by F.

19. A polymerizable mixture according to claim 1, wherein m is 3 to 20.

20. A polymerizable mixture according to claim 1, wherein V$^2$ is F, C or CN.

21. A polymerizable mixture according to claim 1, wherein k and l are 1.

22. A polymerizable mixture according to claim 1, wherein the one or more compounds of formula (1) are of one or more of the following formulae:

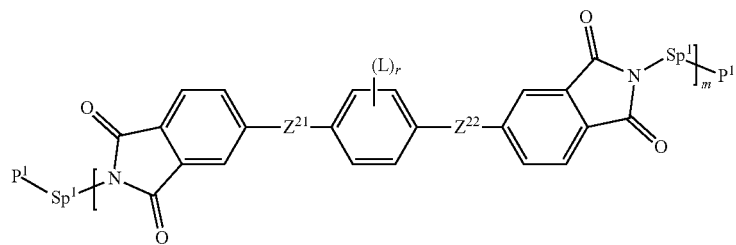

M1

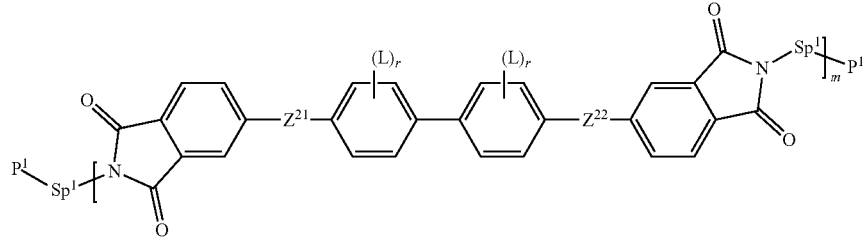

M2

-continued
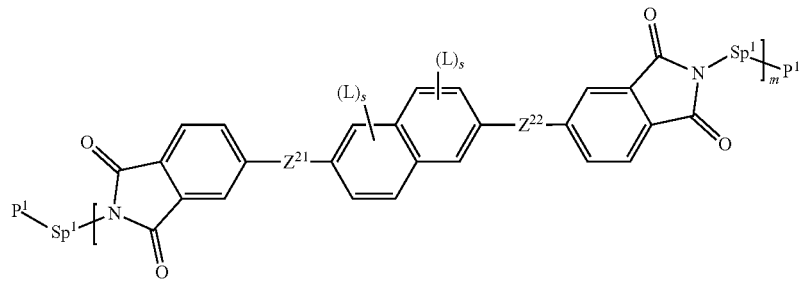
M3
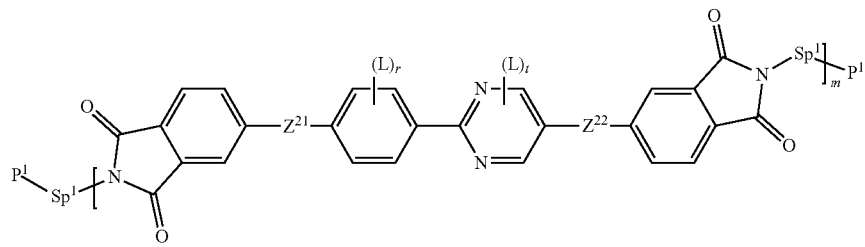
M4
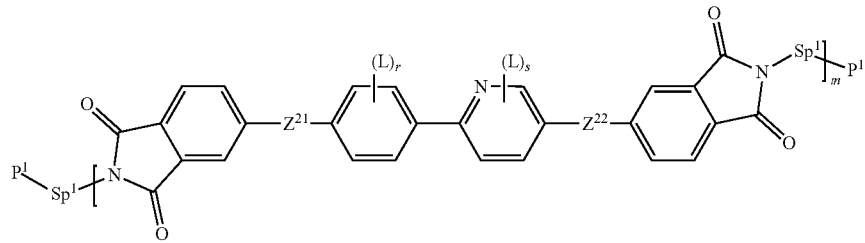
M5
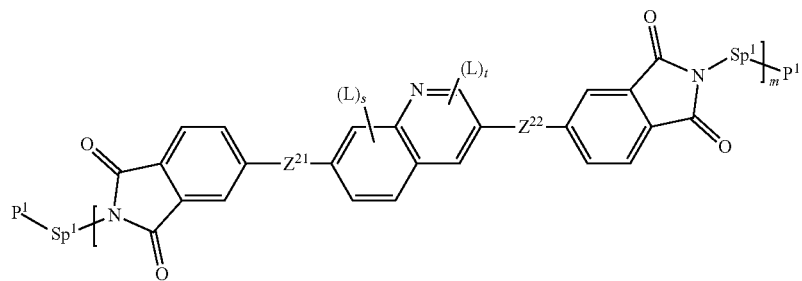
M6
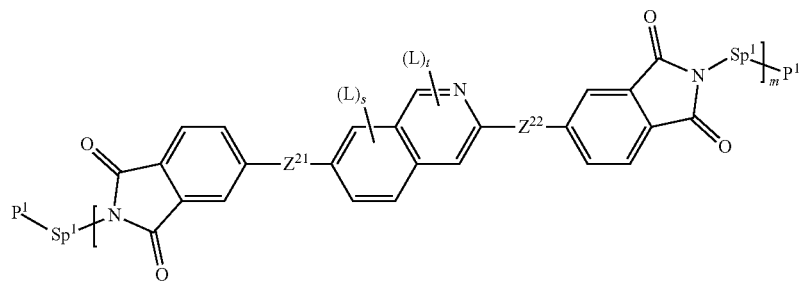
M7
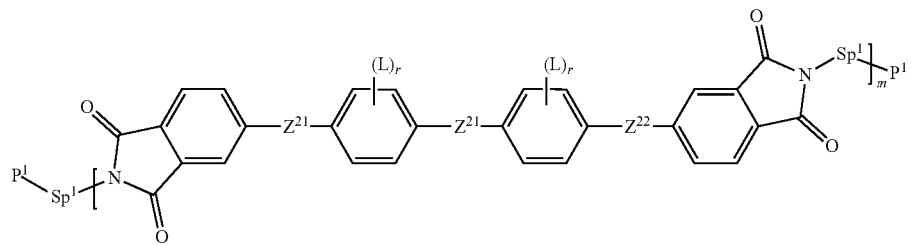
M8

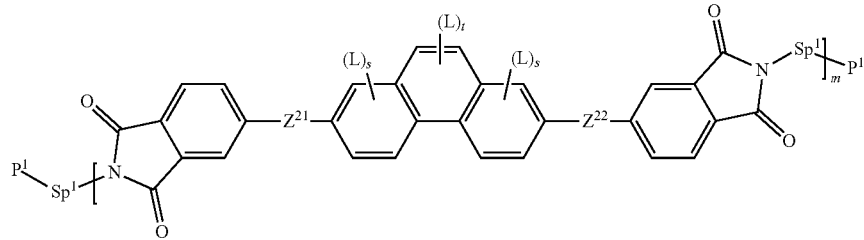
M9
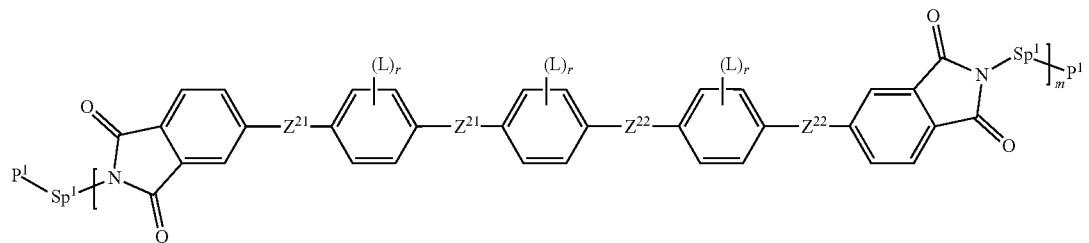
M10
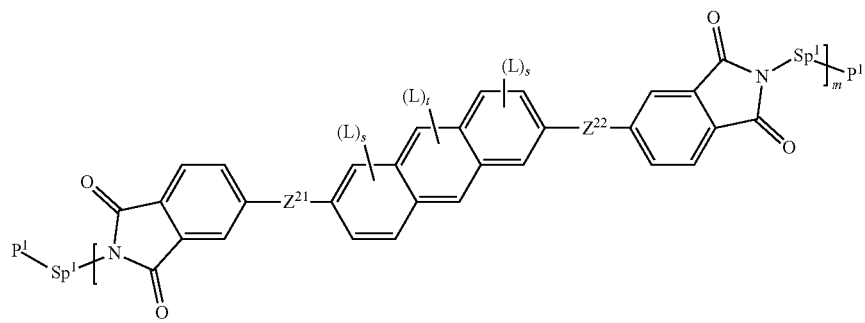
M11
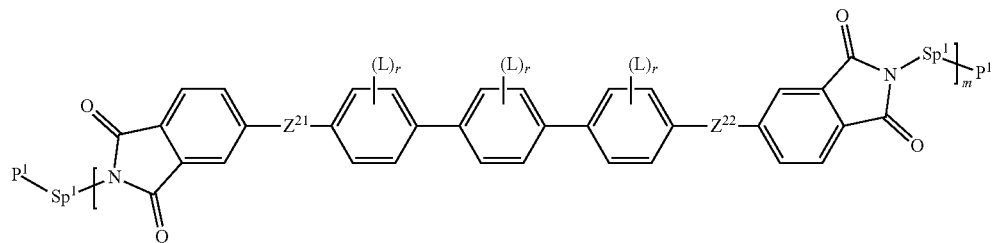
M12
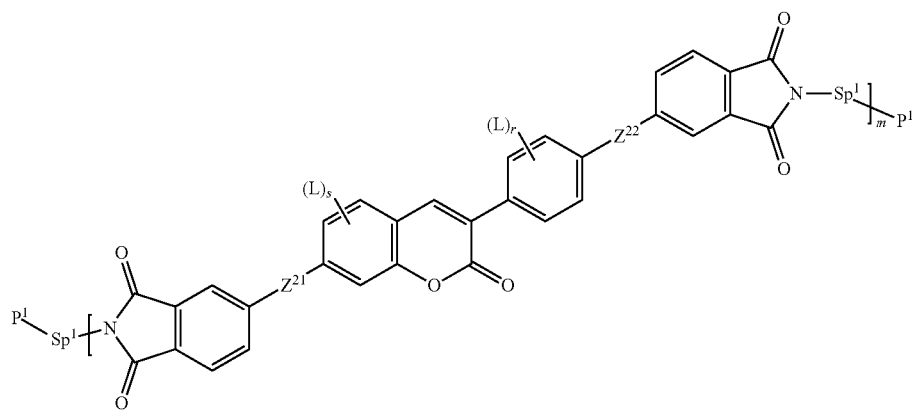
M13

-continued
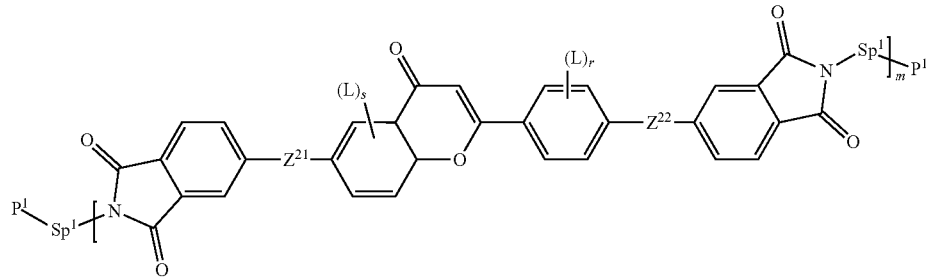
M14
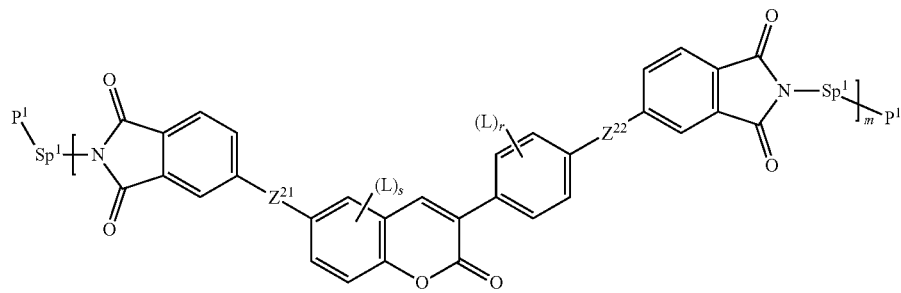
M15
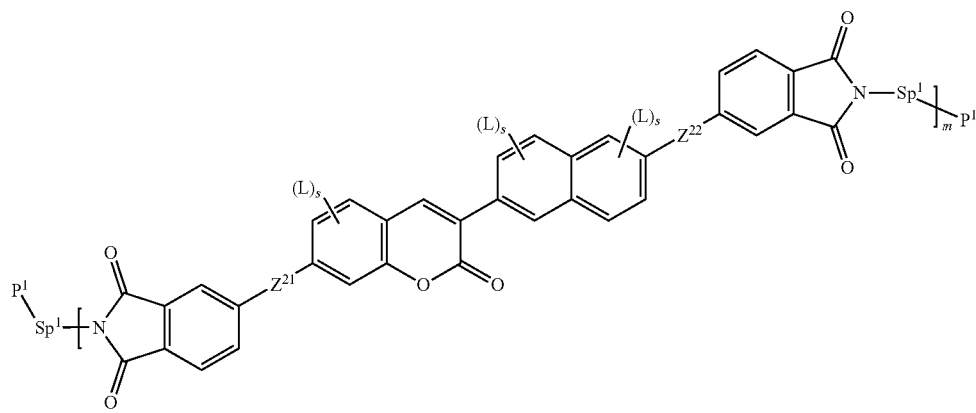
M16
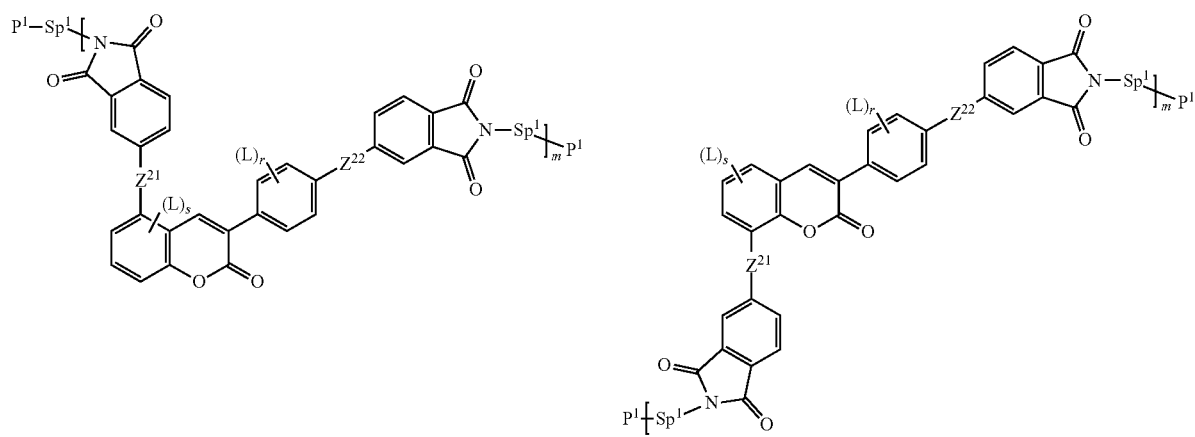
M17
M18

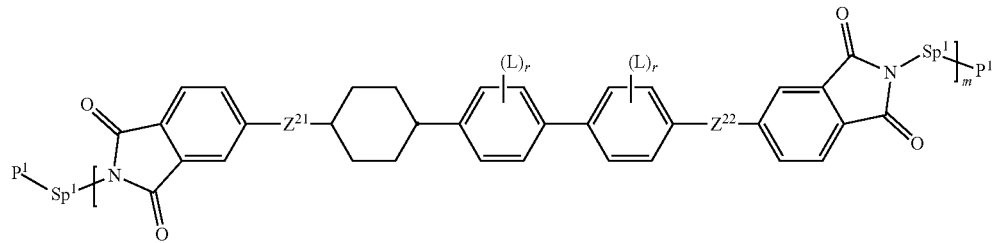# M19
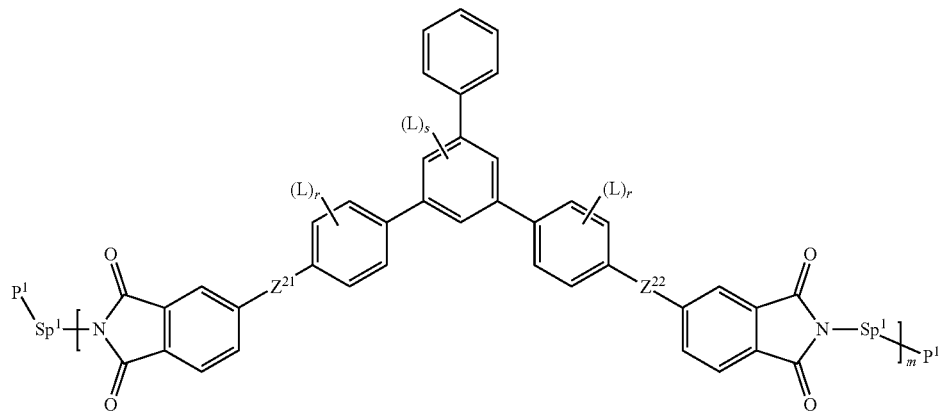# M20
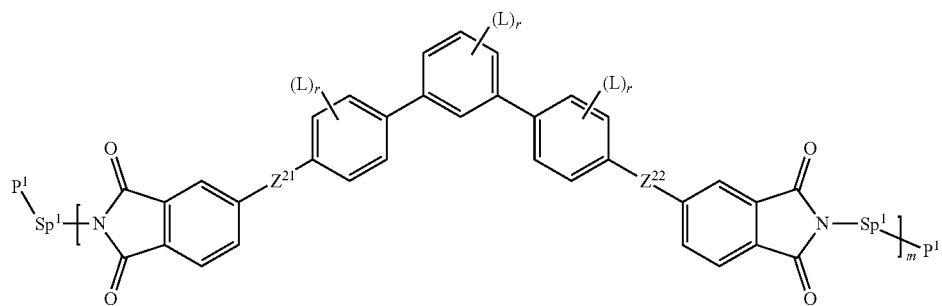# M21
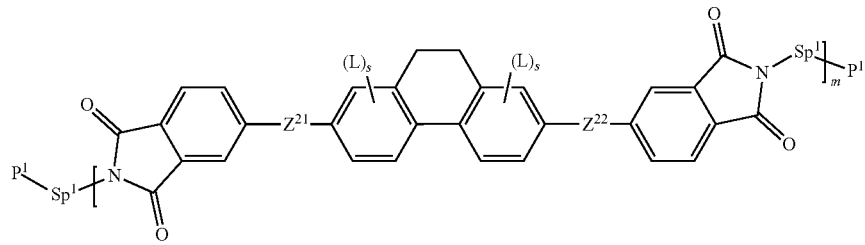# M22
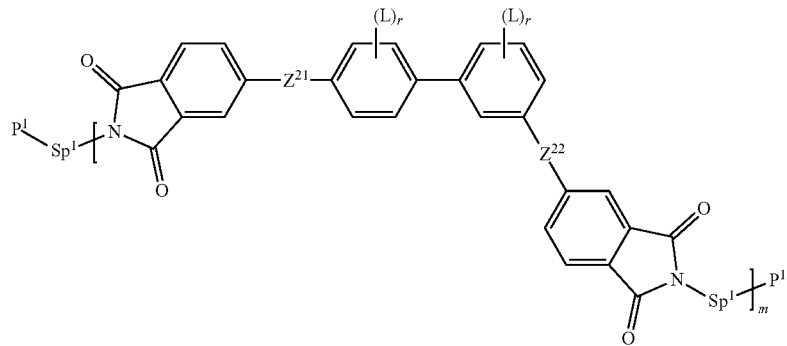# M23

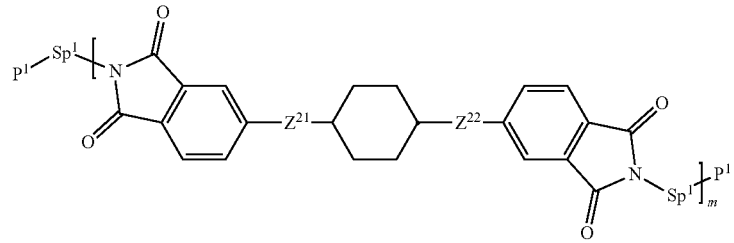
M24
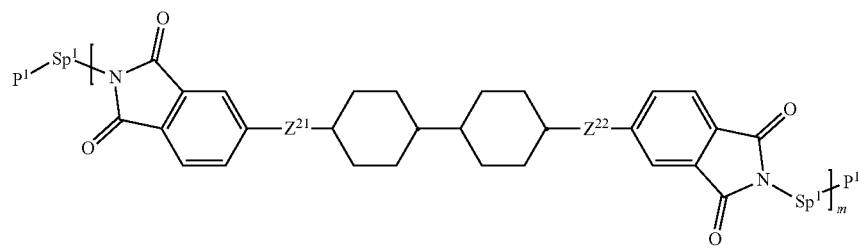
M25
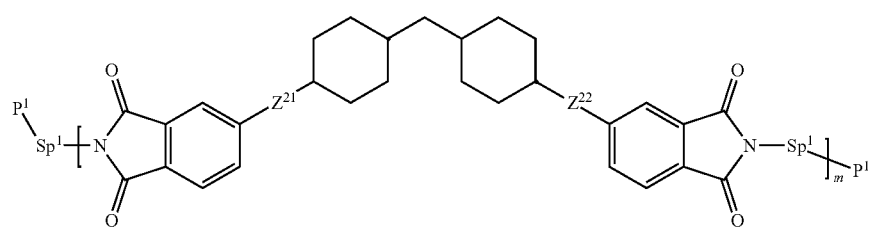
M26
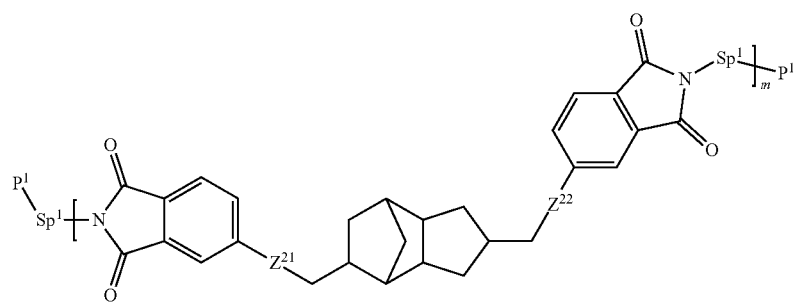
M27
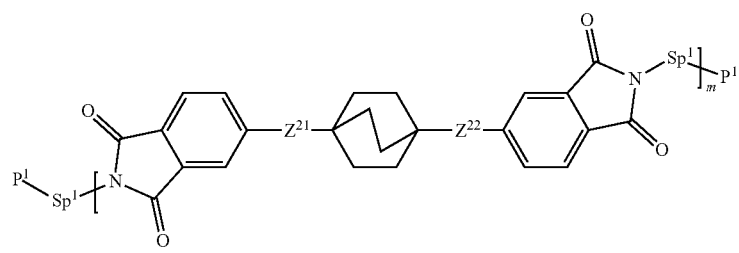
M28
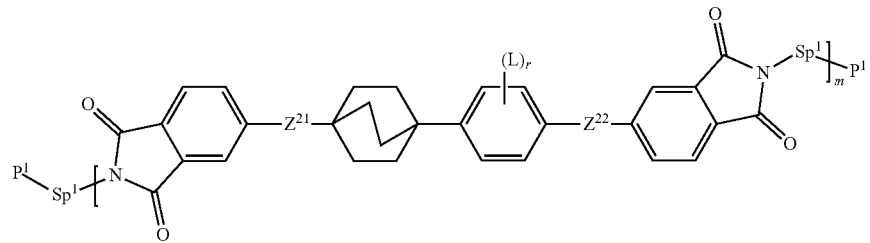
M29

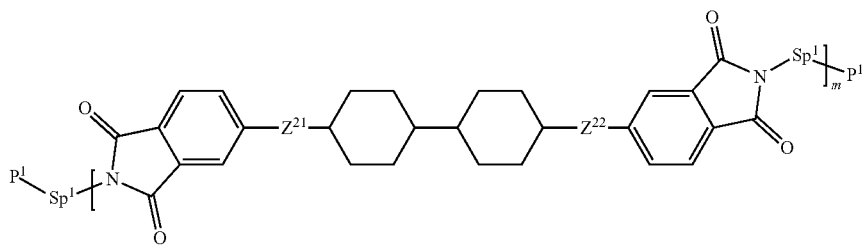

M30

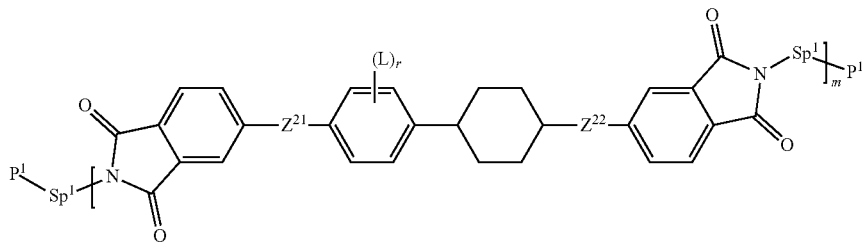

M31

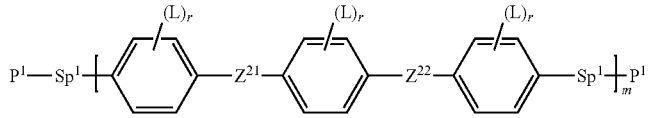

M32

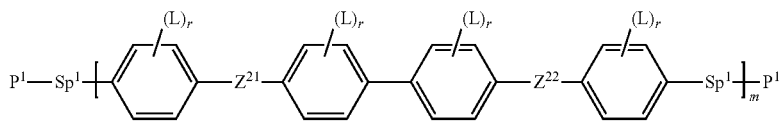

M33

L is F, Cl, Br, I, —CN, —NO$_2$, —NCO, —NCS, —OCN, —SCN, —C(=O)NR$^{xx}$R$^{yy}$, —C(=O)OR$^{xx}$, —C(=O)R$^{xx}$, —NR$^{xx}$R$^{yy}$, —OH, —SF$_5$, or a straight chain alkyl, alkoxy, alkylcarbonyl, alkoxycarbonyl, alkylcarbonyloxy or alkoxycarbonyloxy with 1 to 20 C atoms or a branched chain alkyl, alkoxy, alkylcarbonyl, alkoxycarbonyl, alkylcarbonyloxy or alkoxycarbonyloxy with 3 to 20 C atoms, wherein one or more H atoms are optionally replaced by F or C$_0$, —CN or a straight chain alkyl, alkoxy, alkylcarbonyl, alkoxycarbonyl, alkylcarbonyloxy or alkoxycarbonyloxy with 1 to 6 C atoms or branched chain alkyl, alkoxy, alkylcarbonyl, alkoxycarbonyl, alkylcarbonyloxy or alkoxycarbonyloxy with 3 to 6 C atoms;

R$^{xx}$ and R$^{yy}$ independently of each other denote H or alkyl with 1 to 12 C atoms;

r is 0, 1, 2, 3 or 4;

s is 0, 1, 2 or 3;

t is 0, 1 or 2;

Z$^{21}$ and Z$^{22}$ are independently and at each occurrence independently from each other, —O—, —S—, —CO—, —COO—, —OCO—, —S—CO—, —CO—S—, —O-COO—, —CO—NR$^{01}$—, —NR$^{01}$—CO—, —NR$^{01}$—CO—NR$^{02}$, —NR$^{01}$—CO—O—, —O—CO—NR$^{01}$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_4$—, —CF$_2$CH$_2$—, —CH$_2$CF$_2$—, —CF$_2$CF$_2$—, —CH=N—, —N=CH—, —N=N—, —CH=CR$^{01}$—, —CY$^{01}$=CY$^{02}$—, —CH=CH—COO—, —OCO—CH=CH—, or a single bond;

R$^{01}$ and R$^{02}$ each, independently of one another, denote H or alkyl having 1 to 12 C atoms;

Sp$^1$ denotes at each occurrence Sp'-X';

Sp' denotes (a) a straight chain alkylene having 1 to 40 C atoms or branched chain alkylene having 3 to 40 C atoms, which is optionally mono- or polysubstituted by F, Cl, Br, I or CN and in which one or more non-adjacent CH$_2$ groups may each be replaced, independently of one another, by —O—, —S—, —NH—, —NR$^{01}$—, —SiR$^{01}$R$^{02}$—, —CO—, —COO—, —OCO—, —OCO—O—, —S—CO—, —CO—S—, —NR$^{01}$—CO—O—, —O—CO—NR$^{01}$—, —NR$^{01}$—CO—NR$^{01}$—, or —CH=CH— in such a way that O and/or S atoms are not linked directly to one another, or (b) -Sp$^x$-G-Sp$^y$-, wherein Sp$^x$ and Sp$^y$ denote independently of each other alkylene having 1 to 20 C atoms or a single bond; G denotes cycloalkylene having 3 to 20 C atoms which is optionally mono- or polysubstituted by alkyl having 1 to 20 C atoms;

X' denotes —O—, —S—, —CO—, —COO—, —OCO—, —O—COO—, —CO—NR$^{01}$—, —NR$^{01}$—CO—, —NR$^{01}$—CO—NR$^{01}$—, —OCH$_2$—, —CH$_2$O—, —SCH$_2$—, —CH$_2$S—, —CF$_2$—, —OCF$_2$—, —CF$_2$S—, —SCF$_2$—, —CF$_2$CH$_2$—, —CH$_2$CF$_2$—, —CF$_2$CF$_2$—, —CH=N—, —N=C—, —N=N—, —CH=CR$^{01}$—, —CY$^{11}$=CY$^{12}$—, —C=C—, —CH=CH—COO—, —OCO—CH=CH— or a single bond;

Y$^{11}$ and Y$^{12}$ each, independently of one another, denote H, F, Cl or CN;

$P^1$ denotes
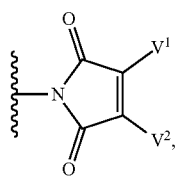
where $V^1$ is H, and $V^2$ is alkyl with 1 to 6 carbon atoms, F, Cl or CN; or $V^1$ and $V^2$ are independently of one another alkyl with 1 to 6 carbon atoms, F, Cl or CN; and
m is an integer from 2 to 60.
23. A polymerizable mixture according to claim 22, wherein the one or more compounds of formula (1) are of one or more of the following formulae:
M1a
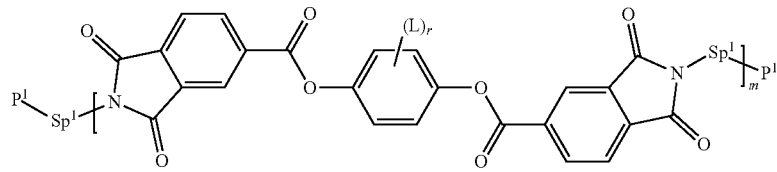
M2a
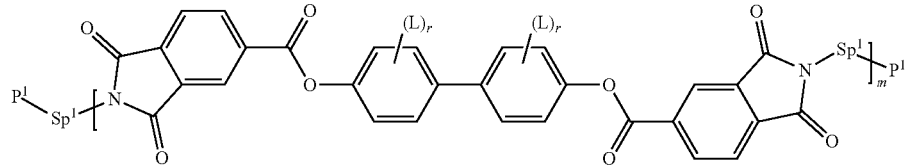
M8a
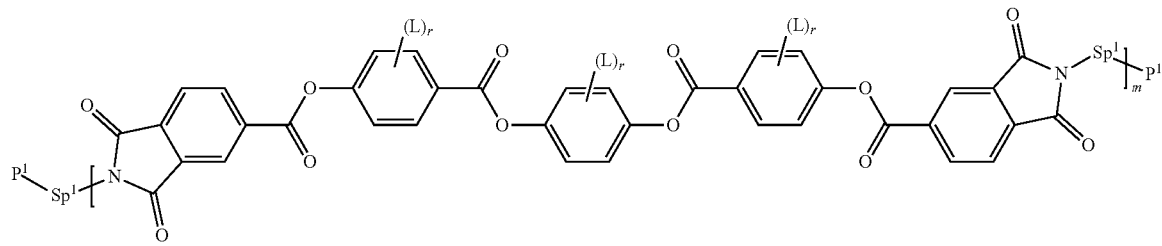
M32a M32b
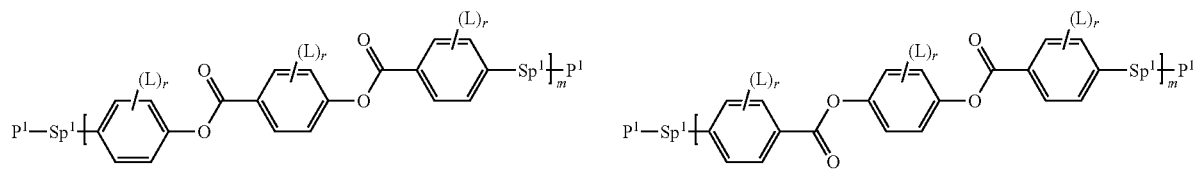
M33a
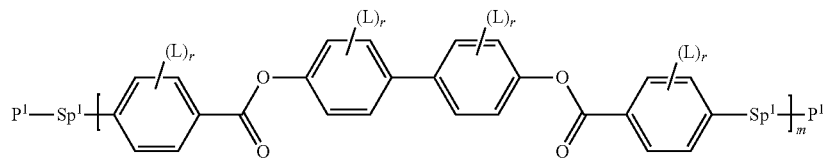
M1b
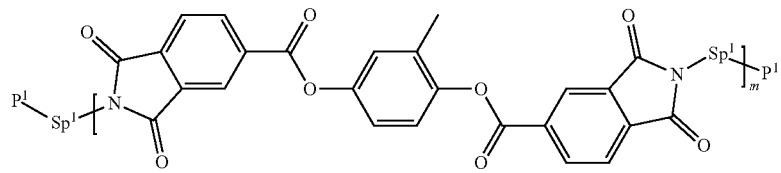

-continued
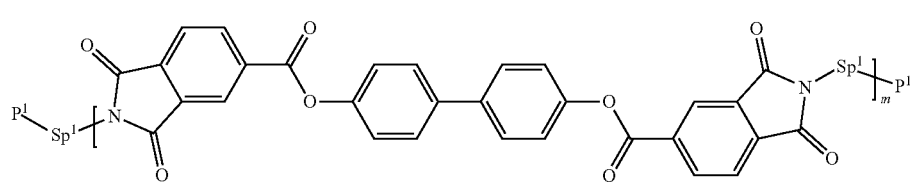
M2b
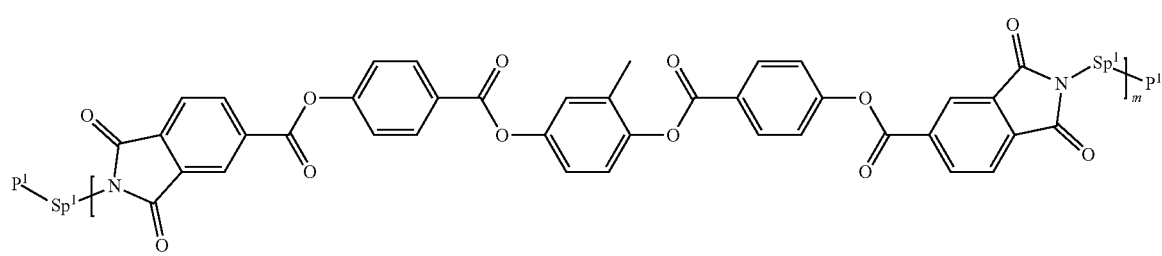
M8b
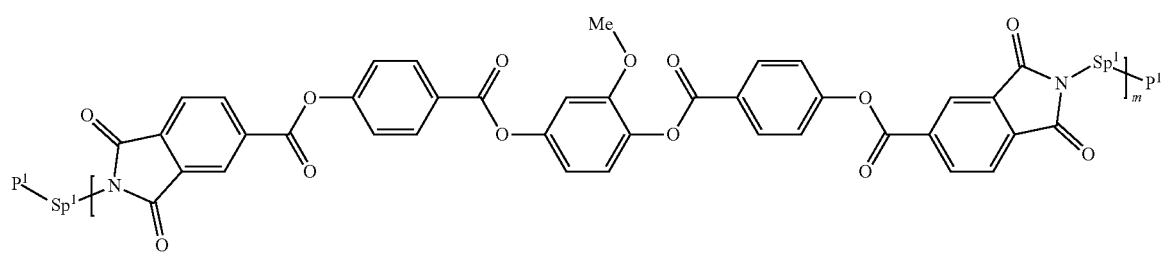
M8c
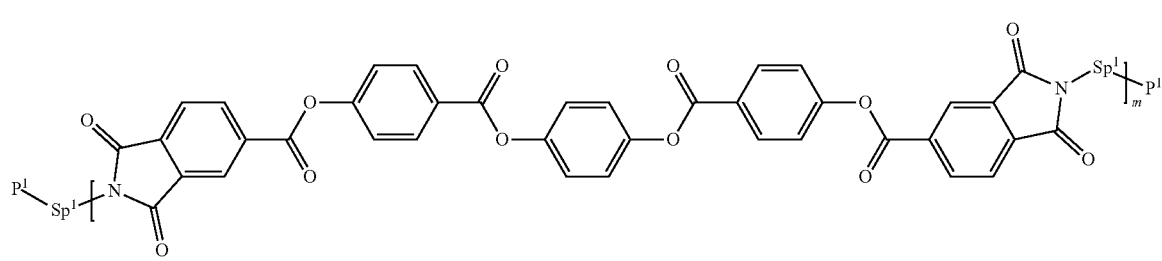
M8d
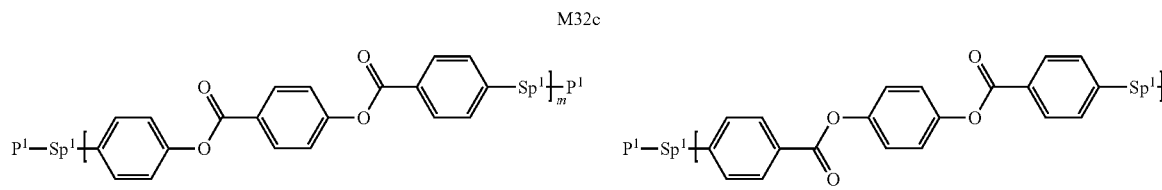
M32c          M32d
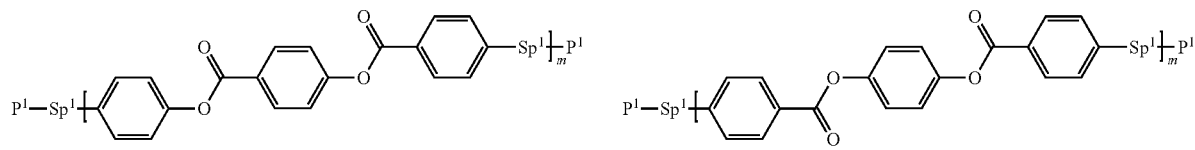
M32e          M32f
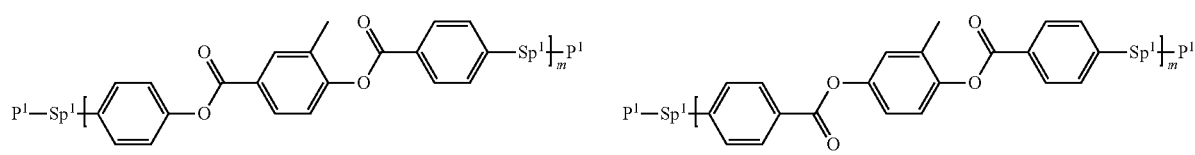
M33b
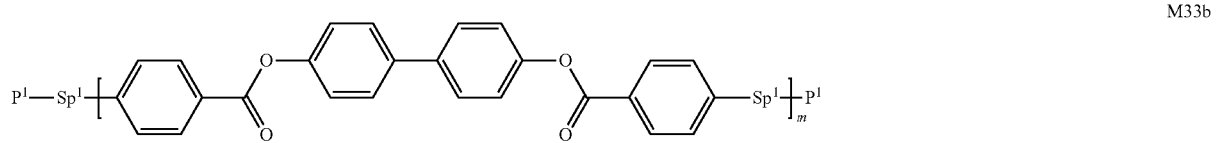

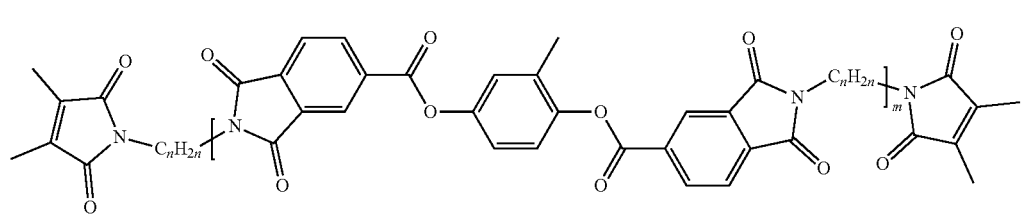
M1c
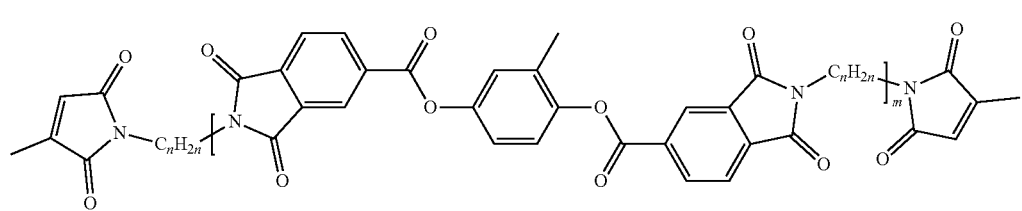
M1c'
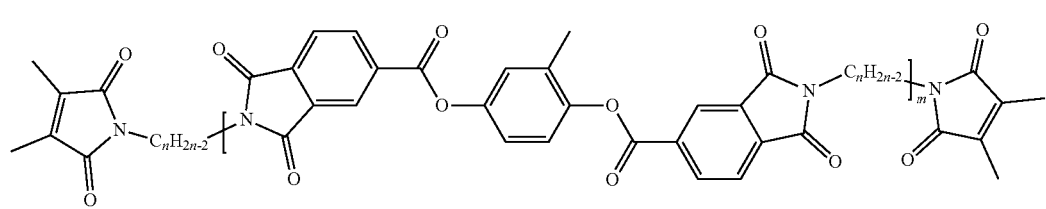
M1d
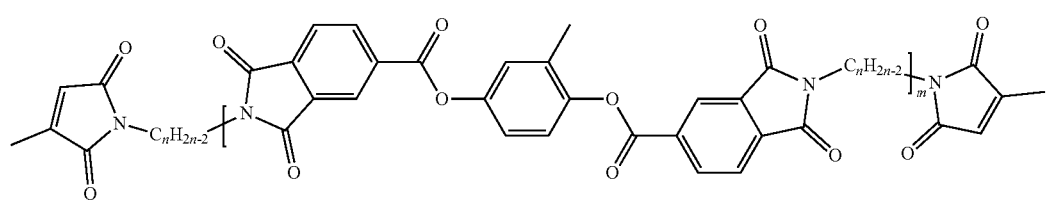
M1d'
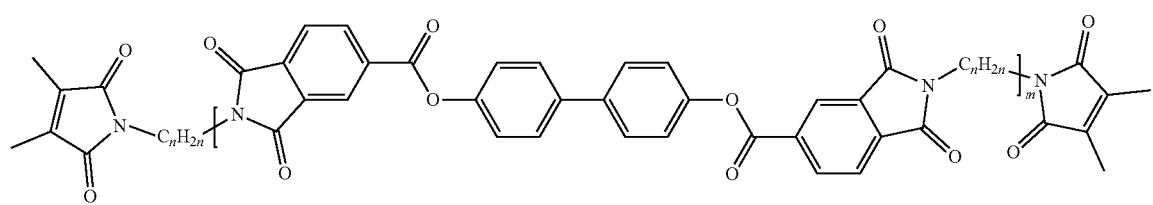
M2c
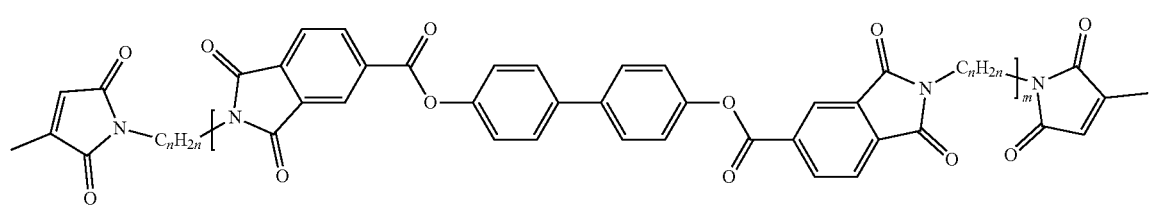
M2c'
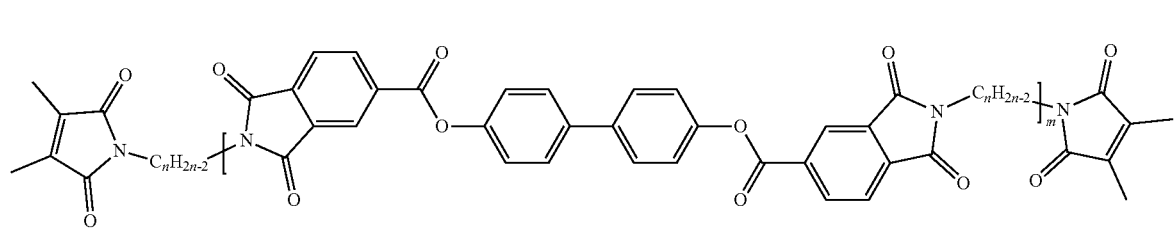
M2d -continued
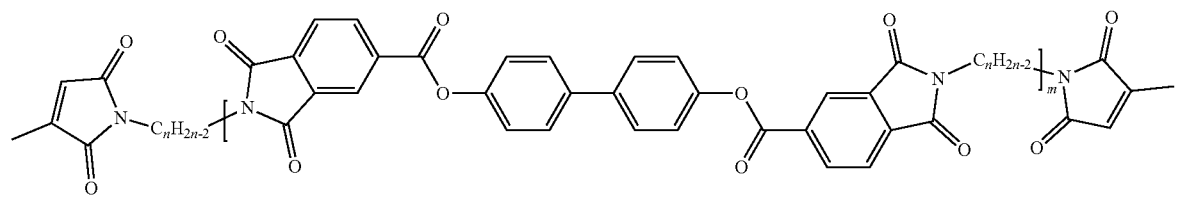
M2d′
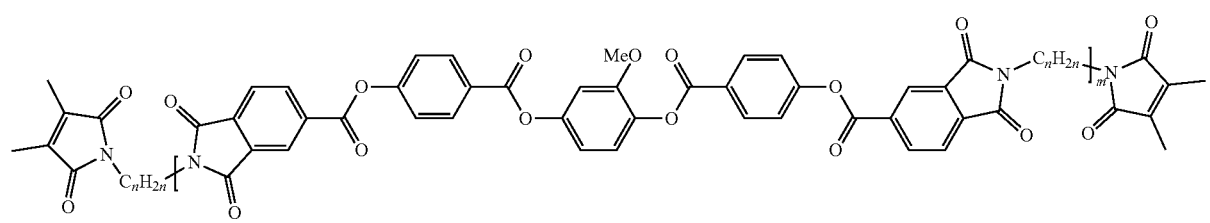
M8d
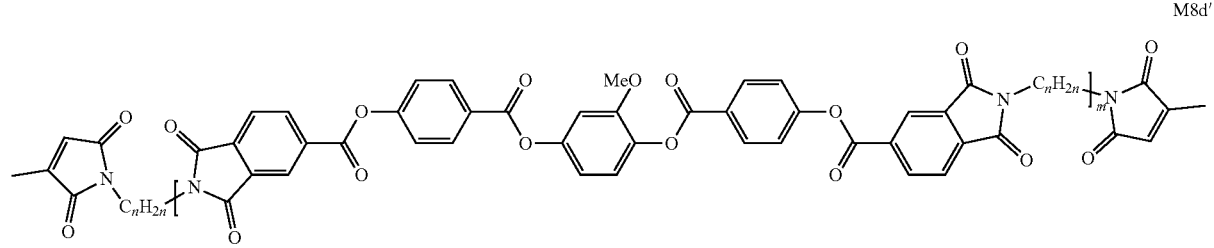
M8d′
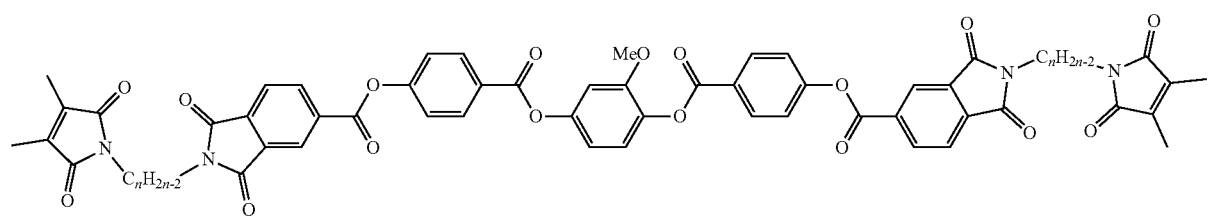
M8e
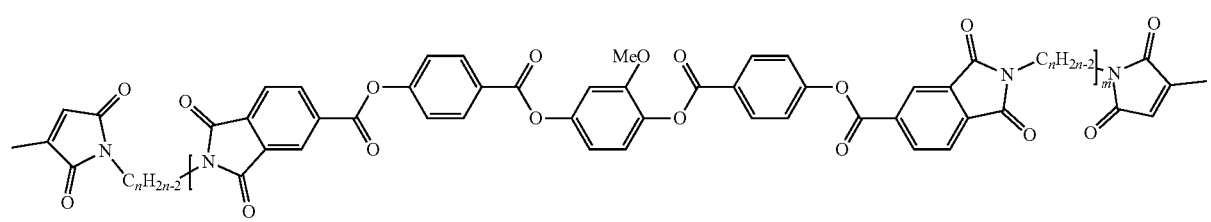
M8e′
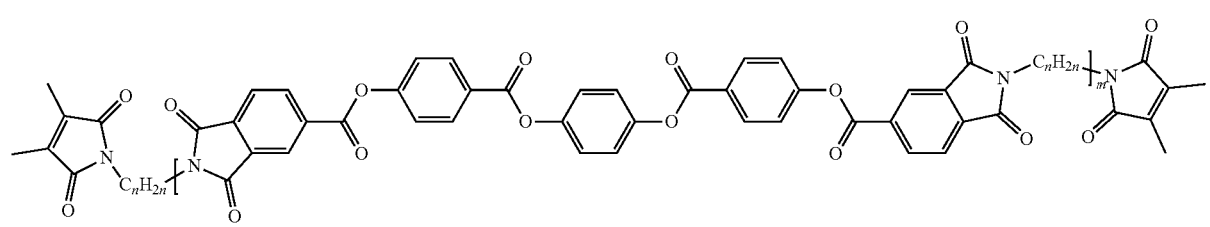
M8f

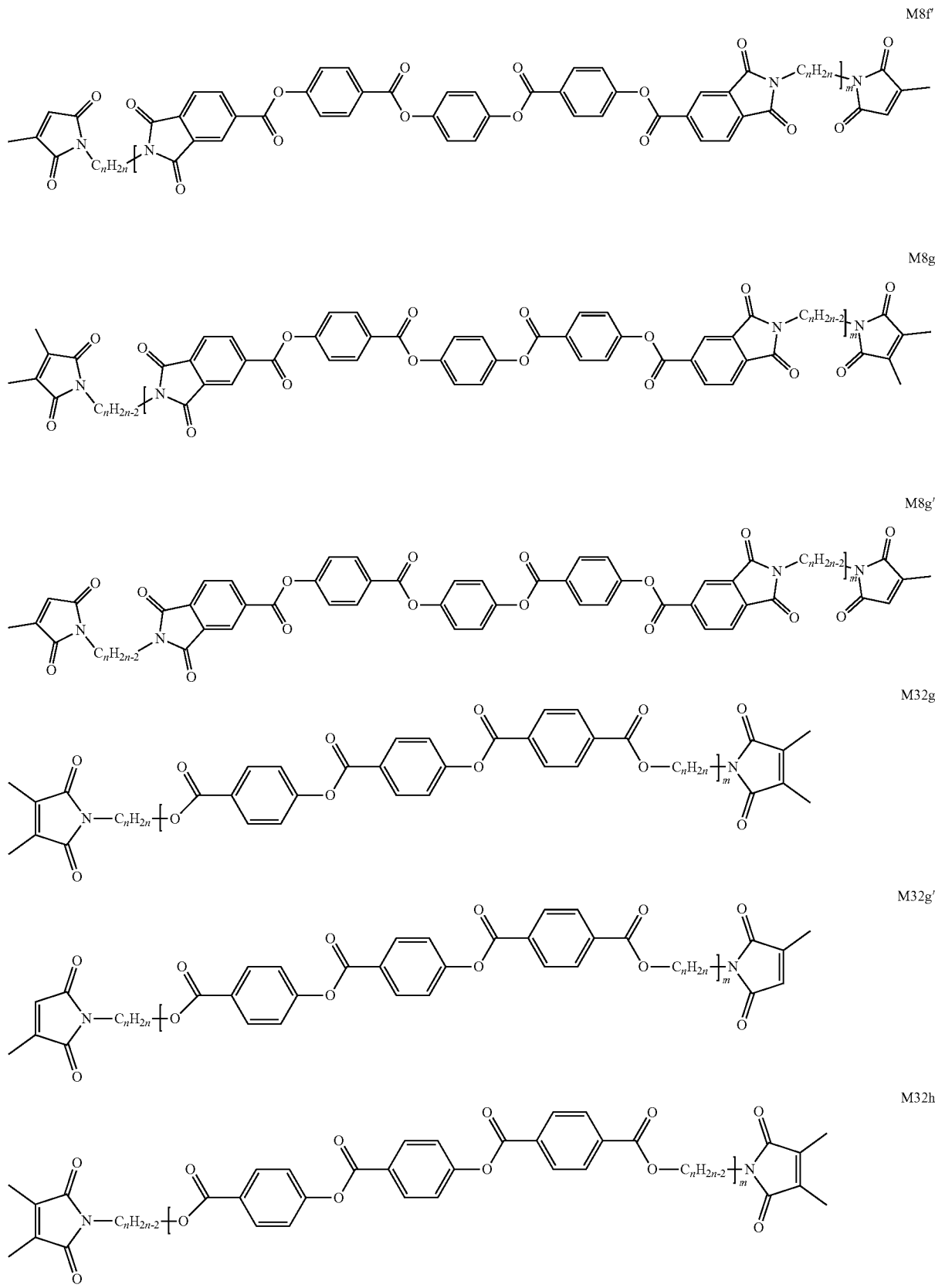

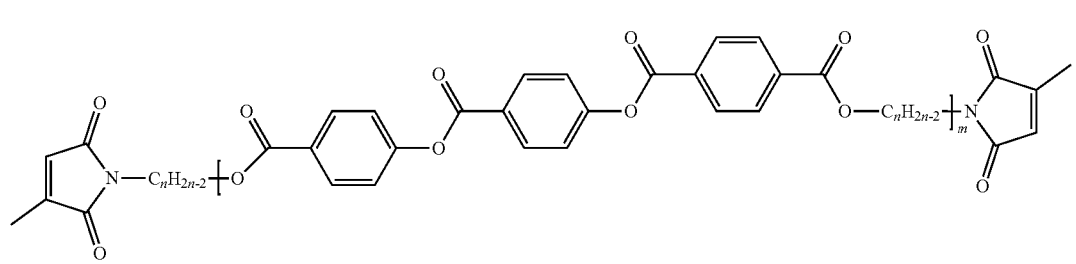
M32h′
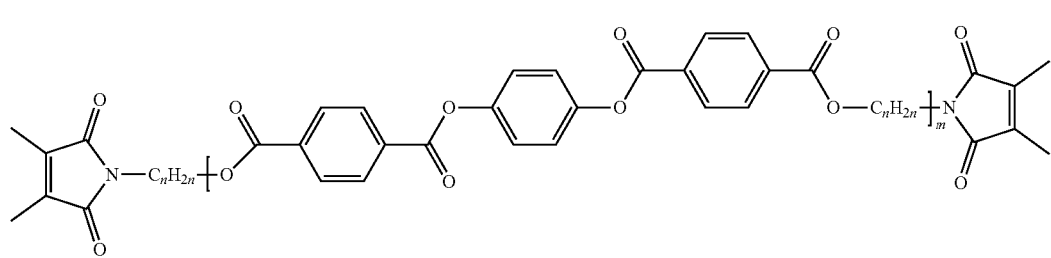
M32i
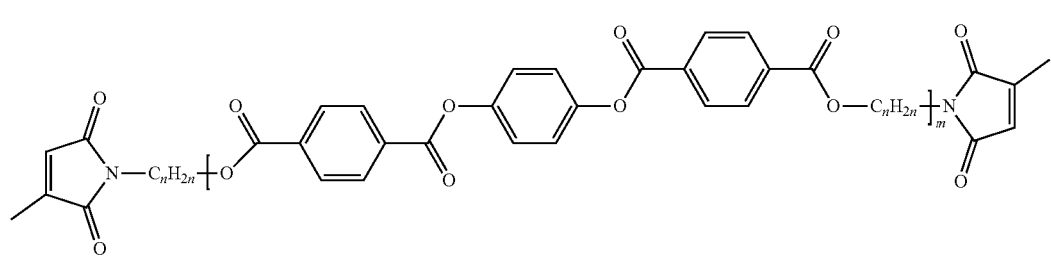
M32i′
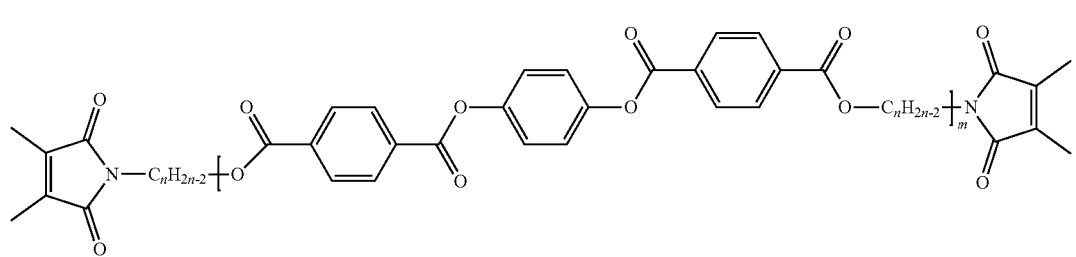
M32j
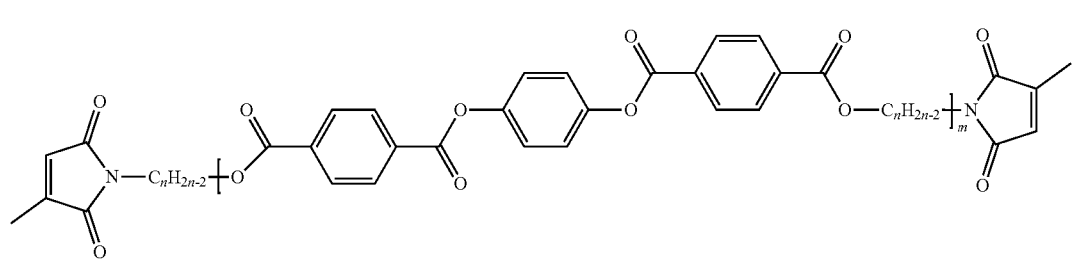
M32j′
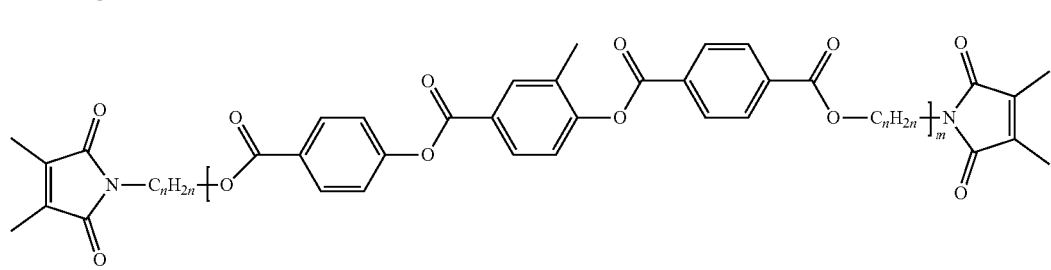
M32k -continued
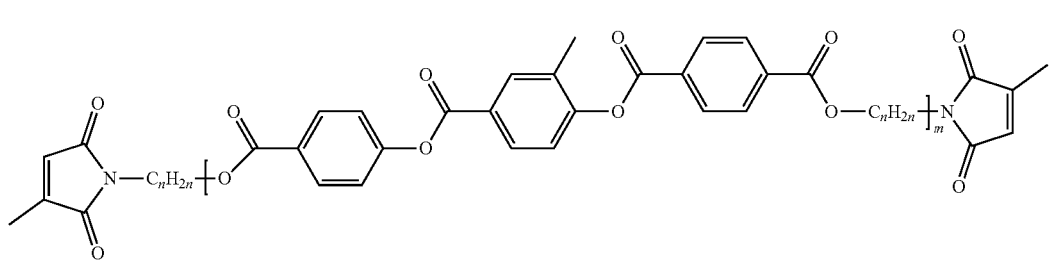
M32k'
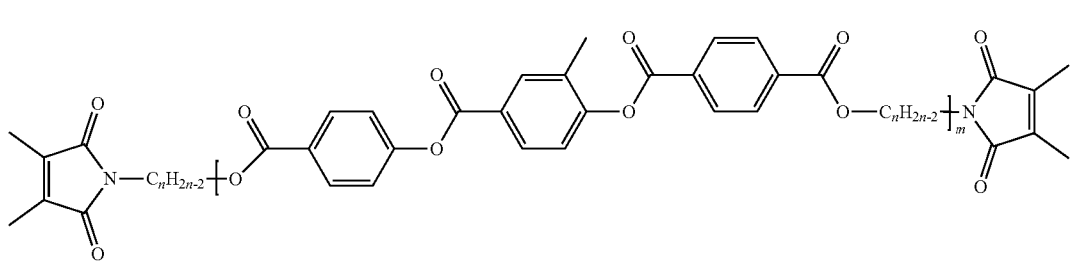
M32l
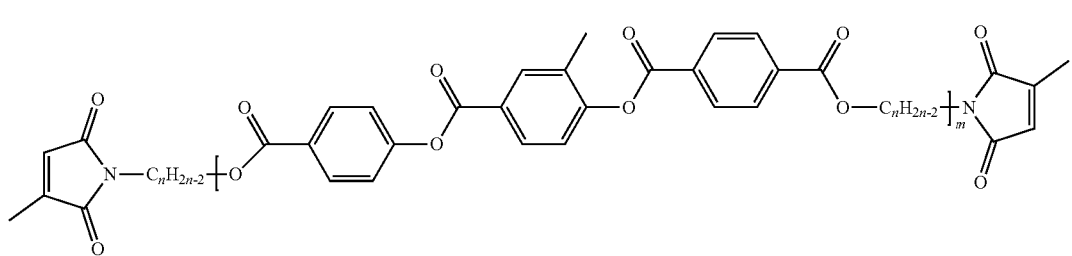
M32l'
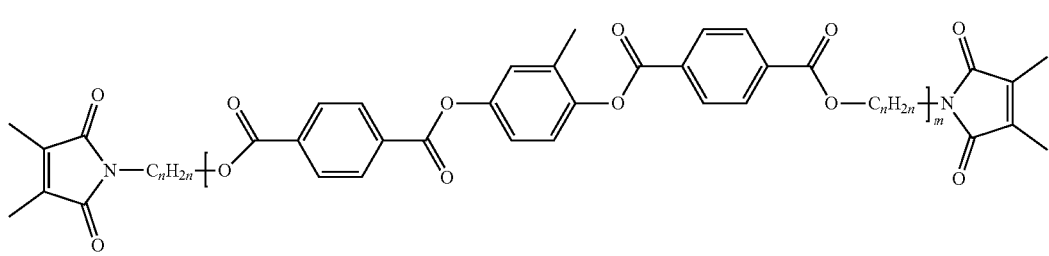
M32m
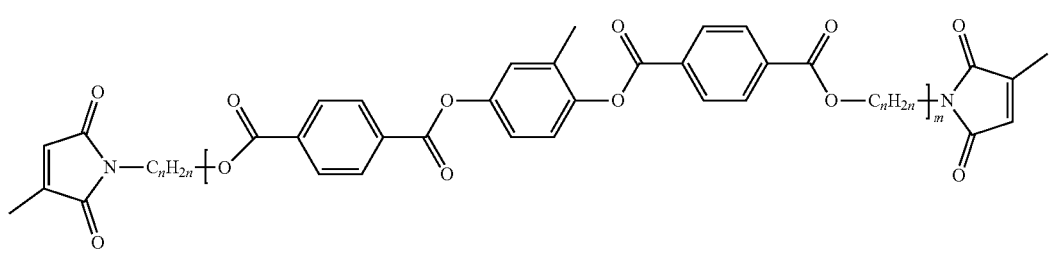
M32m'
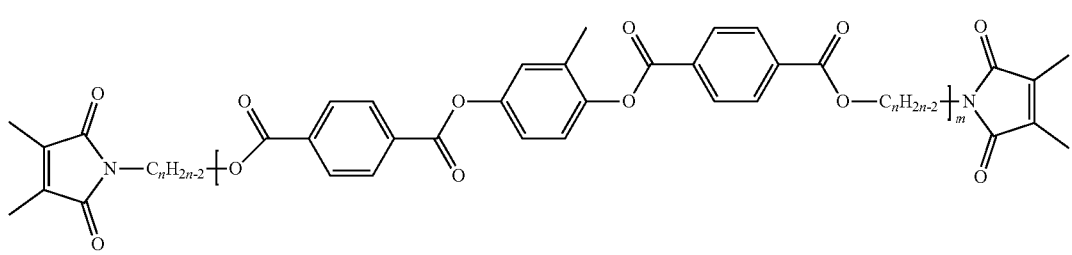
M32n -continued
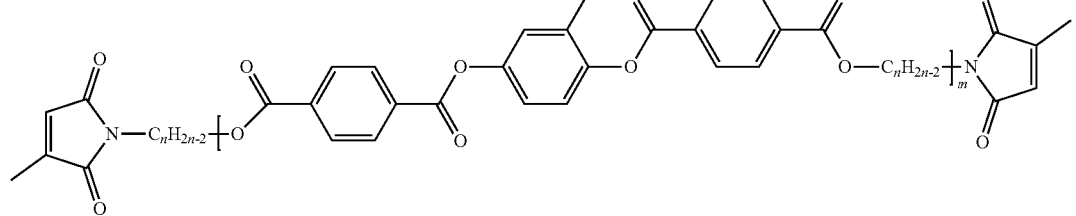
M32n'
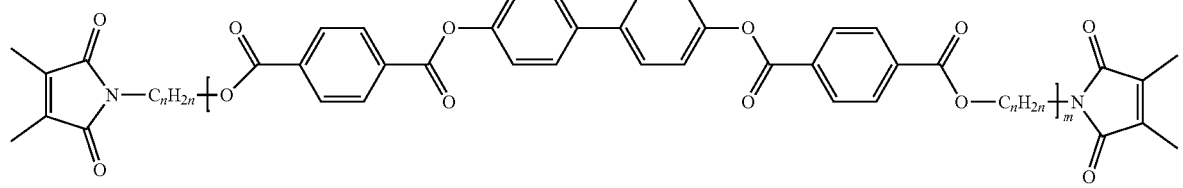
M33c
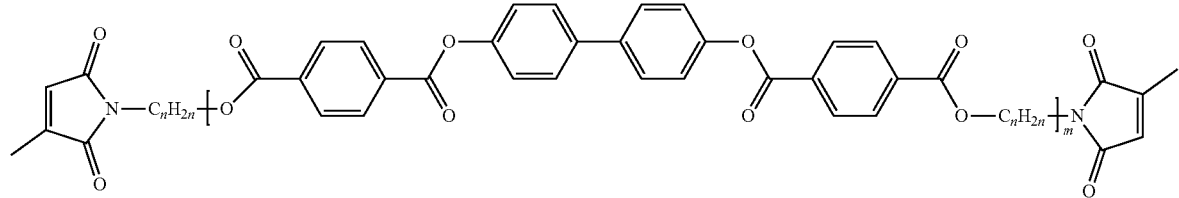
M33c'
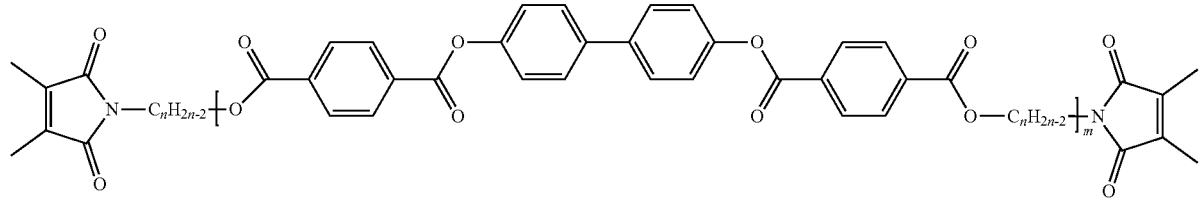
M33d
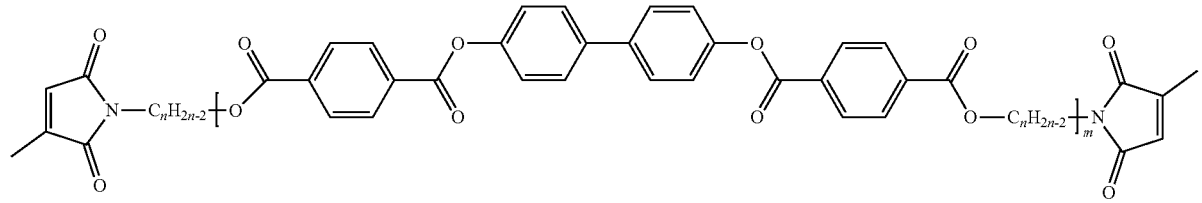
M33d'
wherein
n is an integer from 1 to 60.
* * * * *